United States Patent
Dupuy et al.

(10) Patent No.: US 11,901,564 B2
(45) Date of Patent: Feb. 13, 2024

(54) ANISOTROPIC POROUS GERMANIUM NANOSTRUCTURES ACHIEVED WITH FAST BIPOLAR ELECTROCHEMICAL ETCHING AND CHEMICAL ETCHING

(71) Applicant: SOCPRA SCIENCES ET GÉNIE S.E.C., Sherbrooke (CA)

(72) Inventors: Arthur Dupuy, Compiègne (FR); Abderraouf Boucherif, Sherbrooke (CA); Richard Ares, Sherbrooke (CA)

( * ) Notice: Subject to any disclaimer, the term of this patent is extended or adjusted under 35 U.S.C. 154(b) by 54 days.

(21) Appl. No.: 17/667,998

(22) Filed: Feb. 9, 2022

(65) Prior Publication Data

US 2023/0253571 A1 Aug. 10, 2023

(51) Int. Cl.
 *H01M 4/80* (2006.01)
 *H01M 4/66* (2006.01)
 *H01M 4/64* (2006.01)
 H01M 4/02 (2006.01)

(52) U.S. Cl.
 CPC ............ *H01M 4/80* (2013.01); *H01M 4/661* (2013.01); *H01M 4/667* (2013.01); H01M 2004/021 (2013.01); H01M 2004/027 (2013.01)

(58) Field of Classification Search
 CPC .......... H01M 4/80; H01M 4/66; H01M 4/667; H01M 4/34; H01M 4/661
 See application file for complete search history.

(56) References Cited

U.S. PATENT DOCUMENTS

| 9,142,833 B2 | 9/2015 | Tolbert et al. |
| 10,056,199 B2 | 8/2018 | Dunn et al. |
| 2013/0185930 A1* | 7/2013 | Teeters ................ C25D 11/16 |
| | | 204/192.15 |
| 2013/0216907 A1* | 8/2013 | Rayner .................. B22F 1/06 |
| | | 241/24.1 |
| 2013/0260246 A1* | 10/2013 | Chen ..................... H01M 4/133 |
| | | 977/948 |
| 2015/0086879 A1 | 3/2015 | Yamaguchi et al. |
| 2015/0140427 A1 | 5/2015 | Zhang et al. |

(Continued)

FOREIGN PATENT DOCUMENTS

TW I472643 B 2/2015

OTHER PUBLICATIONS

A. Dupuy, et al., Graphene-Mesoporous Semiconductor Nanocomposite as Anode for Lithium Ion Batteries.

(Continued)

*Primary Examiner* — Kenneth J Douyette

(57) ABSTRACT

An anode for batteries having a columnar nanostructured porous germanium for its active material. This nanostructured porous germanium can be produced with the novel etching method disclosed herein. Such anode can be easily mass-produced with the presented method that requires pre-existing, affordable and easy to integrate equipment. In some embodiments, the produced columnar porous germanium can be directly used as a monolithic anode after its etching nanostructuration for on-chip anodes for example, where the anisotropic nanostructured germanium acts as the active material and where the remaining bulk germanium layer act as the current collector. This can be easily implemented in lithium batteries. The cycle life of such anodes could be extended by a factor of 26 and 1.8 for high rate and high energy applications, respectively.

19 Claims, 83 Drawing Sheets

Control of the etching and passivation pulse interaction to generate tubular pores

(56) References Cited

U.S. PATENT DOCUMENTS

| | | | |
|---|---|---|---|
| 2016/0141612 A1 | 5/2016 | Burshtan et al. | |
| 2018/0198169 A1* | 7/2018 | Fukui | H01M 10/0436 |
| 2019/0109317 A1 | 4/2019 | Zhou et al. | |
| 2020/0036003 A1 | 1/2020 | Haag | |

OTHER PUBLICATIONS

A. Dupuy, et al., Graphene-porous semiconductor nanocomposites scalable synthesis for energy applications. Nov. 2019 Journal of Physics: Conference Series. 1407 012069.

A. Dupuy, et al., Monolithic integration of mesoporous germanium: A step toward high-performance on-chip anode. Material Today Communication. 2020.

Y. Liu, S. Zhang, et al., Germanium-Based Electrode Materials for Lithium-Ion Batteries, ChemElectroChem. 1 (2014) 706-713. https://doi.org/10.1002/celc.201300195.

L. Baggetto, et al., Germanium as negative electrode material for sodium-ion batteries, Electrochem. Commun. 34 (2013) 41-44. https://doi.org/10.1016/j.elecom.2013.05.025.

A. Noori, et al., Towards establishing standard performance metrics for batteries, supercapacitors and beyond, Chem. Soc. Rev. 48 (2019) 1272-1341. https://doi.org/10.1039/c8cs00581h.

A.S. Westover, et al., On-chip high power porous silicon lithium ion batteries with stable capacity over 10 000 cycles, Nanoscale. 7 (2015) 98-103. https://doi.org/10.1039/c4nr04720f.

Bioud et al., Uprooting defects to enable high-performance III-V optoelectronic devices on silicon. Nature Communications vol. 10, Article No. 4322 (2019). DOI: 0.1038/s41467-019-12353-9.

S.Tutashkonko, et al. Mesoporous Germanium formed by bipolar electrochemical etching. Electrochimica Acta vol. 88, Jan. 15, 2013, pp. 256-262. DOI: 10.1016/j.electacta.2012.10.031.

Bioud et al. Fast growth synthesis of mesoporous germanium films by high frequency bipolar electrochemical etching. Electrochimica Acta. vol. 232, Apr. 1, 2017, pp. 422-430. DOI: 10.1016/j.electacta.2017.02.115.

Boucherif et al., Mesoporous germanium morphology transformation for lift-off process and substrate re-use. Appl. Phys. Lett. 102, 011915 (2013); https://doi.org/10.1063/1.4775357.

Cho et al., Porous Si anode materials for lithium rechargeable batteries. May 2010Journal of Materials Chemistry 20(20):4009-4014. DOI:10.1039/B923002E.

E.J. Garralaga Rojas, Mesoporous Germanium Layer Formation by Electrochemical Etching, Christian-Albrechts-Universität zu Kiel, 2010.

Fang et al., Electrochemical pore etching in germanium. Journal of Electroanalytical Chemistry. vol. 589, Issue 2, Apr. 15, 2006, pp. 259-288 (DOI: 10.1016/j.jelechem.2006.02.021.

Garralaga Rojas et al., Formation of mesoporous germanium double layers by electrochemical etching for layer transfer processes. Electrochemistry Communications. vol. 12, Issue 2, Feb. 2010, pp. 231-233. DOI: 10.1016/j.elecom.2009.11.033.

Garralaga Rojas et al., Mesoporous Germanium Formation by Electrochemical Etching. Journal of The Electrochemical Society, vol. 156, No. 8. Published Jun. 10, 2009. DOI: 10.1149/1.3147271
Goriparti et al. DOI: 10.1016/j.jpowsour.2013.11.103.

H. Li, et al., Enhancing the performances of Li-ion batteries by carbon-coating: Present and future, Chem. Commun. 48 (2012) 1201-1217. https://doi.org/10.1039/c1cc14764a.

H. Wu , et al., Designing nanostructured Si anodes for high energy, Nano Today 7 (2012) 414-429. https://doi.org/10.1142/9789814317665_0024.

J.M. Tarascon, et al., Issues and challenges facing rechargeable lithium batteries, Materials for Sustainable Energy, pp. 171-179 (2010).

Jia et al., Reversible Storage of Lithium in Three-Dimensional Macroporous Germanium. Chem. Mater. 2014, 26, 19, 5683-5688. Publication Date:Sep. 15, 2014. (DOI: 10.1021/cm5025124).

Kil et al., Selective Chemical Wet Etching of Si0.8Ge0.2/Si Multilayer. Journal of Semiconductor Technology and Science.vol. 13 Issue 6 / pp. 668-675 / 2013 / 1598-1657(pISSN). DOI : 10.5573/JSTS.2013.13.6.668.

Kwon et al., Synthesis of dual porous structured germanium anodes with exceptional lithium-ion storage performance. Journal of Power Sources. vol. 374, Jan. 15, 2018, pp. 217-224. (DOI: 10.1016/j.jpowsour.2017.11.044.

L. Oakes, et al., Surface engineered porous silicon for stable, high performance electrochemical supercapacitors, Sci. Rep. 3 (2013) 1-7. https://doi.org/10.1038/srep03020.

Lehmann et al., On the morphology and the electrochemical formation mechanism of mesoporous silicon. Materials Science and Engineering: B. vol. 69-70, Jan. 14, 2000, pp. 11-22. (DOI: 10.1016/S0921-5107(99)00286-x).

M.E. Denham, et al., Geochemistry of hydrofluoric acid in kaolinitic soils (U), Prepared for the U.S. Department of Energy Under Contract No. DE-AC09-96SR18500. (2003)).

S. Goriparti, et al., Review on recent progress of nanostructured anode materials for Li-ion batteries, J. Power Sources. 257 (2014) 421-443. https://doi.org/10.1016/j.jpowsour.2013.11.103.

Santinacci et al., Electrochemical pore formation onto semiconductor surfaces. Comptes Rendus Chimie vol. 11, Issue 9, Sep. 2008, pp. 964-983. DOI: 10.1016/j.crci.2008.06.004.

Choi et al., Mesoporous Germanium Anode Materials for Lithium-Ion Battery with Exceptional Cycling Stability in Wide Temperature Range. Small. vol. 13, Issue13.Apr. 4, 2017. 1603045 (DOI: 10.1002/smll.201603045.

Lehmann et al., Electrochemistry of Silicon: Instrumentation, Science, Materials and Applications. Electrochemistry of Silicon: Instrumentation, Science, Materials and Applications, by Volker Lehmann, pp. 286. ISBN 3-527-29321-3. Wiley-VCH , Apr. 2002. DOI: 10.1002/3527600272.

Liang et al., Tough Germanium Nanoparticles under Electrochemical Cycling. ACS Nano 2013, 7, 4, 3427-3433 Publication Date:Mar. 5, 2013. https://doi.org/10.1021/nn400330h.

P. Nguyen, et al., Growth of individual vertical germanium nanowires, Adv. Mater. 17 (2005) 549-553. https://doi.org/10.1002/adma.200400908.

R. Mo, et al., Hollow germanium nanocrystals on reduced graphene oxide for superior stable lithium-ion half cell and germanium (lithiated)-sulfur battery, Energy Storage Materials. vol. 26, Apr. 2020, pp. 414-422. https://doi.org/10.1016/j.ensm.2019.11.013.

Taraschi et al., Relaxed SiGe-on-insulator fabricated via wafer bonding and etch back. Journal of Vacuum Science & Technology B: Microelectronics and Nanometer Structures Processing, Measurement, and Phenomena 20, 725 (2002); https://doi.org/10.1116/1.1463727.

Turner et al., The Anode Behavior of Germanium in Aqueous Solutions. Journal of The Electrochemical Society, vol. 103, No. 4. Journal of The Electrochemical Society, vol. 103, No. 4. DOI: 10.1149/1.2430289.

Tutashkonko et al., Nanoscale morphology tuning of mesoporous Ge: electrochemical mechanisms. Electrochimica Acta. vol. 180, Oct. 20, 2015, pp. 545-554. (DOI: 10.1016/j.electacta.2015.08.112.

Uhlir, Electrolytic Shaping of Germanium and Silicon. Bell System Technical Journal. First published: Mar. 1956 https://doi.org/10.1002/j.1538-7305.1956.tb02385.x.

V.Y. Yerokhov, et al., Cost-effective methods of texturing for silicon solar cells. Solar Energy Materials and Solar Cells. vol. 72, Issues 1-4, Apr. 2002, pp. 291-298. https://doi.org/10.1016/S09270248(01)00177-5.

Wang et al., Nano active materials for lithium-ion batteries. DOI: 10.1039/CONR00068J (Review Article) Nanoscale, 2010, 2, 1294-1305.

X. Li, et al., Mesoporous silicon sponge as an anti-pulverization structure for high-performance lithium-ion battery anodes, Nature Communications vol. 5, Article No. 4105 (2014). https://doi.org/10.1038/ncomms5105.

(56) References Cited

OTHER PUBLICATIONS

M. Datta, et al., Application of Chemical and Electrochemical Micromachining in the Electronics Industry, J. Electrochem. Soc. 136 (2019) 285C-292C. https://doi.org/10.1149/1.2097055.

* cited by examiner

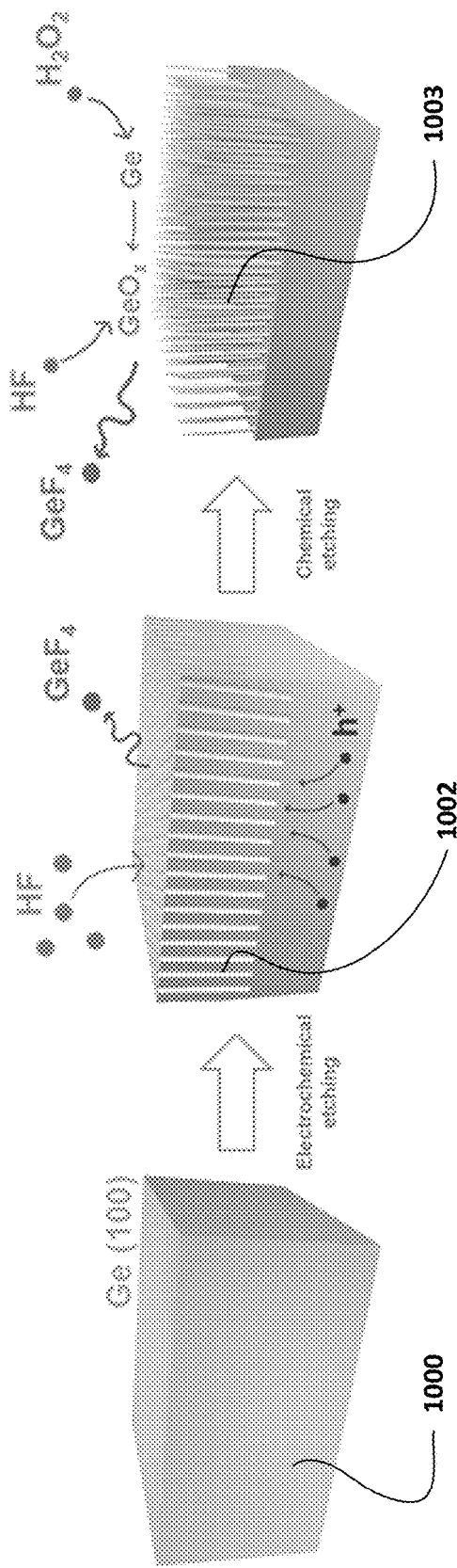
Figure 1A
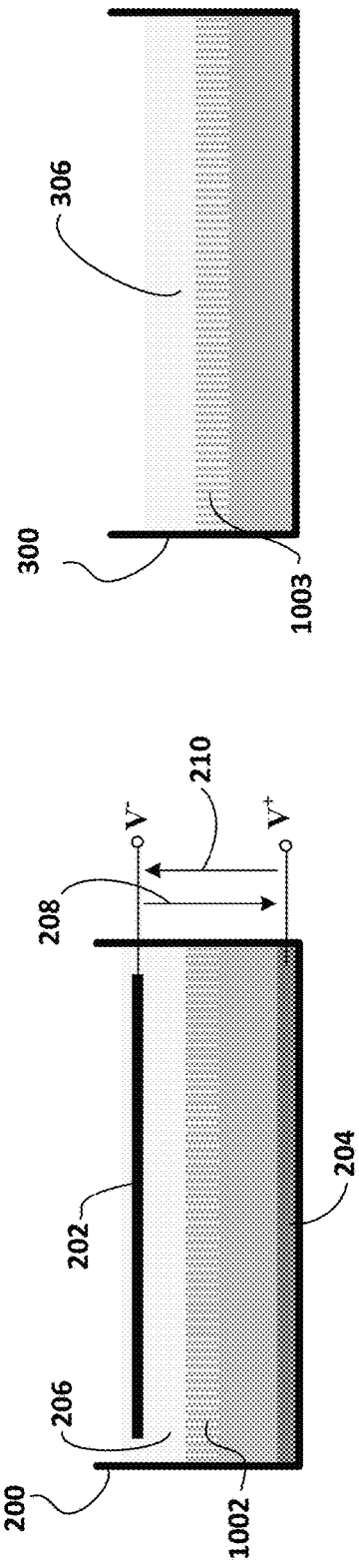
Figure 1B
Figure 1C resistivity: 8 mΩ·cm

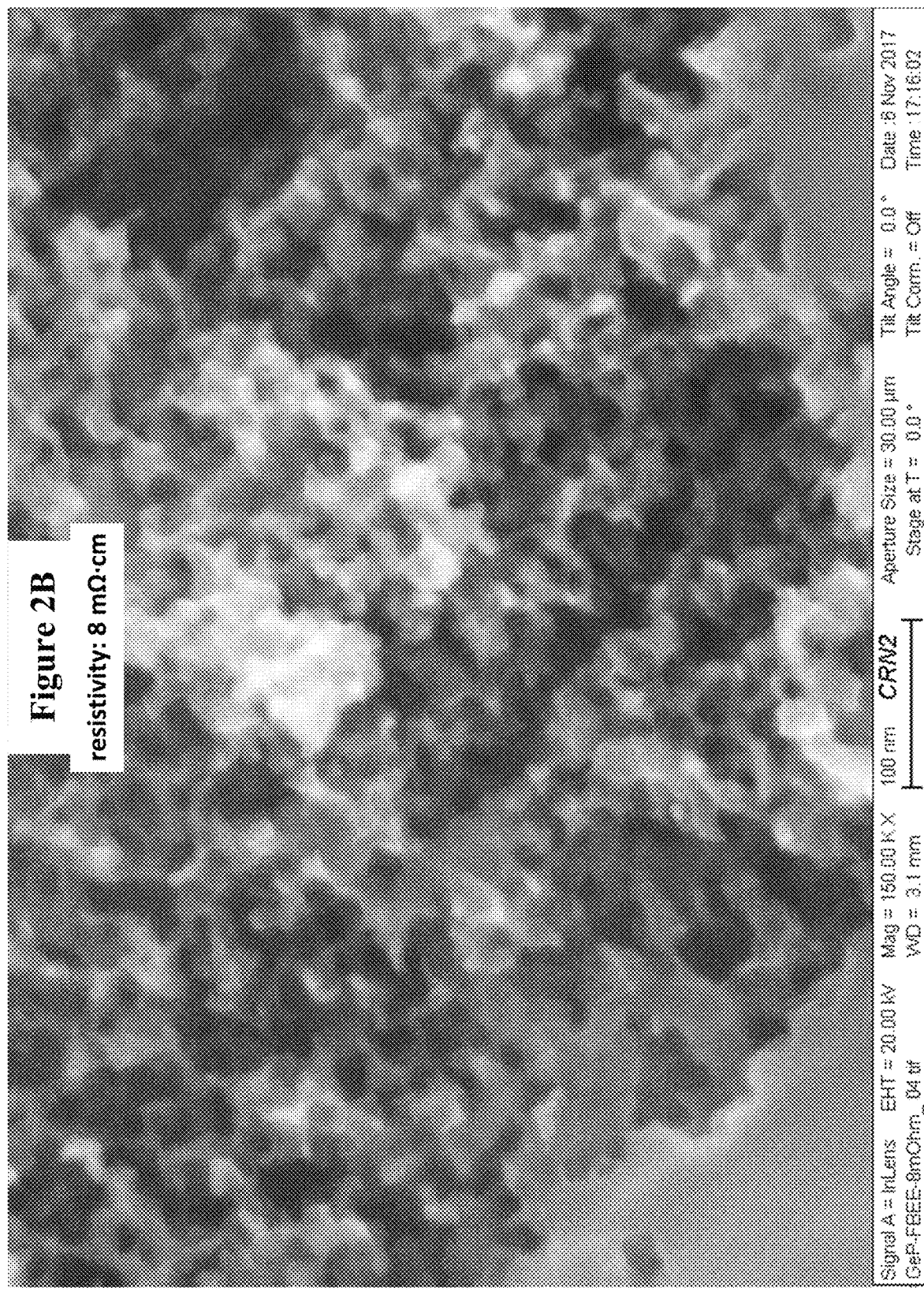

resistivity: 11 mΩ·cm resistivity: 11 mΩ·cm resistivity: 13.7 mΩ·cm resistivity: 13.7 mΩ·cm resistivity: 23 mΩ·cm resistivity: 23 mΩ·cm

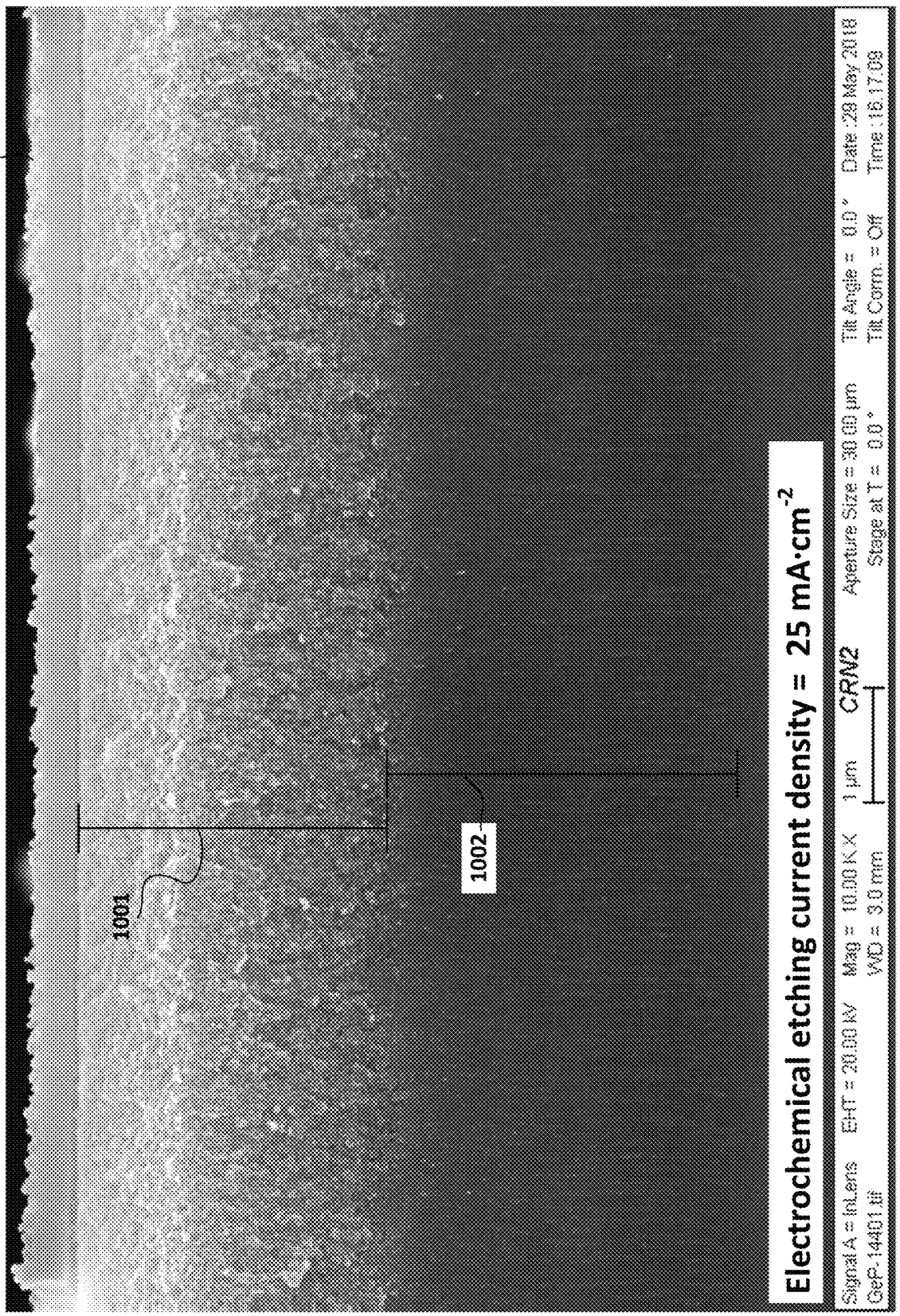

Total etching time : 30 min

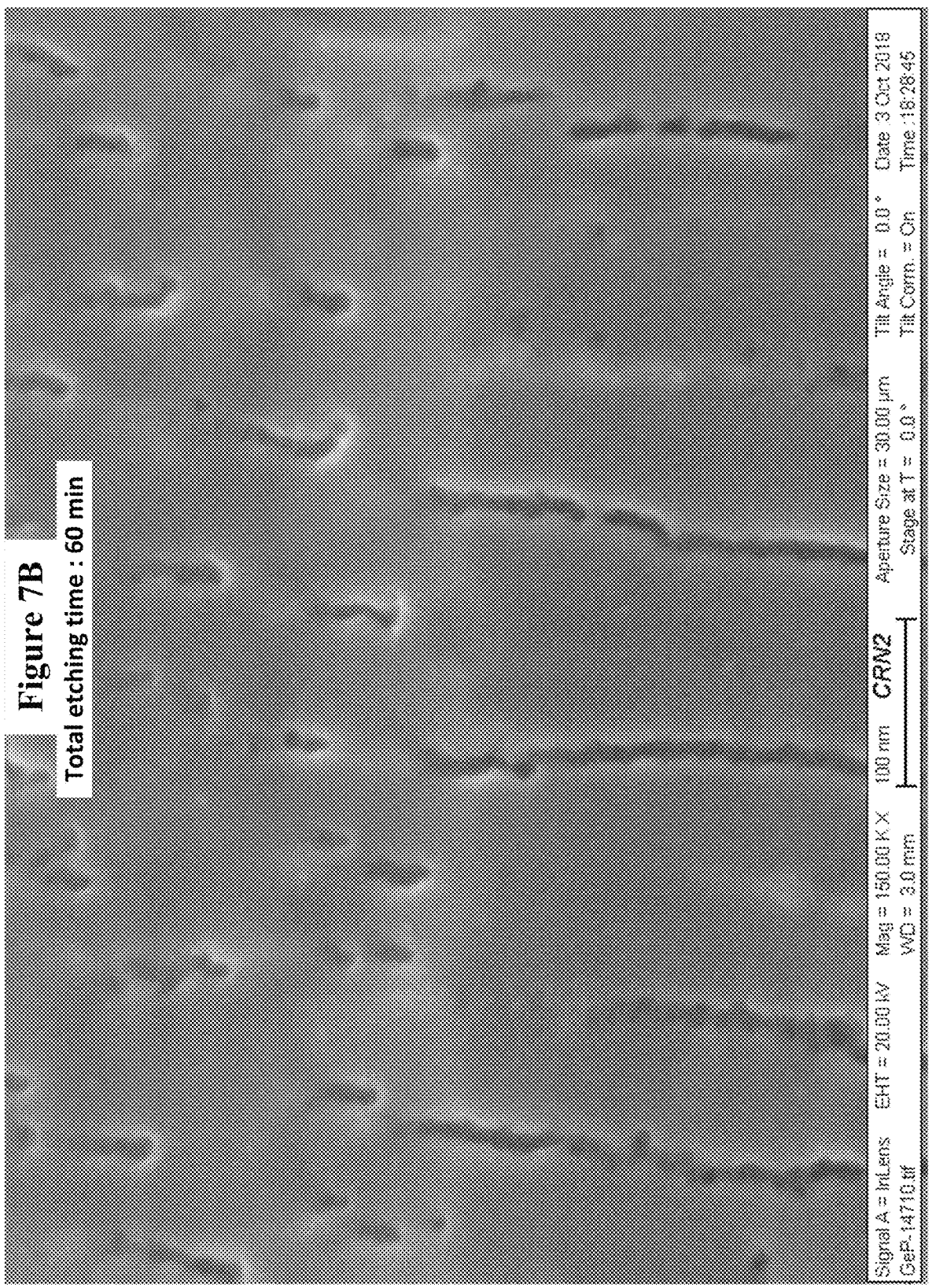

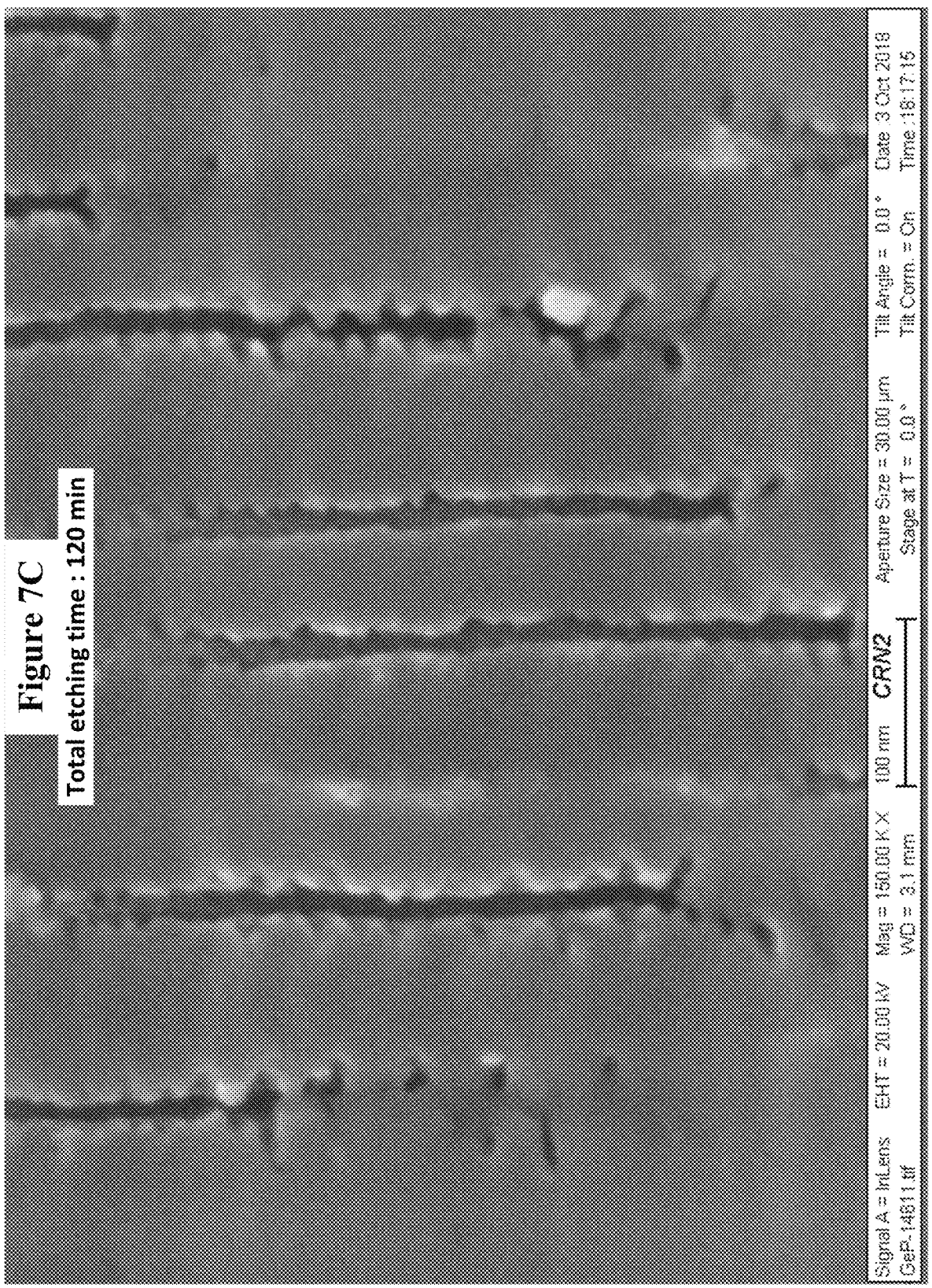

Total etching time : 180 min

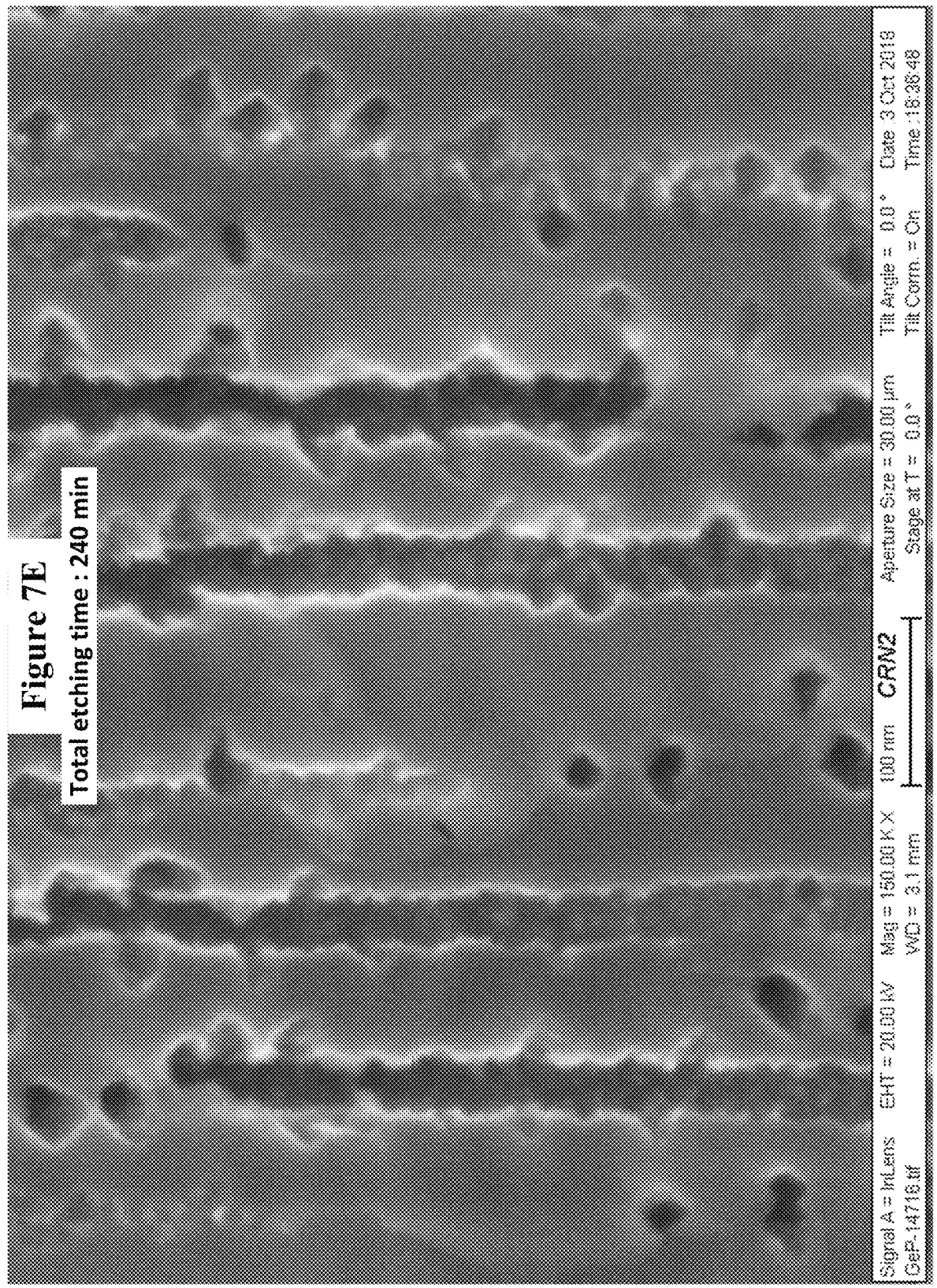

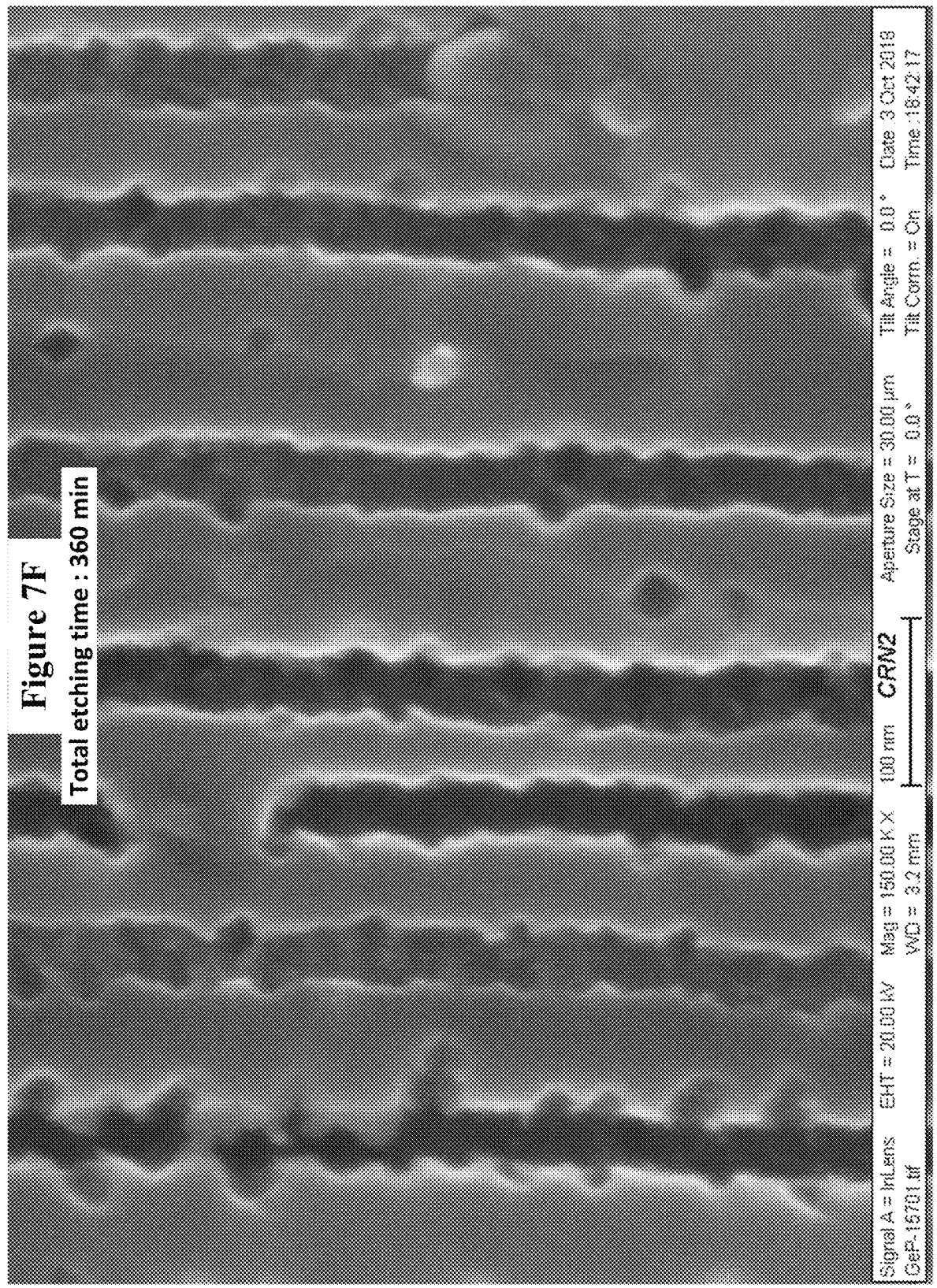

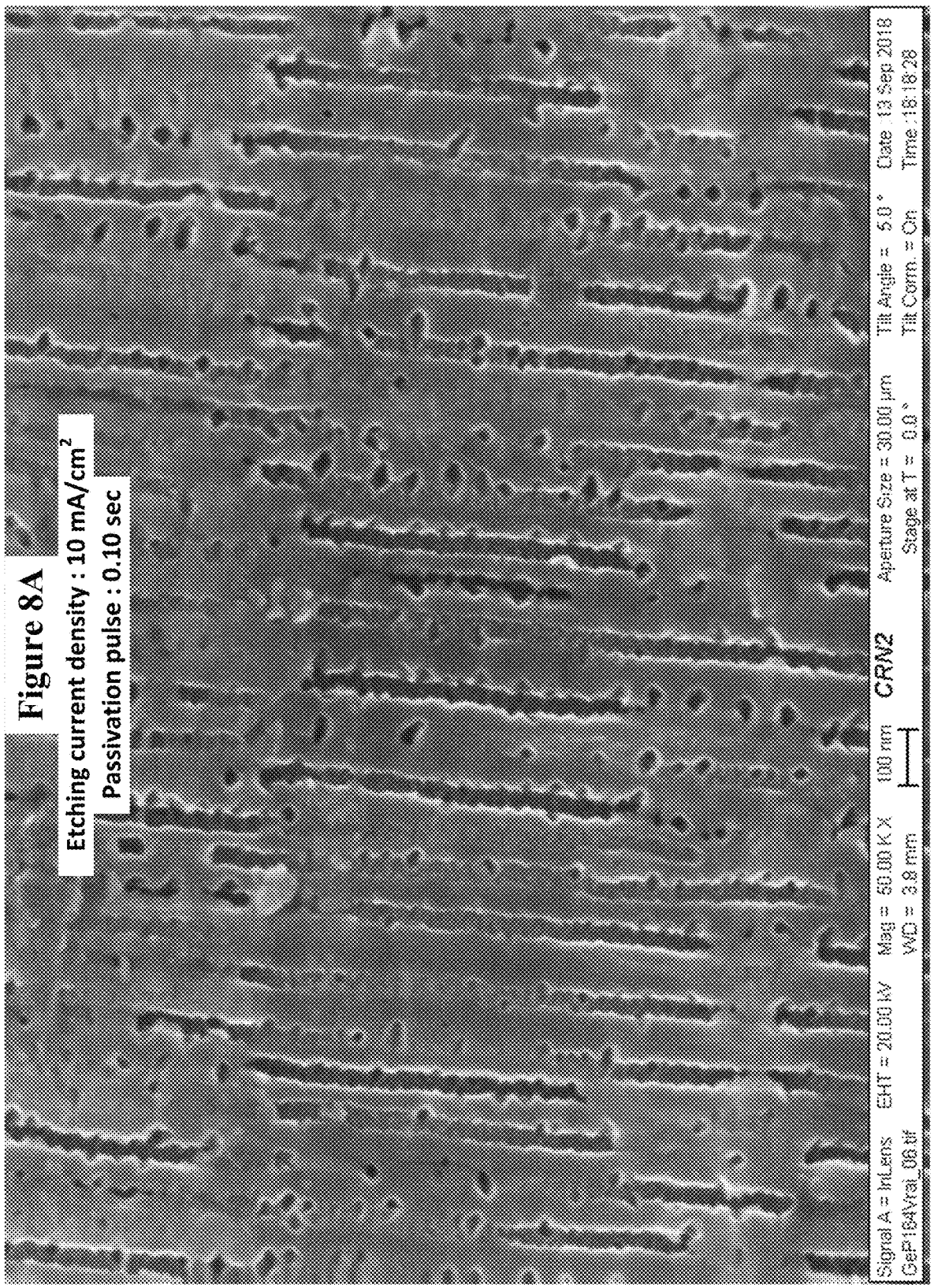

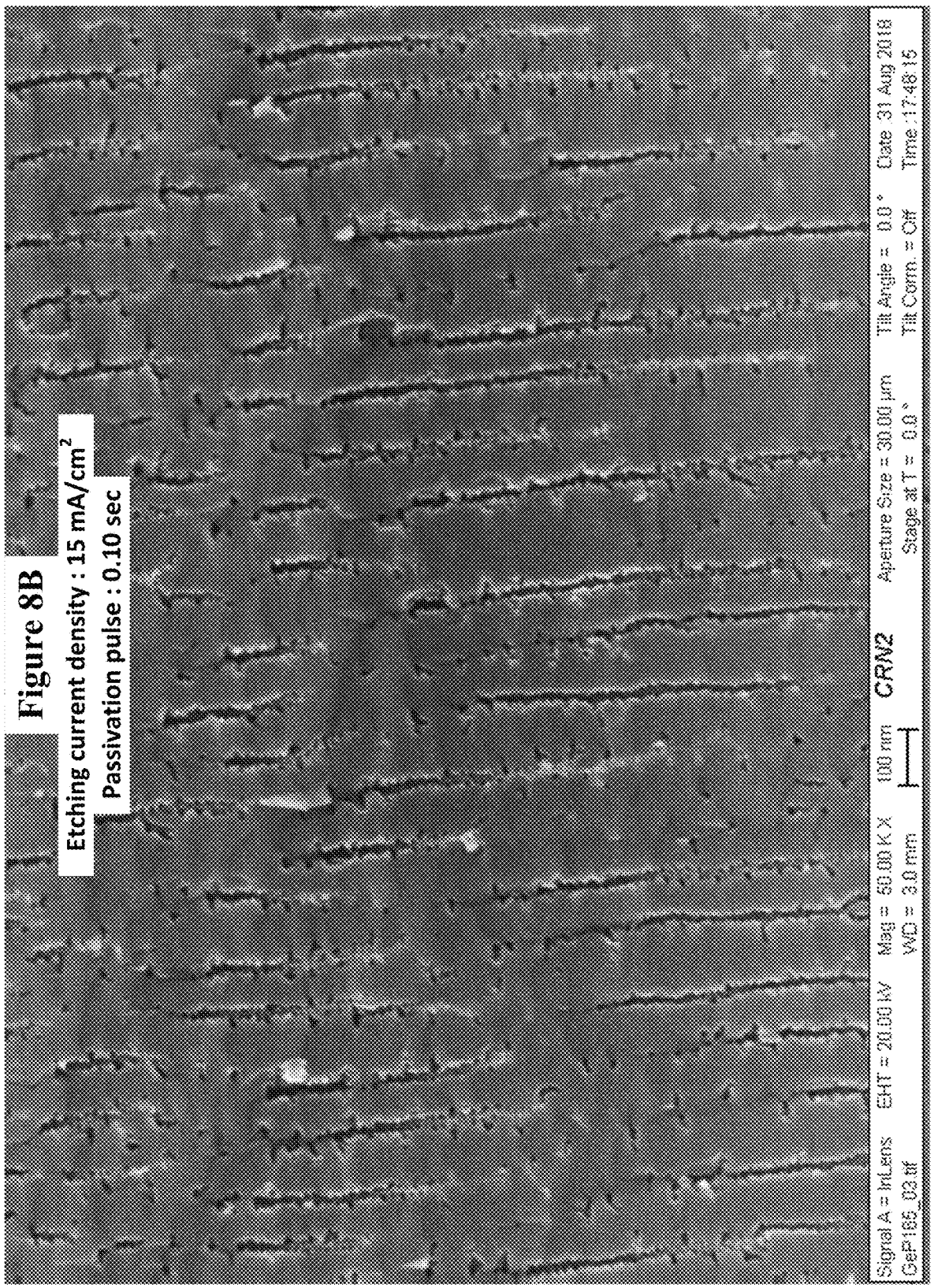

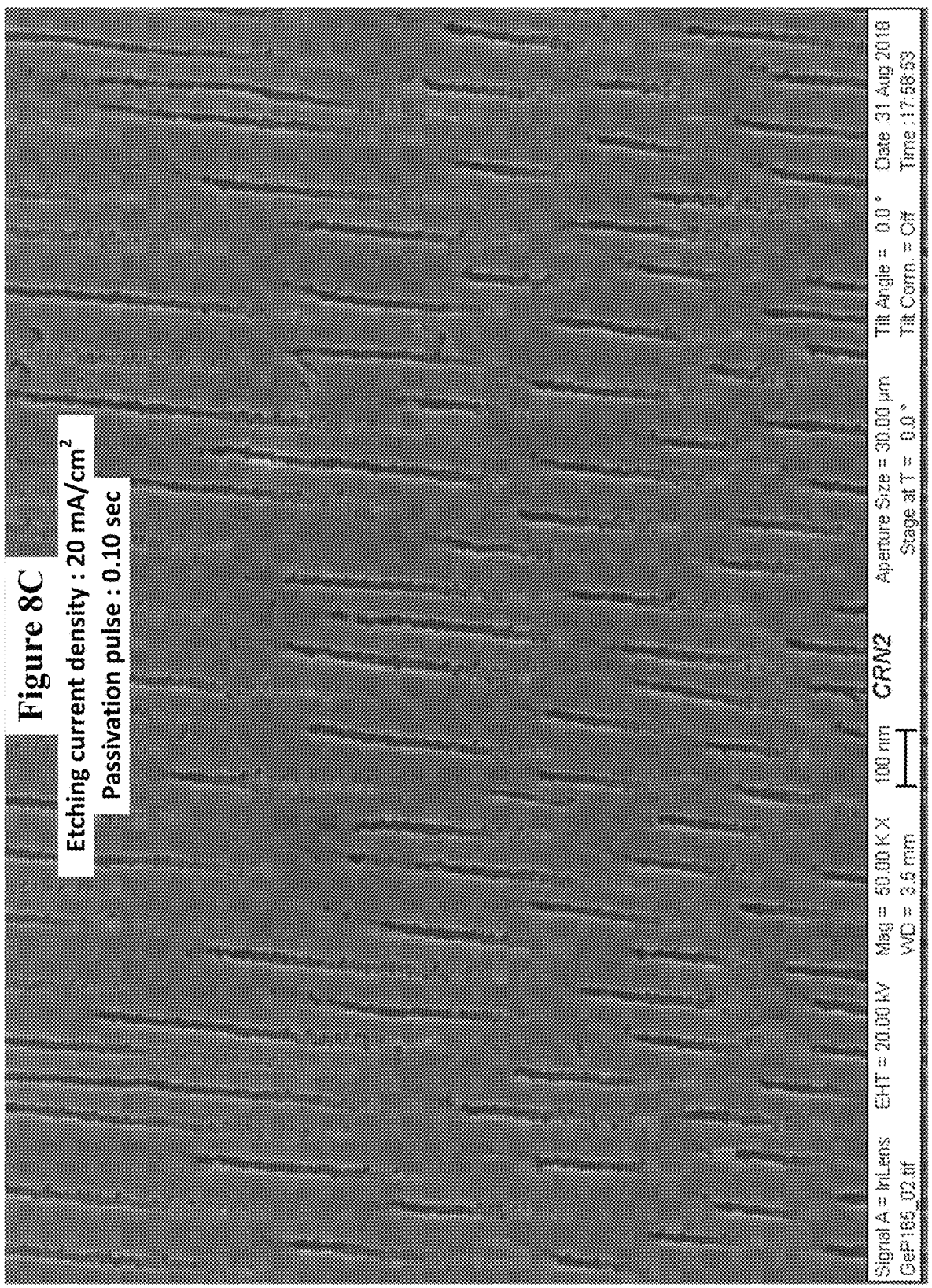

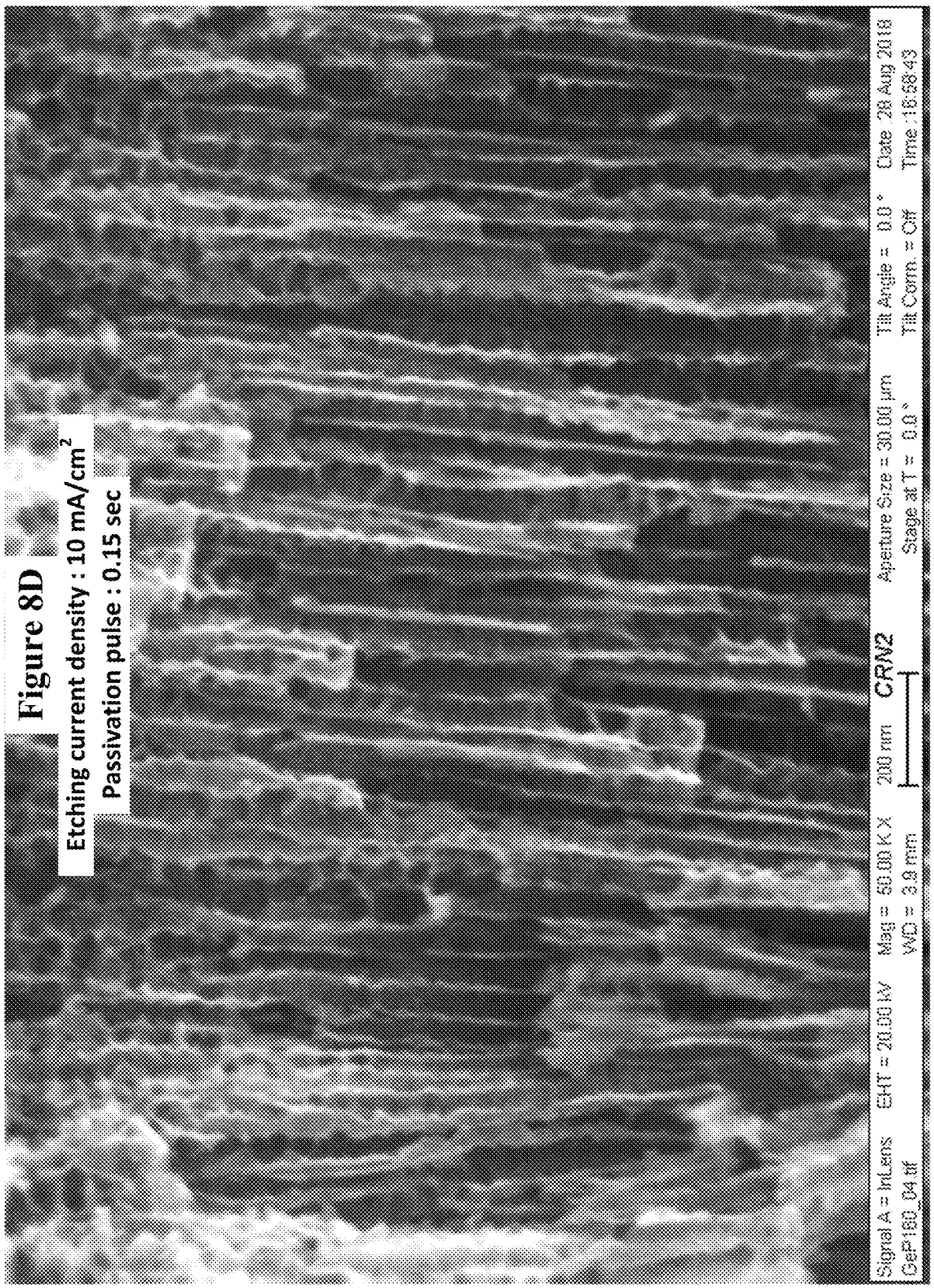

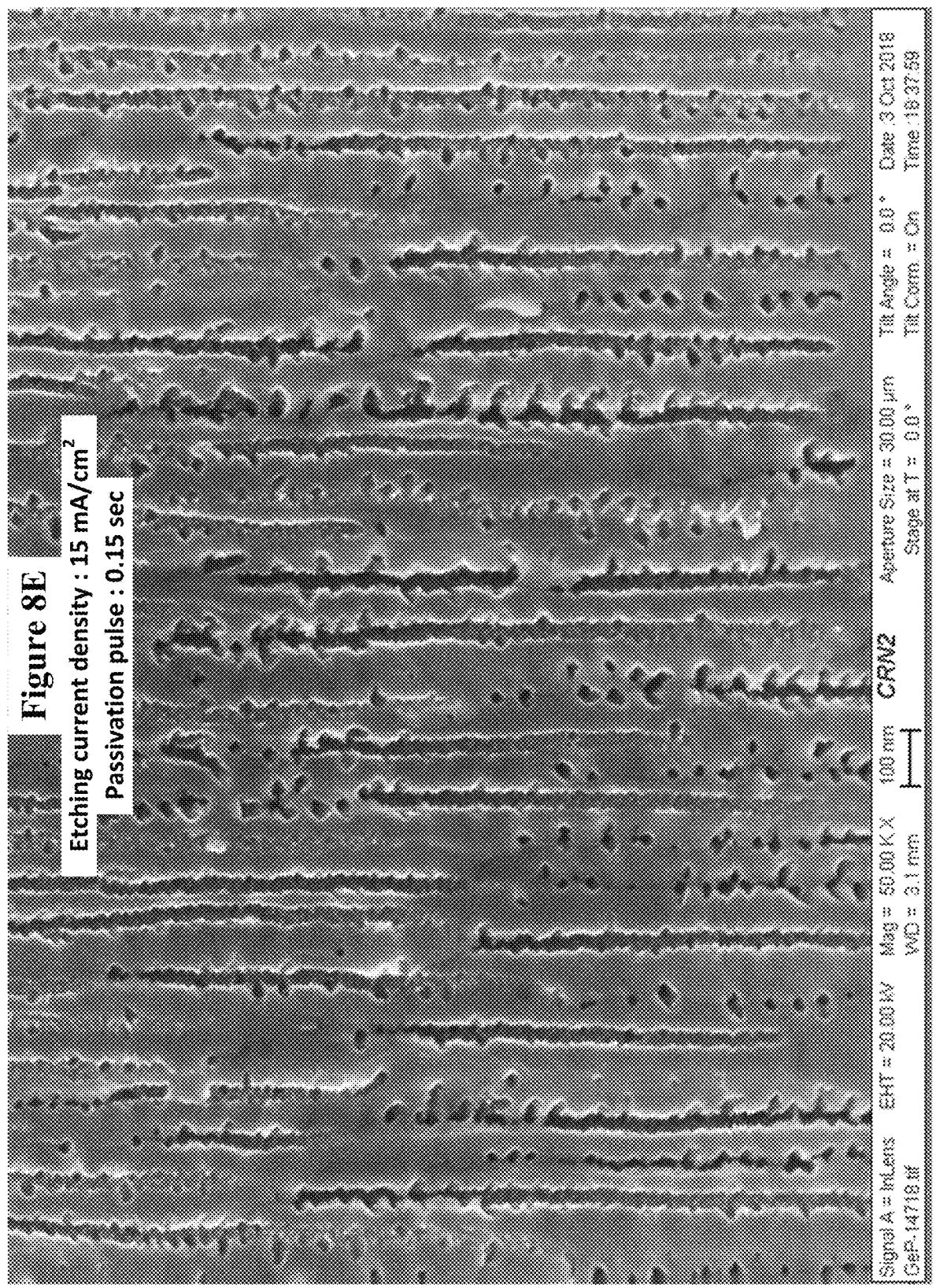

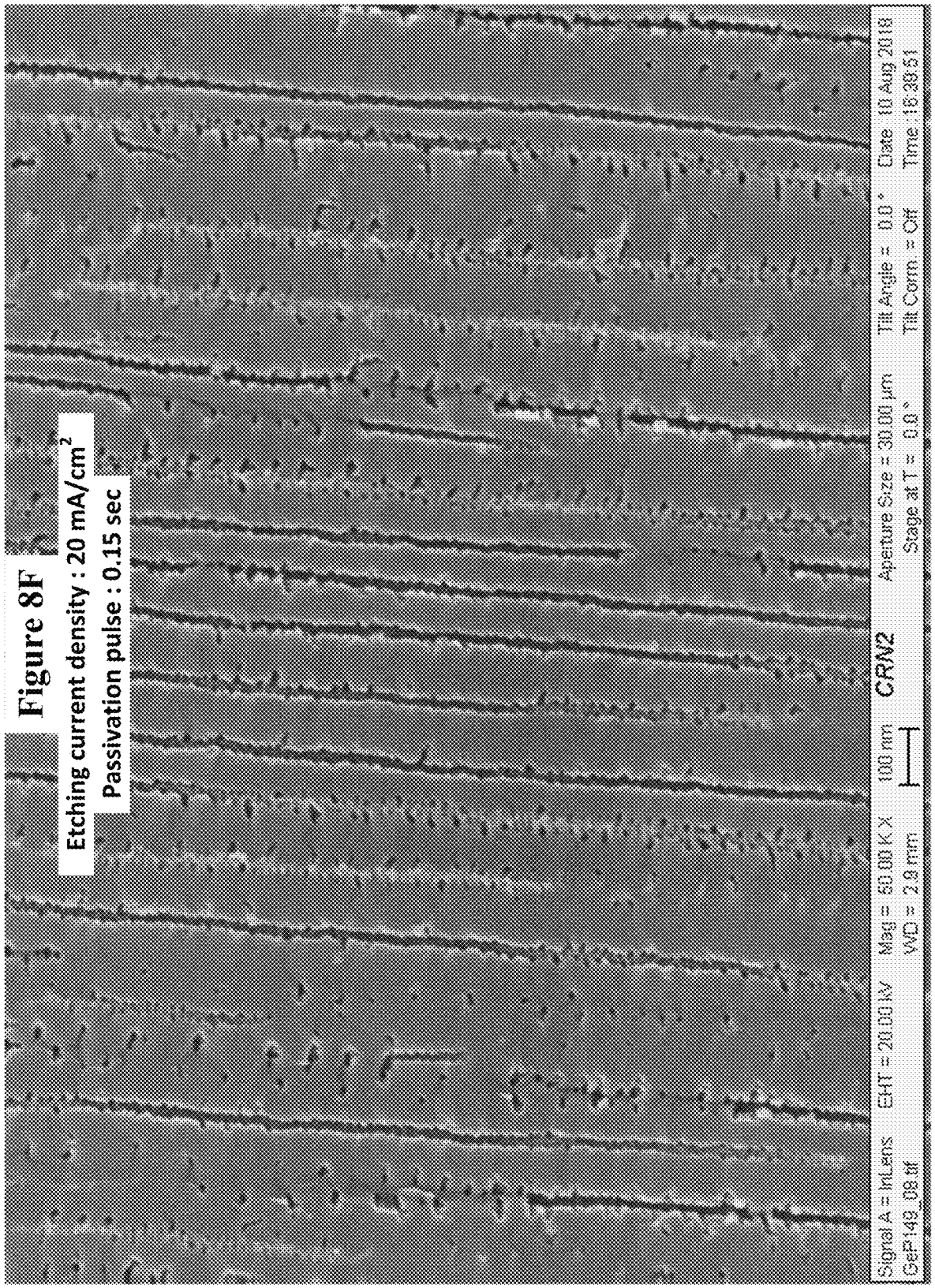

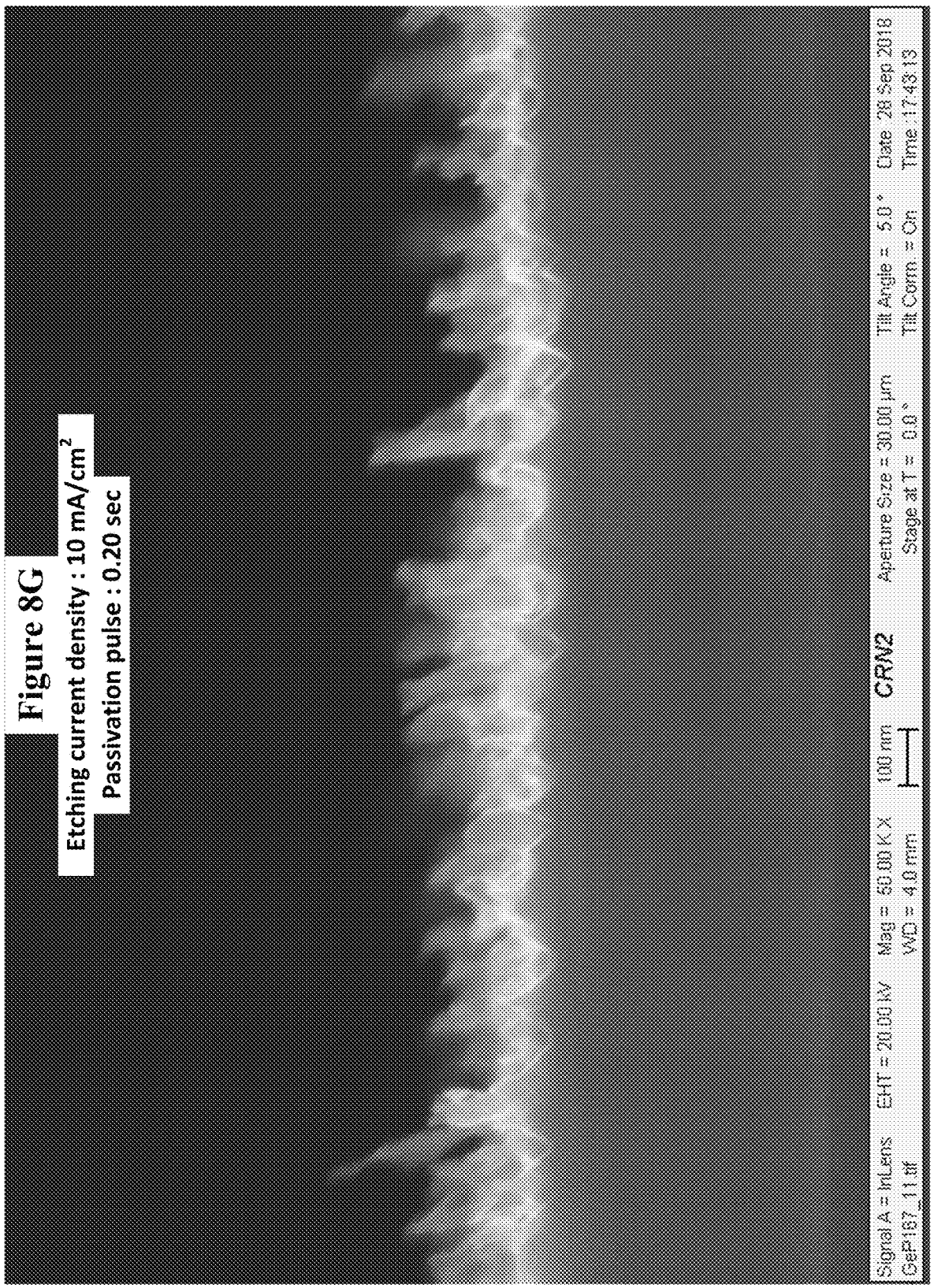

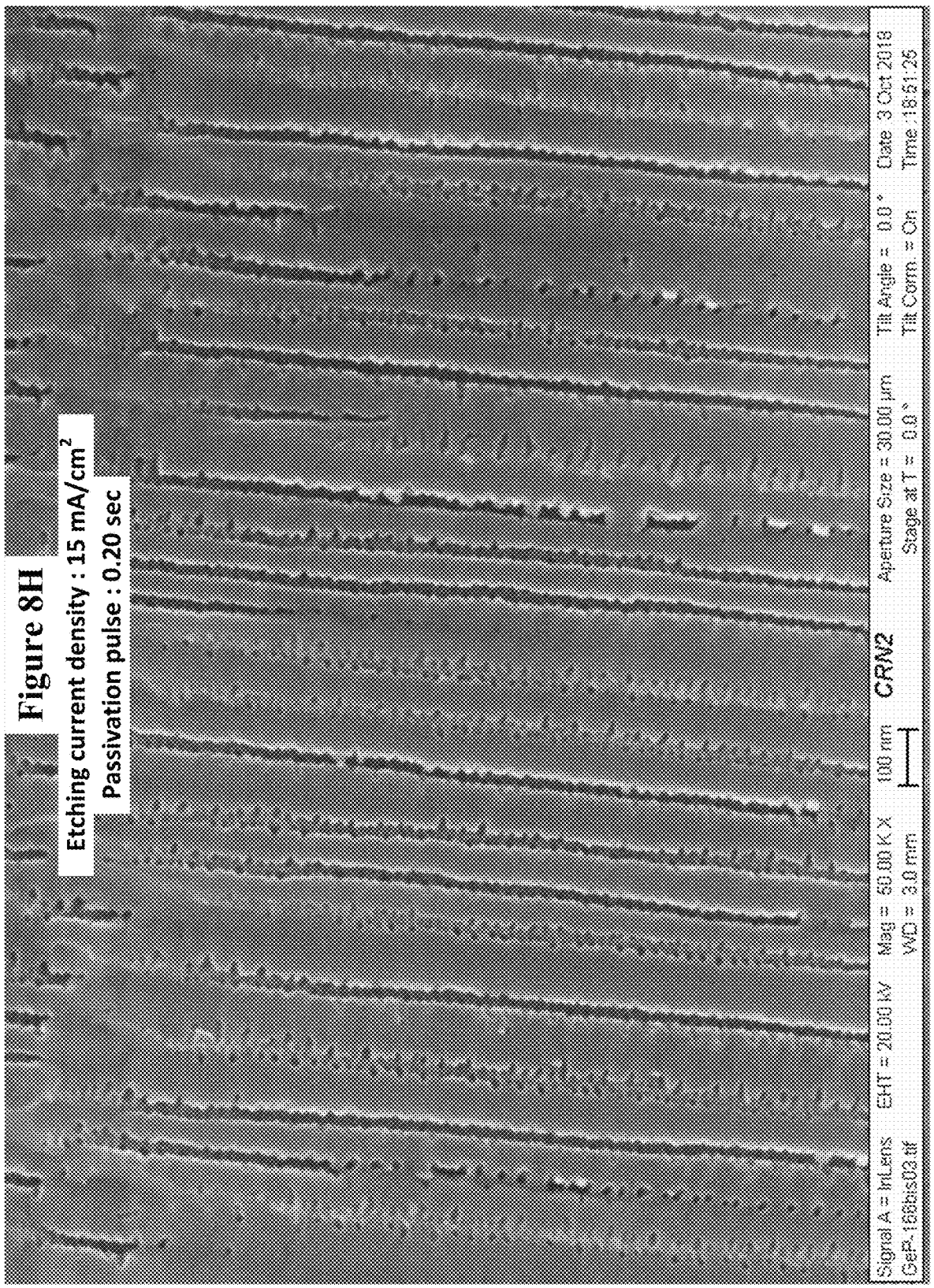

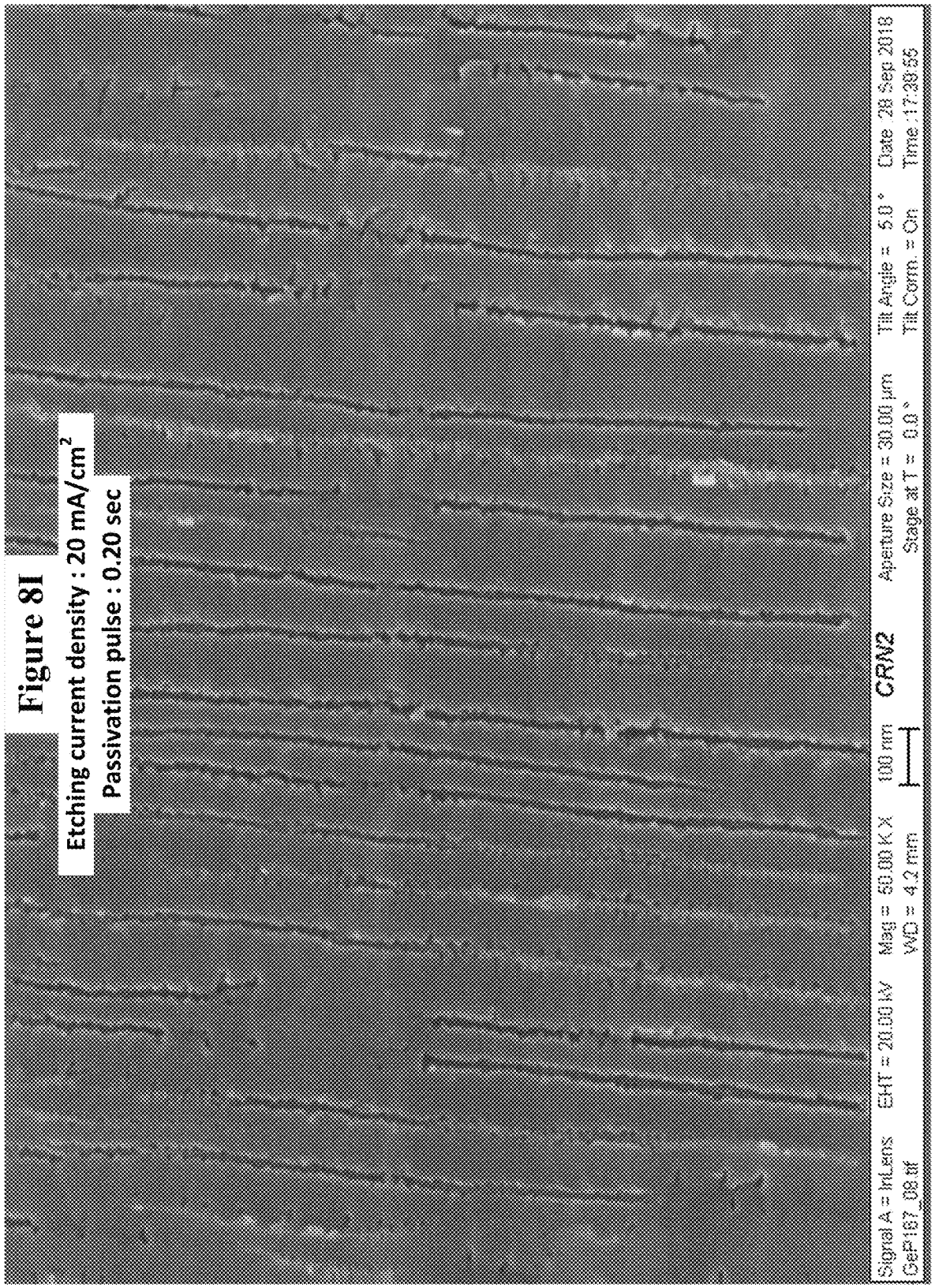

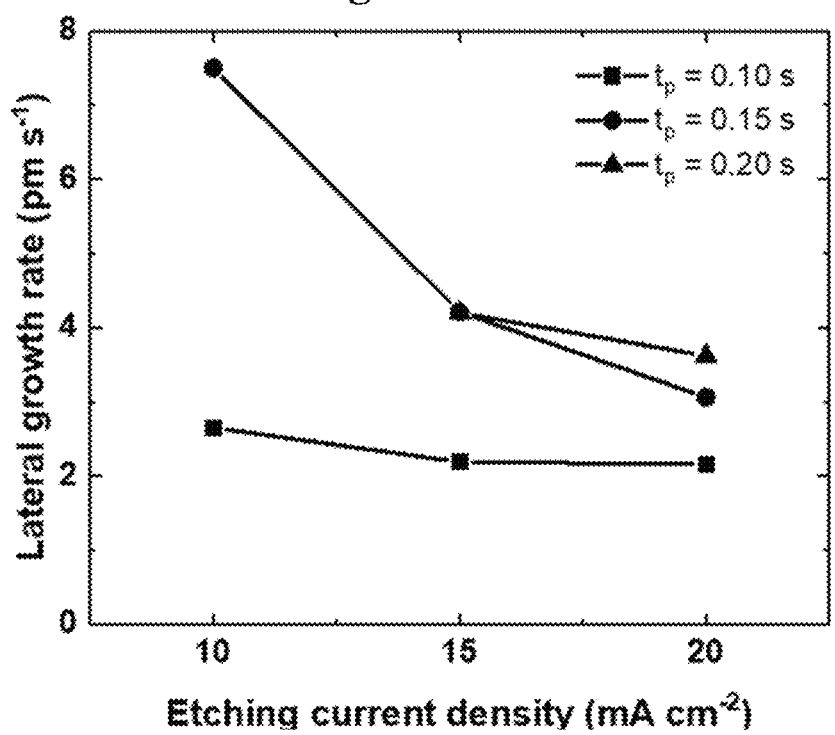

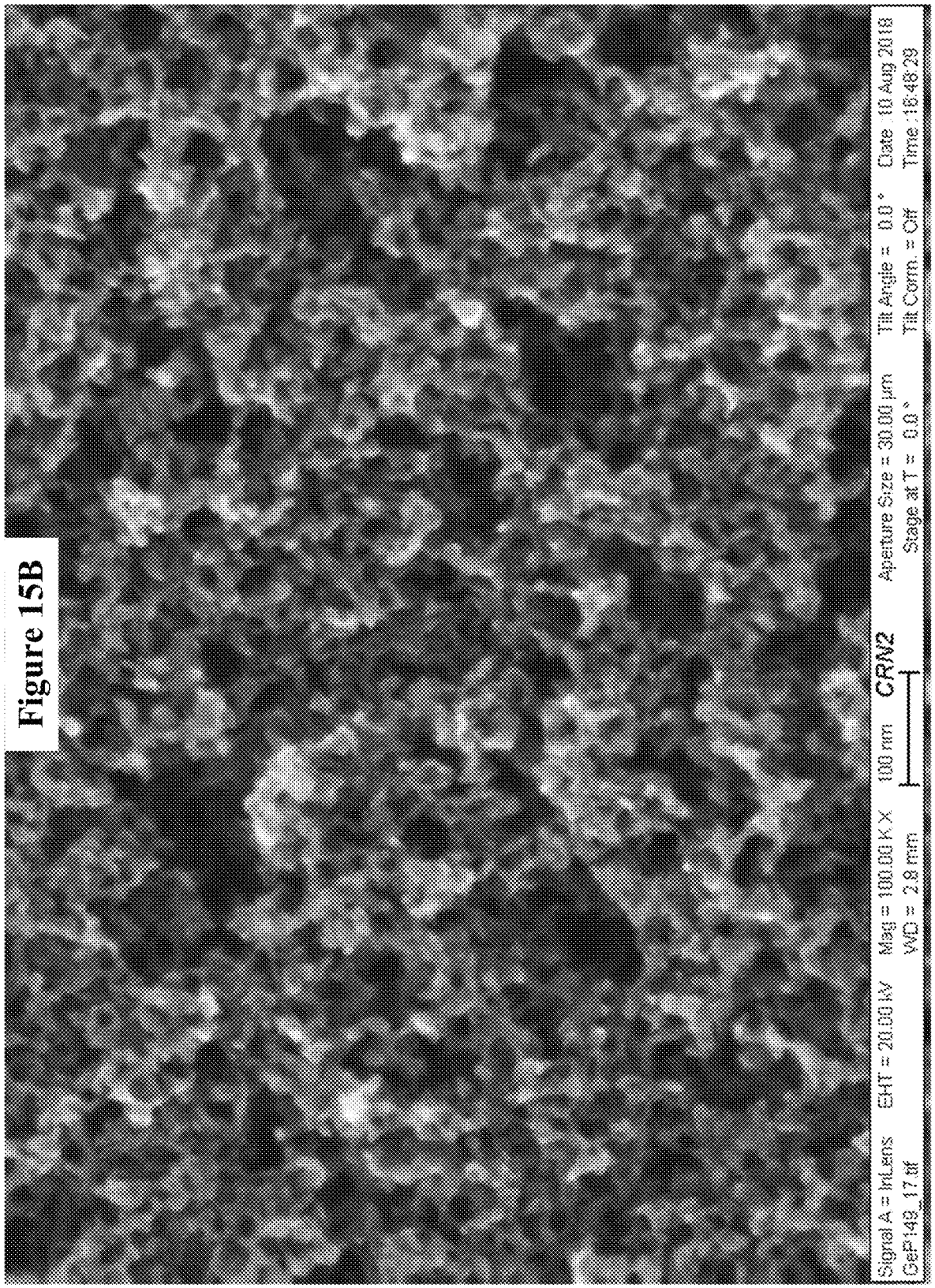

Total etching time : 30 min

Total etching time : 60 min

Total etching time : 120 min

Total etching time : 180 min

Total etching time : 240 min

Total etching time : 360 min

Figure 20

| Morphology | Discharge current (mA·cm⁻²) | Discharge time (min) | Cycling lifespan | Initial Coulombic efficiency (%) | Average Coulombic efficiency (%) |
|---|---|---|---|---|---|
| Spongious | 2 | 30 | 280 | 65.7 | 98.7 |
| Spongious/ Carbon | 0.2 | 300 | 1000 | 79.4 | 98.9 |
|  | 2 | 30 | 382 | 62 | 98.3 |
|  | 5 | 1 | 4000 | - | - |
| Tubular | 2 | 30 | 220 | 85.02 | 98.9 |
|  | 5 | 1 | 47 | - | - |
| Columnar | 2 | 30 | 398 | 95.7 | 98.4 |
|  | 5 | 1 | 1200 | - | - |

ANISOTROPIC POROUS GERMANIUM NANOSTRUCTURES ACHIEVED WITH FAST BIPOLAR ELECTROCHEMICAL ETCHING AND CHEMICAL ETCHING

TECHNICAL FIELD

This patent application relates to germanium batterie anodes and more particularly to their nanostructuration process.

BACKGROUND

Nanostructuration of semiconductors it is already well implemented in industrial manufacturing settings where electrochemical etching has been successfully used to produce various porous battery anodes with silicon, for example. Though silicon-based anodes are sought after for lithium-ion batteries due to its high specific capacity, its significant isotropic volume expansion during lithiation (up to 400%) can affect the anode's stability and viability. Therefore, many are using and developing anodes for lithium-ion batteries with porous germanium as an interesting and promising alternative due to its high carrier mobility, fast Li-ion diffusion rate, low charge/discharge potential, lower isotropic volume expansion (around 150%) during lithiation process and more. For these reasons, porous germanium has been used as part of the active material of the anode of lithium-ion batteries. For example, germanium was used for an on-chip anode in the patent US20200036003A1. In some cases, the germanium was porosified and/or nanostructured to increase the efficiency and/or stability of the resulting anodes as presented, for example, by Kwon et al. (DOI: 10.1016/j.jpowsour.2017.11.044), Jia et al. (DOI: 10.1021/cm$^{5025124}$) and Choi et al. (DOI: 10.1002/smll.201603045) that all have produced lithium-ion batteries with porous (mesoporous) germanium-based anodes. Methods of electrochemical etching of germanium to produce structured/porous germanium were presented, for example, by Rojas et al. (DOI: 10.1149/1.3147271), Uhlir (DOI: 10.1002/j.1538-7305.1956.tb02385.x) and Fang et al. (DOI: 10.1016/j.jelechem.2006.02.021).

In order to improve the integration of porous germanium in devices employing solid, viscous or liquid electrolytes, which requires a better accessibility to the surface of the electrode, it would be necessary to develop more anisotropic morphologies ideally with thicker and more homogeneous layers of tubular like pores. Though, maintaining the nanostructure while increasing the thickness was not possible using CBEE, Bioud et al. (DOI: 10.1016/j.electacta.2017.02.115) developed the fast bipolar electrochemical etching (FBEE) method that enabled producing thicker and more homogeneous layers of mostly isotropic mesoporous germanium. This method of FBEE was perfected by Dupuy et al. (DOI: 10.1016/j.mtcomm.2020.101820) to produce mostly isotropic mesoporous germanium and to introduce the idea of using it as a monolithic on-chip anode, where the remaining bulk inferior germanium layer following the etching process could be used as the current collector of the anode. Such a fast bipolar electrochemical etching as not yet been used to generate mesoporous germanium having more complex and more structured porosity with a resulting higher anisotropy, such as tubular porous germanium. Furthermore, the possibility of combining such a fast bipolar electrochemical etching with additional etching method, such as chemical etching, as not yet been proposed for germanium nanostructuration.

SUMMARY

The applicant as developed a method of synthesizing germanium with anisotropic tubular and/or columnar mesoporous morphologies using a novel combination of fast bipolar electrochemical etching (FBEE) followed by a chemical etching, where the FBEE allows to generate novel tubular porous germanium and where the chemical etching is used to transform at least a portion of this tubular porous germanium it into a novel columnar porous germanium.

The method comprises setting up a nucleation etching process to induce nucleation sites with a desired spacing on a first side of a germanium substrate, etching the germanium substrate to produce porous germanium with pores extending into its first side and said nucleation sites with a fast bipolar electrochemical etching, and etching the resulting porous germanium to produce columnar germanium with a chemical etching step. The fast bipolar electrochemical etching step comprises submerging the germanium substrate in an etching electrolyte, applying etching pulses on its first side, and applying passivation pulses. The chemical etching step comprises controlling a concentration of a chemical etching solution comprising an acid, an oxidization agent and an optionally a surfactant, and controlling a dipping time of the porous germanium in this chemical etching solution. In this fast bipolar electrochemical etching step, the etching pulses create an intensified electrical current at a bottom of the pores with reduced current along their sidewalls, the passivation pulses then create a passivation layer on the sidewalls of the pores that protects them from dissolution and porosification during the following etching pulses. Therefore, the following etching pulses cause the pores to assume tubular shape. In the chemical etching step, the concentration and the dipping time are controlled to produce columnar germanium by enlarging the tubular pores resulting from the previous step to at least partly merge with the neighboring tubular pores, therefore leaving columns of germanium extending upwardly from germanium substrate.

In some embodiments, the etching pulses can have a pulse duration between 0.001 and 0.5 seconds, can have an etching current density between 0.1 and 100 mA/cm$^2$ and can have total etching time of between 0.03 seconds and 450 minutes. In some embodiments, the passivation pulses can have a passivation current density between 0.1 and 100 mA/cm$^2$, and can have a passivation pulse duration between 0.001 and 10 seconds. In some embodiments, the fast bipolar electrochemical etching step can be applied on said germanium substrate for a total porosification time between 1 and 900 minutes.

In a preferred embodiment, the etching electrolyte can be a hydrofluoric-based etching electrolyte. In a preferred embodiment, the total porosification time can be further controlled between 30 and 360 minutes. In a preferred embodiment, the etching current density can be further controlled between 10 and 30 mA/cm$^2$. In a preferred embodiment, the passivation pulse duration can be further controlled between 0.1 and 0.2 seconds. In a preferred embodiment, the passivation current density can be further controlled between 30 and 60 mA/cm$^2$.

In a preferred embodiment consisting of a combination of the previously mentioned preferred embodiments, where the total porosification time can be further controlled between 30 and 360 minutes; the fast bipolar etching pulses having a pulse duration of about 0.05 seconds; the etching current density can be further controlled between 10 and 30 mA/cm$^2$; the passivation pulse duration can be further controlled between 0.1 and 0.2 seconds; the passivation current density can be further controlled between 30 and 60 mA/cm$^2$; the concentration of a chemical etching solution can be further controlled between 3 and 5 M; the dipping time can be further controlled between more than 1 and 30 seconds.

In some embodiments, the acid of the chemical etching solution can be hydrofluoric acid, the concentration of the chemical etching solution can be between 1 µM and 27.46 M of hydrofluoric acid, and the dipping time can be between 0.001 and 900 seconds. In a preferred embodiment, the chemical etching solution can consist of a mix of hydrofluoric acid; hydrogen peroxide acting as the oxidization agent and acetic acid acting as a surfactant having dilution ratio of 1:2:3, respectively. In a preferred embodiment the dilution of said chemical etching solution can be controlled with deionized water.

In a preferred embodiment, the nucleation etching can consist of submerging the germanium substrate in a hydrofluoric-based etching electrolyte and applying a nucleation etching current of about 10 mA/cm$^2$ for between 30 and 60 seconds. In a preferred embodiment, the germanium substrate can be a substrate of type-p germanium wafer doped with gallium having a crystal orientation of 100 and a resistivity of between about 1 and 40 mΩ·cm. In a preferred embodiment, the columnar germanium can be coated with a carbon-based material which can be a carbon or graphene for example. In a preferred embodiment, the concentration of a chemical etching solution can be further controlled between 0.92 and 1.53 M of hydrofluoric acid. In a preferred embodiment, the dipping time can be further controlled between 1 and 30 seconds.

The present specifications further present a battery comprising: a cathode; an electrolyte; and an anode comprising at least one monolithic nanostructured germanium substrate having a structure of columnar germanium resulting from a combination of fast bipolar electrochemical etching and a chemical etching. This monolithic nanostructured germanium substrate comprises a structure of columnar germanium protruding from one side of a germanium substrate. In this battery setting, the structure of columnar germanium is the active material of the anode and the germanium substrate is structured to allow its expansion during lithiation to prevent inducing a compression force between the columns of germanium that would result in structural defects.

In some embodiments, the electrolyte of the battery can be lithium and the structure of columnar germanium can have dimensions less than 100 nanometers in two of said dimensions to prevent them from cracking upon their lithiation. In some of the preferred embodiments, the columnar germanium of the lithium battery can have a length of between 0.5 and 10 micrometers. In some embodiments, the structure of columnar germanium of the lithium battery can be coated with a carbon-based material which can be a carbon or graphene for example. In some embodiments, the at least one monolithic nanostructured germanium substrate of the lithium battery can be coated with a carbon-based material which can be a carbon or graphene for example.

BRIEF DESCRIPTION OF THE DRAWINGS

The invention will be better understood by way of the following detailed description of embodiments of the invention with reference to the appended drawings, in which:

FIG. 1A shows schematic illustration of the two processes, electrochemical and chemical etching, used to synthesize tubular and columnar porous germanium.

FIG. 1B shows schematic illustration of an electrochemical cell used for the proposed fast bipolar electrochemical etching.

FIG. 1C shows schematic illustration of a bath used for the proposed further chemical etching.

FIG. 2B shows a ×7.5 magnification of the cross-section SEM views of porous germanium sample of FIG. 2A with resistivity of 8 mΩ·cm.

FIG. 5C shows cross-section SEM views of various porous germanium with sponge-like and/or tubular morphologies, etched during 120 min with an etching current density of 25 mA/cm$^2$.

FIG. 7B shows cross-sectional SEM views of porosified germanium having a full electrochemical etching time of 60 minutes and an etching current density of 15 mA·cm$^{-2}$.

FIG. 7C shows cross-sectional SEM views of porosified germanium having a full electrochemical etching time of 120 minutes and an etching current density of 15 mA·cm$^{-2}$.

FIG. 7E shows cross-sectional SEM views of porosified germanium having a full electrochemical etching time of minutes and an etching current density of 15 mA·cm$^{-2}$.

FIG. 7F shows cross-sectional SEM views of porosified germanium having a full electrochemical etching time of 360 minutes and an etching current density of 15 mA·cm$^{-2}$.

FIG. 8A shows cross-section view SEM images for a current density of 10 mA/cm$^2$ and passivation pulse duration of 0.10 s.

FIG. 8B shows cross-section view SEM images for a current density of 15 mA/cm$^2$ and passivation pulse duration of 0.10 s.

FIG. 8C shows cross-section view SEM images for a current density of 20 mA/cm$^2$ and passivation pulse duration of 0.10 s.

FIG. 8D shows cross-section view SEM images for a current density of 10 mA/cm$^2$ and passivation pulse duration of 0.15 s.

FIG. 8E shows cross-section view SEM images for a current density of 15 mA/cm$^2$ and passivation pulse duration of 0.15 s.

FIG. 8F shows cross-section view SEM images for a current density of 20 mA/cm$^2$ and passivation pulse duration of 0.15 s.

FIG. 8G shows cross-section view SEM images for a current density of 10 mA/cm$^2$ and passivation pulse duration of 0.20 s.

FIG. 8H shows cross-section view SEM images for a current density of 15 mA/cm$^2$ and passivation pulse duration of 0.20 s.

FIG. 8I shows cross-section view SEM images for a current density of 20 mA/cm$^2$ and passivation pulse duration of 0.20 s.

FIG. 9G shows the evolution of lateral growth rate in function of etching current density with a passivation pulse duration of 0.1 s, 0.15 s and 0.2 s.

FIG. 15B shows a cross-section SEM and zoom-in view of germanium with a porous structure.

FIG. 20 shows the results of various on-chip anodes when integrated in batteries in a CR2032 configuration.

DETAILED DESCRIPTION

The following is a detailed description of embodiments of the disclosure depicted in the accompanying drawings. The embodiments are in such detail as to clearly communicate the disclosure without limiting the anticipated variations of the possible embodiments and may encompass all modifications, equivalents, combinations and alternatives falling within the spirit and scope of the present disclosure. It will be appreciated by those skilled in the art that well-known methods, procedures, and components may not have been described in detail in the following so as not to obscure the specific details of the disclosed invention.

The present disclosure relates to a method of producing anisotropic mesoporous germanium morphologies using a new approach for nano-structuring based on a perfected fast bipolar electrochemical etching to produce tubular porous germanium and a novel combination of this perfected fast bipolar electrochemical etching followed by a chemical etching process developed by the applicant to produce novel columnar porous germanium. In some embodiments, as summarized in the schematic representation of FIG. 1A, this can allow synthesizing a tubular porous germanium 1002 with fast bipolar electrochemical etching in a specific controlled regime and can allow to produce columnar porous germanium 1003 by chemically etching the tubular porous germanium 1002 resulting from this previous fast bipolar electrochemical etching. The synthesis of tubular porous germanium 1002 may be controlled for optimizing the resulting product by modifying an etching current density, an etching pulse duration, a passivation current density, a passivation pulse duration and a total porosification time, herein defined as the total time of both all of the etching pulses (total etching time) and all of the passivation pulses. It will be appreciated that the total porosification time does not include optional pauses without current applied between the alternating etching pulses and passivation pulses. The total porosification time therefore includes the total etching time which is corresponding to sum of the etching pulse durations of all the etching pulses applied during fast bipolar electrochemical etching.

A subsequent further chemical etching may be used to modify (over-etching) a tubular porous morphology which can create columnar porous germanium 1003 that, as well as offering a more opened porosity with lower specific surface, can help ensure that the matrix dimension of germanium is less than about 100 nm in at least two dimensions to prevent cracking upon lithiation as suggested by Liang et al. (10.1021/nn400330h).

Figure 1D:
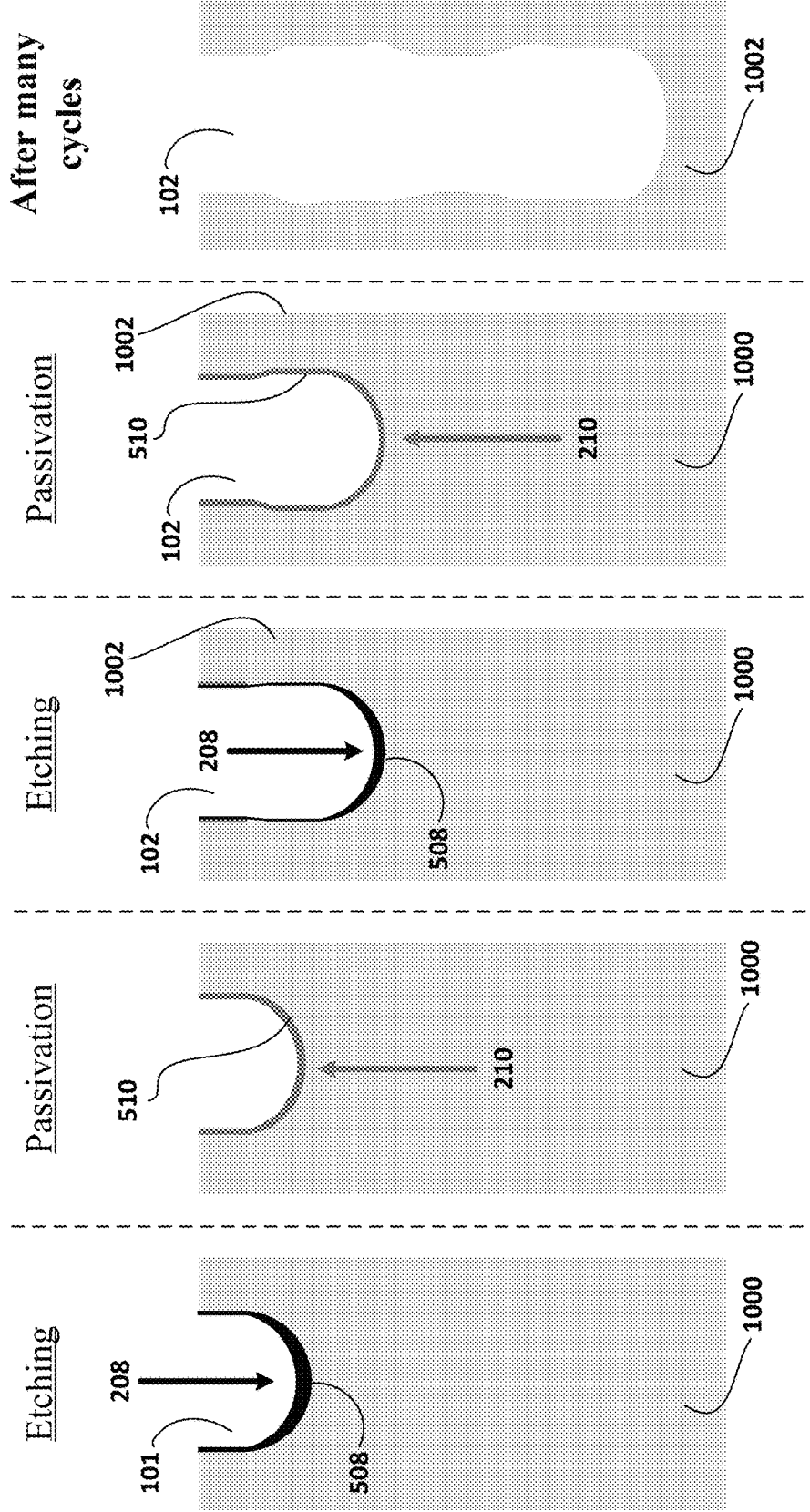
FIG. 1D is a schematic representation of the influence and interaction of between the etching and passivation pulses that can be controlled during the fast bipolar electrochemical etching to produce tubular pores.

Applicant developed a method of controlling the etching pulses and the passivation pulses of a fast bipolar electrochemical etching method to control the rate of etching of the walls of the pores to produce a tubular porosity in germanium. FIG. 1D can help illustrate the influence and interaction of between the etching and passivation pulses that can be controlled during the fast bipolar electrochemical etching to produce tubular pores. As it will be further detailed in later sections of the specifications and as illustrated by the concentration of etching current 508, the etching pulses 208 induce a charge transfer at the electrolyte/electrode interface, with a maximum of current density at the bottom of the pore 101, where an intensified electrical field is localized. In this aspect, current density reduces along the pore sidewalls due to a decreased electric field and larger depletion area within the germanium. The passivation pulses 210 create a passivation layer 510, which can be a hydrogen layer in some embodiments, on the surface of the pores 101. This passivation layer 510 then allows to protect against a certain amount of etching current, meaning that the sidewalls of the pores 101 or tubular pores 102 can sustain the reduced current along the sidewalls and can prevent short etching pulses 208 from penetrating through the passivation layer 510 on the sidewalls, therefore preventing any significant etching of the sidewalls. On the other hand, the etching pulses 205 have no problem etching through the passivation layer 510 at the bottom of the pores 101 or tubular pores 102 due to the intense etching current concentrated there.

Applicant also found that synthesis of columnar porous germanium 1003 can be optimized by controlling the concentration of a chemical etching solution and by adjusting the sample exposure (dipping) time of the chemical etching. Being a catalytic substrate for the growth of the carbon-based material, in some embodiments the porous germanium can be coated with a carbon-based material to mitigate the formation of the solid electrolyte interface (SEI) and, therefore, enhance the battery performances as demonstrated herein. Without limiting possible variations of alternative embodiments, carbon or graphene is used for coating the porous germanium in the preferred embodiments. Applicant as obtained better electrochemical behaviors of the resulting porous germanium morphologies as on-chip electrodes for battery lithium-ion compared to the performances presented in the prior art as will be shown in cyclic voltammetry and galvanostatic results. It will be appreciated that the porous germanium structure resulting to the proposed method can be structured to reduce mechanical deformation during lithiation process and therefore minimize electrode pulverization.

In some embodiments, the porous germanium can be used as an anode for a battery. In some embodiments, the battery may be a lithium-ion, a lithium metal, lithium-sulfur, sodium or various type of batteries. In some embodiments, the columnar porous germanium can be used as a monolithic on-chip anode, where the columnar porous portion (anisotropic structured section) of the germanium substrate can be used as the active material to be lithiated of the anode and where the remaining bulk portion of the germanium substrate can be used as the current collector of the anode. Since germanium have a high electrical mobility which permits to apply large ranges of discharge rate, high energy and high-power characteristics can be reached with such a monolithic arrangement. In some embodiments, the anode using the columnar porous germanium may have a matrix dimension in at least two dimensions of less than about 100 nm to prevent cracking upon lithiation.

The FBEE which consists of an improved and adapted version of the methods fast bipolar electrochemical etching previously presented in the literature. Applicant can produce porous germanium, which can comprise in part of tubular porous germanium, ideal for further etching into columnar porous germanium by controlling some parameters of the fast bipolar electrochemical etching process. In some embodiments, an initiation etching (nucleation etching step) can be used before the FBEE process to increase the nucleation sites over the surface of the substrate to allow for an homogeneous porosification. In some embodiments, the controlled parameters of the fast bipolar electrochemical etching can be a total porosification time that can be between about 1 and 900 minutes (between about 30 and 360 minutes in the preferred embodiments), an etching current density that can be between about 0.1 and 100 mA/cm$^2$ (between about 10 and 30 mA/cm$^2$ in the preferred embodiments), an etching pulses duration between about 0.001 and 0.5 second (around 0.05 seconds in the preferred embodiments), a total etching time between about 0.03 seconds and 450 minutes, a passivation pulses duration between about 0.001 and 10 seconds (between about 0.1 and 0.2 seconds in the preferred embodiments) as well as a passivation current density between about 0.1 and 100 mA/cm$^2$ (between about 30 and 60 mA/cm$^2$ in the preferred embodiments). This can allow to produce alternative porous germanium morphologies, such as spongious 1001 and/or tubular 1002. In some embodiments, as illustrated in FIG. 1B, a germanium substrate 1000 can be placed in an electrochemical cell 200 containing a FBEE etching electrolyte 206, between an electrode 202 and a counter electrode 204. In FIG. 1B, the etching pulse 208 corresponds to a current from the electrode 202 and to the counter electrode 204, alternating with a passivation pulse 210 corresponding to a current from the counter electrode 204 and to the electrode 202. In some embodiments, the FBEE etching electrolyte can be a variety of acid solutions can be used such as hydrochloric acid or bromic acid or others. In some of the preferred embodiments, FBEE etching electrolyte 206 can be an hydrofluoric acid (HF) based solution with a 5:1 dilution ratio. It will be appreciated that the proportion of the dilution ratio of the FBEE etching electrolyte is not limited to the presented embodiments and that alternative dilution ratio may be used to perform the fast bipolar electrochemical etching. In some of the preferred embodiments, the applied current density can be between about 15 and 30 mA/cm$^2$ for anodizing, the applied current density can be of about 60 mA/cm$^2$ for the passivation process, with passivation pulse durations of between about 0.1 and 0.2 sec.

The tubular porous germanium morphology can be additionally treated by chemical etching to produce tubular porous germanium 1002 with larger pores and can create columnar porous germanium 1003 which may offer more opened porosity and can provide a lower specific surface area by controlling the number of dilution with deionized water for a electrolyte etching solution. A columnar porous germanium 1003 is defined as a matrix mostly parallel linear pilar-like structures (columns), which may be resulting from enlarging tubular pores to at least partly merge with neighboring tubular pores to leave columns of germanium, as seen on FIGS. 12B, 12C and 12D for example. The over-etching of a tubular porous germanium 1002 resulting from previously proposed FBEE can allow to generate columnar porous germanium 1003 by means of chemical etching by controlling the ratio of dilution (concentrations) of a chemical etching electrolyte solution 306 and controlling the sample exposure to it, also referred to as a dipping time. The chemical etching electrolyte solution can comprise a mix of various chemical compounds as long as it comprises an oxidizing agent to oxidize the germanium, such as hydrogen peroxide ($H_2O_2$) for example; an acid to dissolve the oxidized germanium, such as hydrofluoric acid (HF) or hydrochloric acid (HCl) for example; and an optional surfactant to ensure a more uniform etching, such as acetic acid ($CH_3COOH$) or ethanol ($C_2H_5OH$) for example. In a preferred embodiment, the etching electrolyte solution can be diluted with deionized water and can allow for a solution of $HF:H_2O_2:CH_3COOH$ (1:2:3,v-v-v). In some embodiments, the acid of the chemical etching solution can be hydrofluoric acid and can have a concentration that can be between $1 \cdot 10^{-6}$ and about 27.46 molarity (M) (between about 0.92 and 1.53 M in the preferred embodiments). It will be appreciated that the dilution ratio is not limited to the presented embodiments and may be alternative ratios. In some embodiments, the sample exposure (dipping) time of the chemical etching that can be between about 0.001 and 900 seconds (between about 1 and 30 seconds in the preferred embodiments). Without limiting possible variations of alternative embodiments, some of the presented embodiments can be used to generate columnar porous germanium having a density of columns of up to 225 columns per µm$^2$ and/or a distance between columns of more than about 20 nm. In some embodiments, the porous germanium may be used as a battery anode that can be, in some embodiments, an on-chip anode. In some embodiments, the battery may be a lithium-ion, a lithium metal, lithium-sulfur, sodium or various type of batteries compatible with germanium anodes.

Figure 1E:
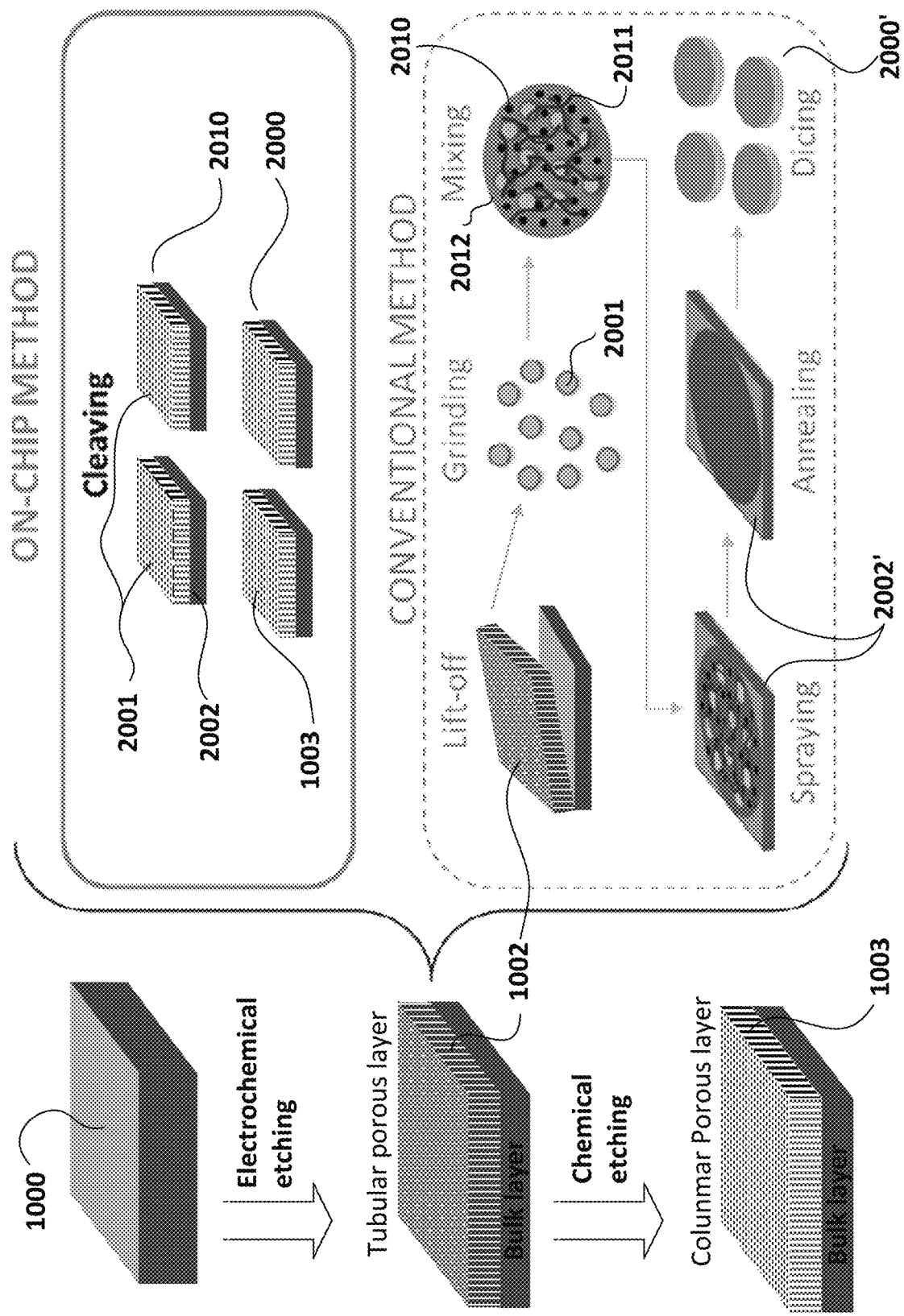
FIG. 1E compares the conventional method of on-chip anode production to the proposed monolithic on-chip anode configuration.

The embodiments of nanostructured porous germanium presented in the present disclosure and their alternatives or combinations can be produced with the novel etching method disclosed herein. Such anode can be easily mass-produced with the presented method that requires pre-existing, affordable and easy to integrate equipment. In some embodiments, as illustrated in FIG. 1E, the produced columnar porous germanium 1003 can be directly used as a monolithic anode 2005 after its etching nanostructuration (including electrochemical etching; chemical etching; and cleaving steps) for on-chip anodes 2000 for example, where the anisotropic nanostructured germanium acts as the active material 2001 to be lithiated and where the remaining bulk germanium layer act as the current collector 2002. For purpose of comparison, FIG. 1E also illustrates an example of what can be considered a conventional method of producing on-chip anodes using germanium as the active material, which normally includes the minimal steps of electro-chemical etching; lift-off; grinding or milling; mixing into a slurry 2012 with carbon black 2010 and binding polymer 2011; spraying onto a current collector 2002'; annealing; and dicing into on-chip anodes 2000'. Nanostructured germanium can be used in photovoltaic, electro-optical and sensor applications, it may therefore be possible to use the nanostructures presented herein to be analogous to the state of the art or to potentially improve some of the possible implementations. It will be appreciated that the applications here mentioned are non-limiting regarding potential alternative fields and/or novel applications in which the nanostructured germanium generated with the method disclosed herein can be used. It will be demonstrated that a columnar porous germanium nanostructure can extend the life cycle of an anode by more than 25 times in a pseudo-capacitance application with a 1 min discharge time and by more than 1.8 times for high-rate applications when compared with a tubular porous germanium nanostructure. The increased life cycle and electrochemical reactivity of columnar porous germanium anode, compared to tubular porous germanium, shows the interest to mix chemical etching with electro-chemical etching to tune the porous morphologies and indirectly the application performances.

The following specifications relating to exemplary embodiments first disclose a method for producing tubular morphology on germanium in FBEE, where a low etching current density value can switch the porous morphology from sponge-like to tubular; where the total time of porosification can be used to control the pore diameter and modulate the porosity following a linear trend; where the change of pore density and lateral etching can be controlled by adjusting the passivation duration for a specific range of etching current densities; and where a threshold value of etching current density/passivation pulses duration must be overcome to enable the porosification to be concentrates on the pore tip or distributed on the walls of the pores and/or at the surface. It will be appreciated by someone skilled in the art that the discovery of such a relationship between specific electrochemical etching parameters and specific resulting characteristics of the porous germanium is novel. The present disclosure allows for a better understanding of the electrochemical etching of germanium and allow better use of this nanostructured material for future applications. The present specification further discloses a method for producing a columnar porous germanium structure, which represents an anisotropic morphology with open porosity, by over-etching the tubular porous germanium with a proposed tunable chemical etching. Some of the presented embodiments are used as an anode for lithium-ion batteries. Some of the resulting structures are experimentally studied to generate the presented and analyzed data disclosed herein. Such architectures offer better electrolyte diffusion, liquid and solid, but also can easily handle the volume expansion phenomena during lithiation. In additional, tubular and columnar nanostructure can have lower specific surface area than sponge-like morphology, which may be beneficial in reducing the impact of solid interface electrolyte formation. Applicant further demonstrates that the columnar porous germanium can have significantly better performances than tubular porous germanium for pseudo-capacitance and deep-intercalation applications.

Influence of Etching Parameters
Characterization

Figure 17A:
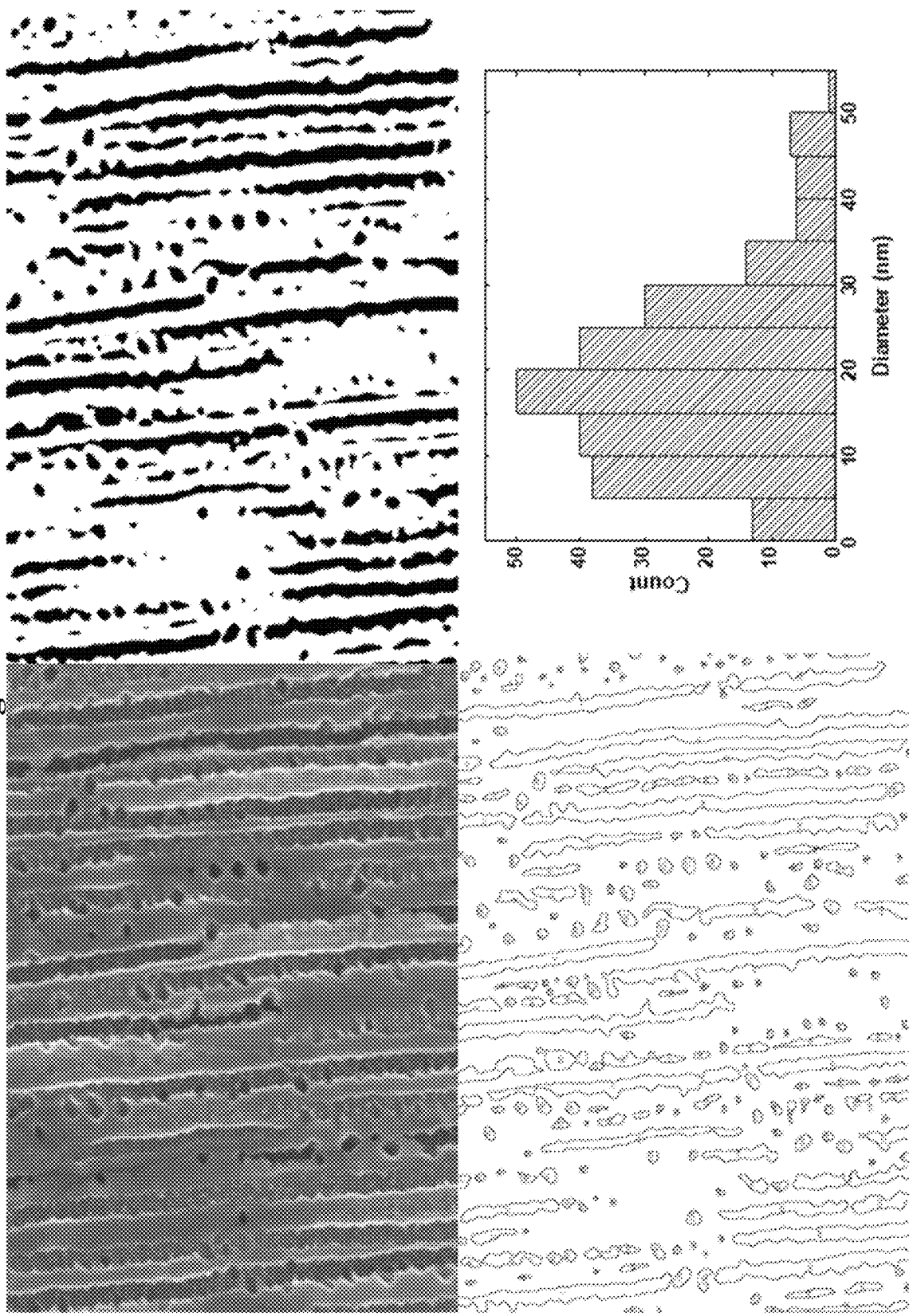
FIG. 17A shows a mesoporous structure is demonstrated by extracting the pore size distribution using ImageJ.
Figure 17B:
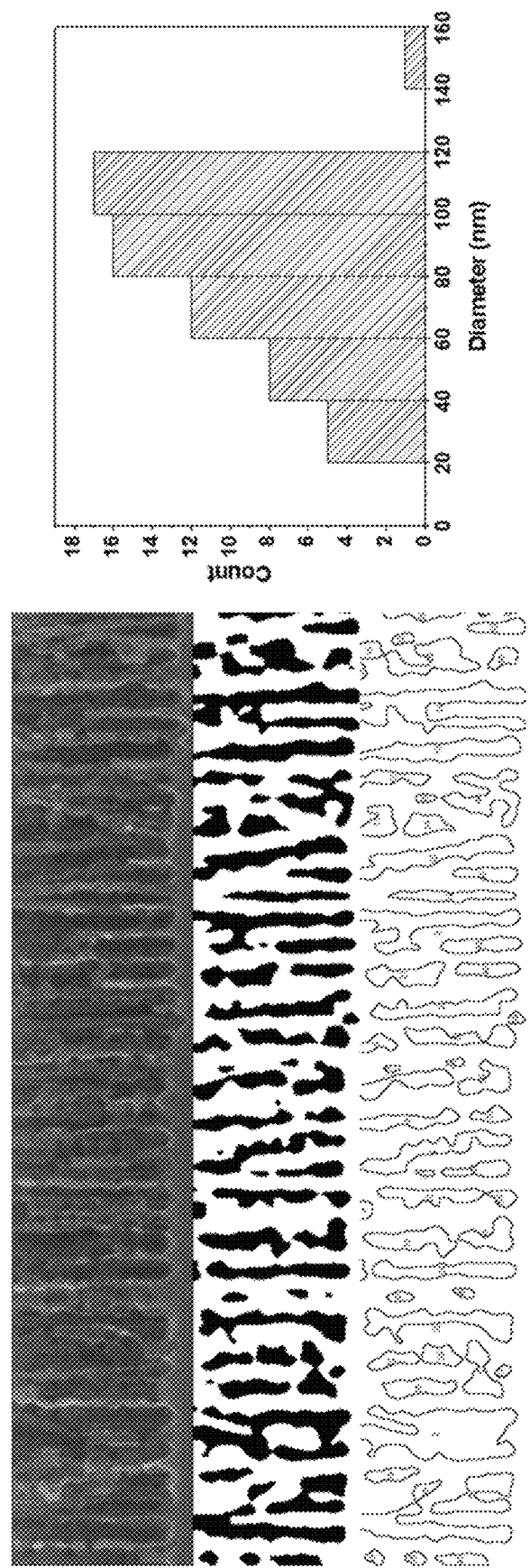
FIG. 17B show cross-sectional SEM images of various embodiments at ×50K magnification of samples analyzed to determine the pore distribution.

In some embodiments, scanning electron microscope (SEM) images of the samples can be taken to be analyzed with some image processing software, such as ImageJ for example, for identifying pores in an image of porous germanium (the 3D Objects Counter plugin of ImageJ for example) as illustrated in FIGS. 17A and 17B. With this, the average porosity of germanium (±5%, in some embodiments) can be measured by imaging treatment. A Dektak 150 from Veeco (Bruker) can be used to determine wafer dissolution thickness values. For example, electrochemical etching may be performed using the Keithley 2400, cyclic voltammetry can be done with the SP-50 from Biologic and the galvanostatic cycling may be performed with the BST8-MA system from MTIXTL.

Electrochemical Etching Process

In some embodiments, a gallium doped p-type germanium (13.7 mΩ·cm) can be porosified using a single bath electrochemical cell 200, which can be similar to the one illustrated on FIG. 1B. In this exemplary embodiment, a germanium wafer 1000 with a (100) surface slightly misoriented with a miscut of 6° was used. A pre-coated silicon nitride (SiN) film, sometimes present on the backside of the wafer, can be removed by dipping the wafer in a hydrofluoric acid (HF) 49% solution at about 25° C. for about 5 minutes. The germanium wafer 1000 can be subsequently dried under dinitrogen ($N_2$) flow and can then be placed between a working electrode 202, which can be made of copper (Cu) in some embodiments, and a counter-electrode 204, which can be made of platinum (Pt) in some embodiments. It will be appreciated that position, shape and composition of these electrodes may be changed or differ from the illustrated example of FIG. 1B. Electrochemical etching may be carried out in a HF(49%):Ethanol (5:1 volume to volume ratio) electrolyte solution 206 by applying non-symmetric and high frequency bipolar current pulses between the electrode 202 and the counter electrode 204. In this embodiment, the current density of anodic pulses referred to as etching pulses 208 may be varied between about ±15 mA/cm$^2$ and up to about ±30 mA/cm$^2$ with a constant pulse duration that may be of about 0.05 second, wherein these etching currents are alternated with passivation pulses 210 that can be set at around 60 mA/cm$^2$ with a duration that can be between 0.1 second and 0.2 seconds. In this embodiment, a pre-etching step may be applied to equalize the distribution of nucleation sites at the sample surface, which may be done as described by Bioud et al. (DOI: 10.1016/j.electacta.2017.02.115) for example. In some embodiments, pre-etching step, here referred to as a nucleation etching step, may be done with a direct current between 1 and 30 mA/cm$^2$ (of about 10 mA/cm$^2$ for about 30 seconds in the preferred embodiments) with various nucleation etching time depending on the resistivity of the wafer, etching electrolyte, etc. It will be appreciated by someone skilled in the art that the nucleation etching step can be any various embodiments of the ones presented herein or alternative methods known in the art to allow proper nucleation of germanium. In some embodiments, the total time of porosificaton can be tuned from about 1 minute to about 900 minutes to synthesize tubular porous germanium 1002 (T-PGe) and, in some of the preferred embodiments, can be tuned between about 30 and 360 minutes to get some of the best results.

It will be appreciated that the values of the embodiments previously disclosed are non-limiting and that alternative combinations of values (wafer resistivity, electrolyte concentration, etching and passivation current density, as well as etching and passivation pulse duration) may be possible to produce analogous results (porous germanium with similar properties) with similar electrochemical etching processes. In some embodiments, the electrochemical etching parameters may be chosen in accordance with previous experimental results where a well-defined porous layer germanium synthesis may be obtained. In this aspect, wafer resistivity, electrolyte concentration, etching and passivation current density, as well as etching and passivation pulse duration may be adjusted during the fabrication of porous germanium to control de resulting characteristics of the pores of the anisotropic germanium. Exemplary embodiments, results and effects of change of some of these parameters on the resulting porous germanium are shown in the following.

Wafer Resistivity

Figure 2A:
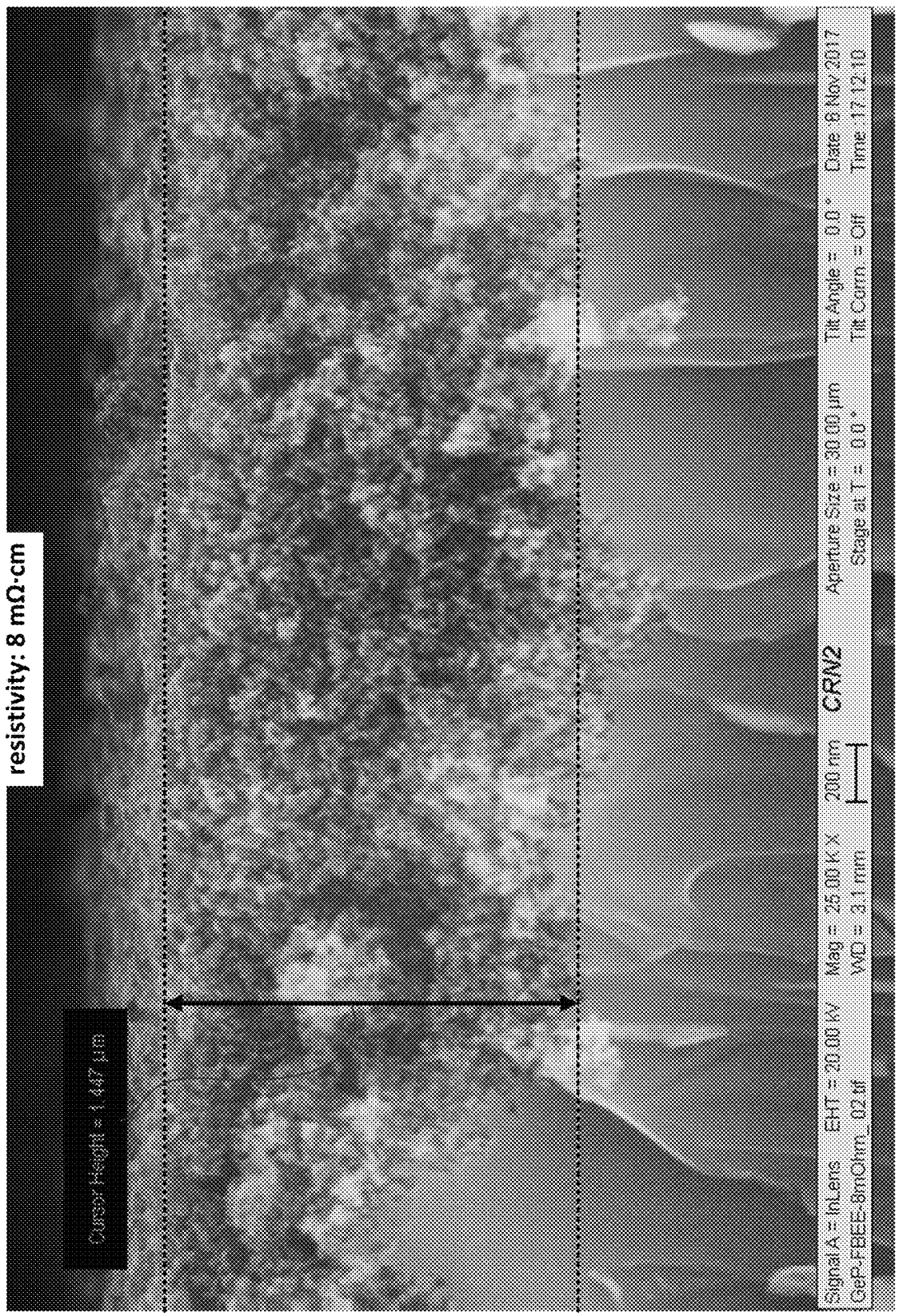
FIG. 2A shows cross-section SEM views of a porous germanium sample with resistivity of 8 mΩ·cm.
Figure 2C:
FIG. 2C shows cross-section SEM views of porous germanium sample with resistivity of 11 mΩ·cm.
Figure 2D:
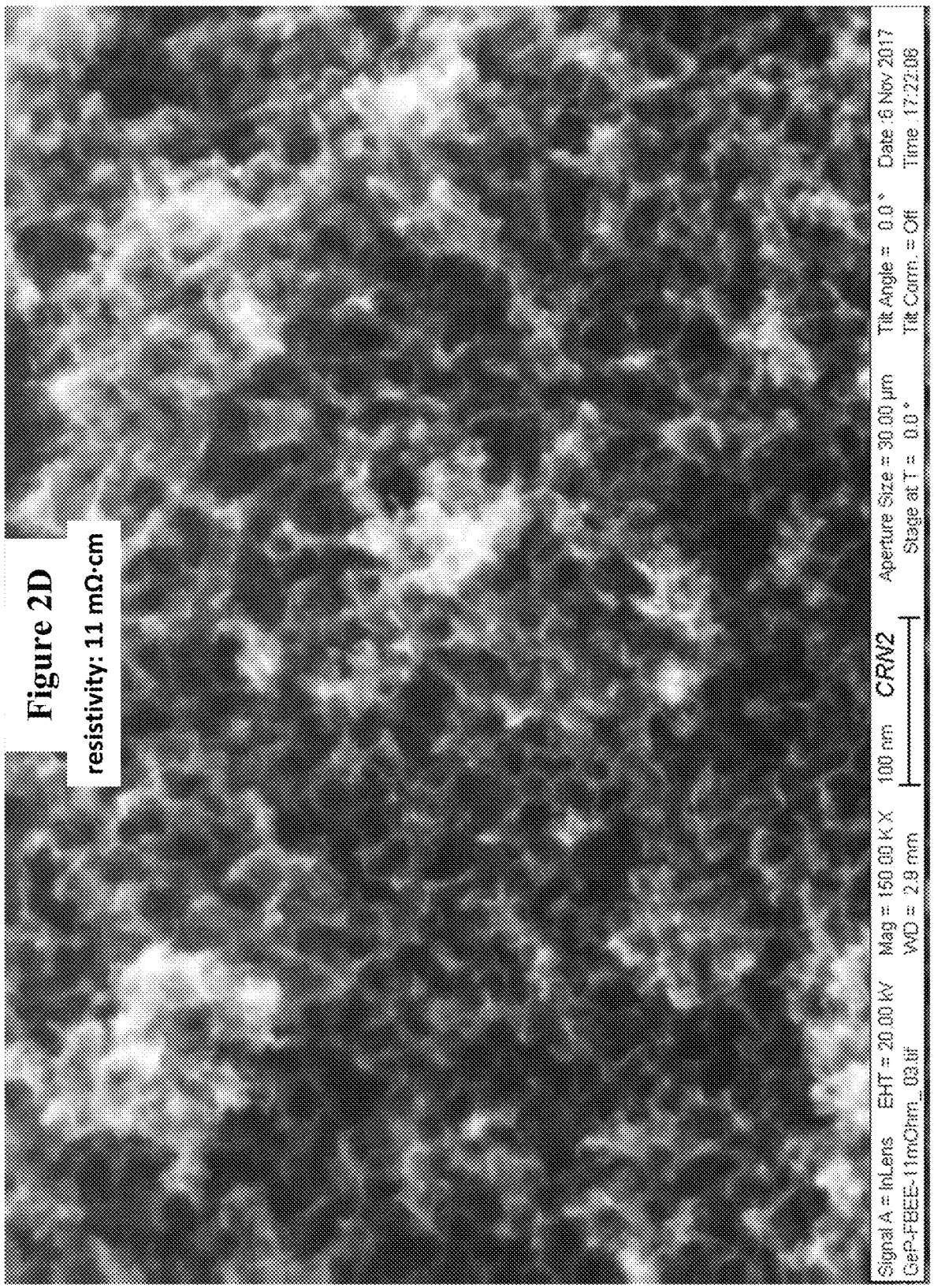
FIG. 2D shows a ×6 magnification of the cross-section SEM views of porous germanium sample of FIG. 2C with resistivity of 11 mΩ·cm.
Figure 2E:
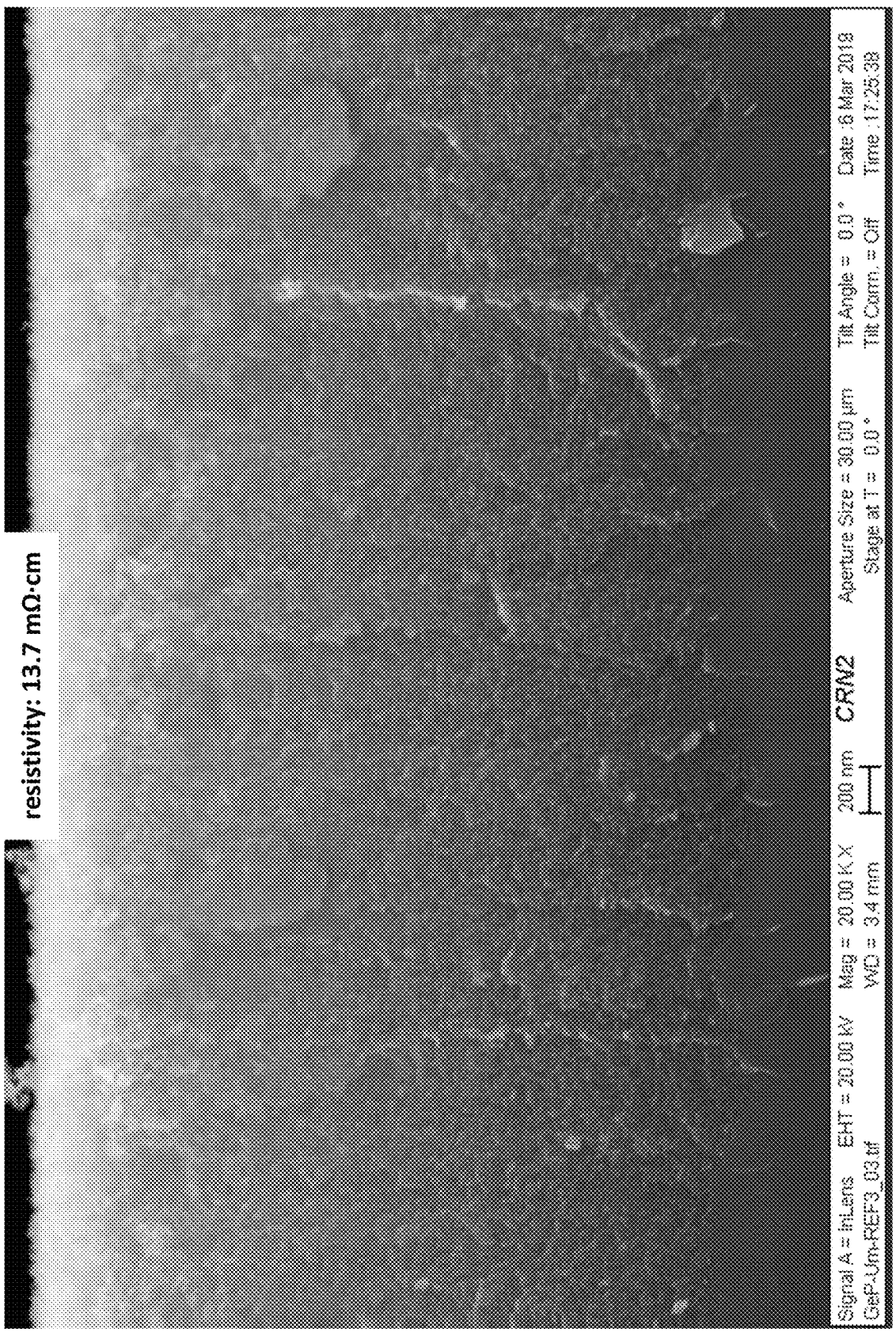
FIG. 2E shows cross-section SEM views of a porous germanium sample with resistivity of 13.7 mΩ·cm.
Figure 2F:
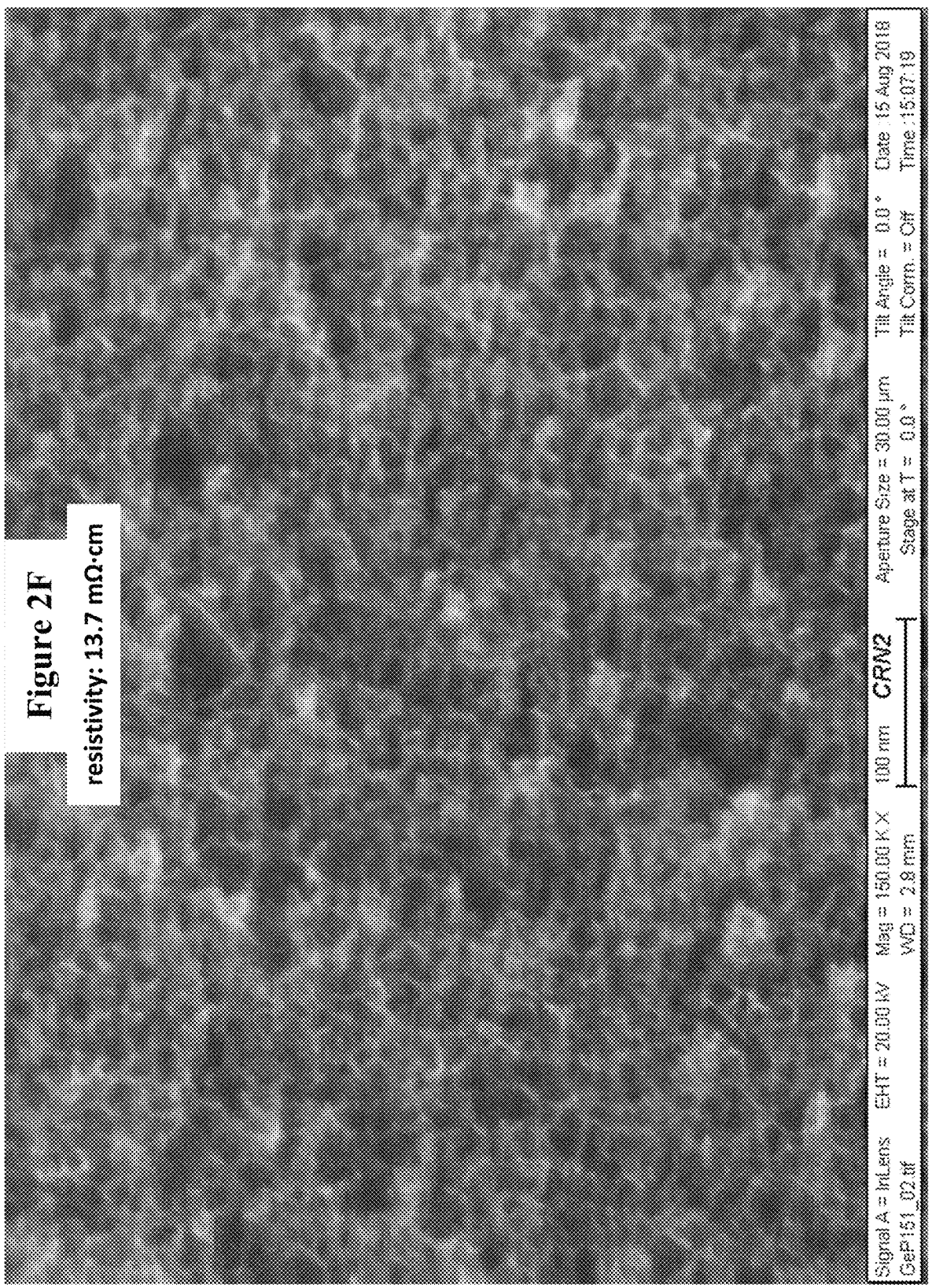
FIG. 2F shows a ×6 magnification of the cross-section SEM views of porous germanium sample of FIG. 2E with resistivity of 13.7 mΩ·cm.
Figure 2G:
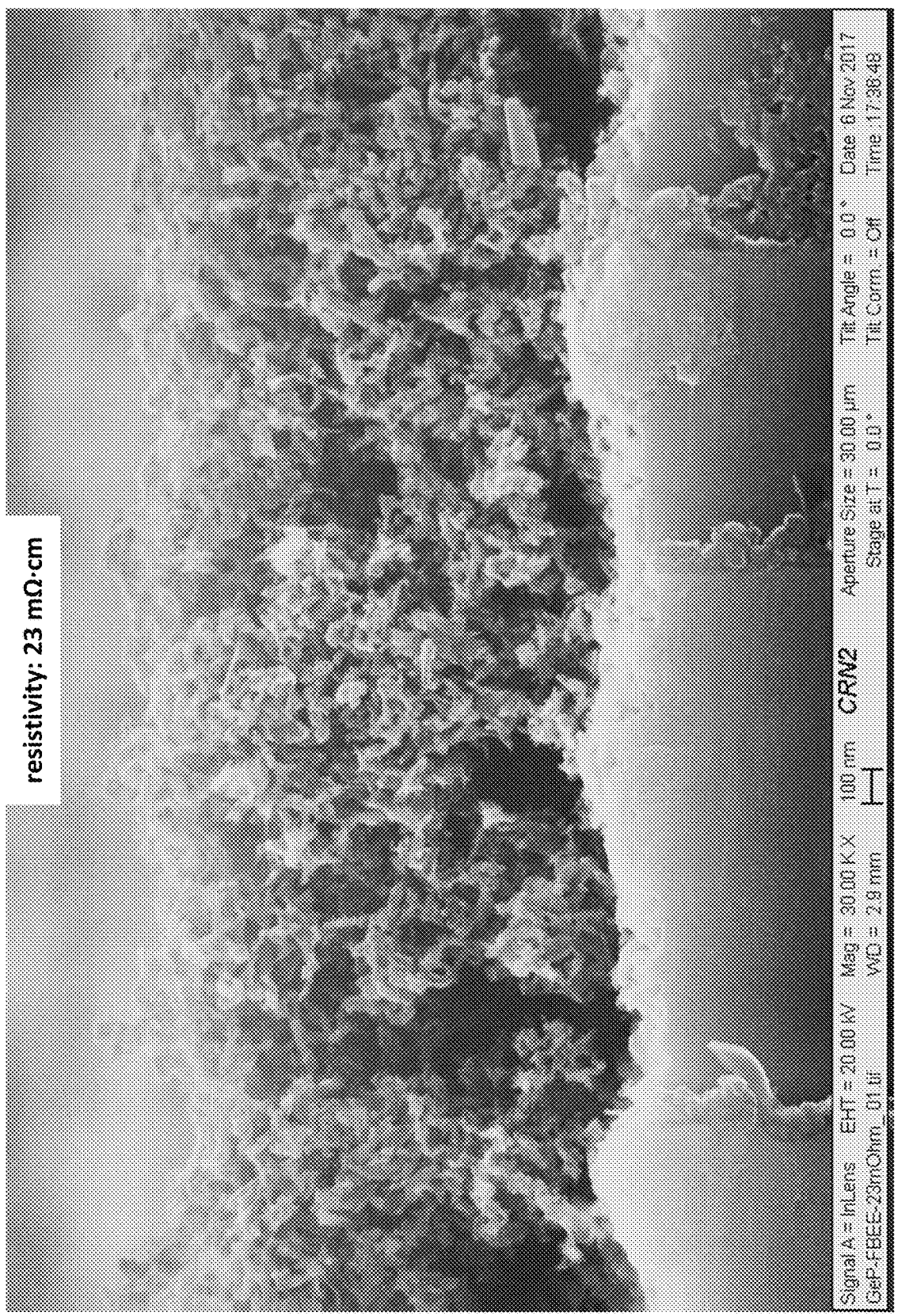
FIG. 2G shows cross-section SEM views of porous germanium sample with resistivity of 23 mΩ·cm.
Figure 2H:
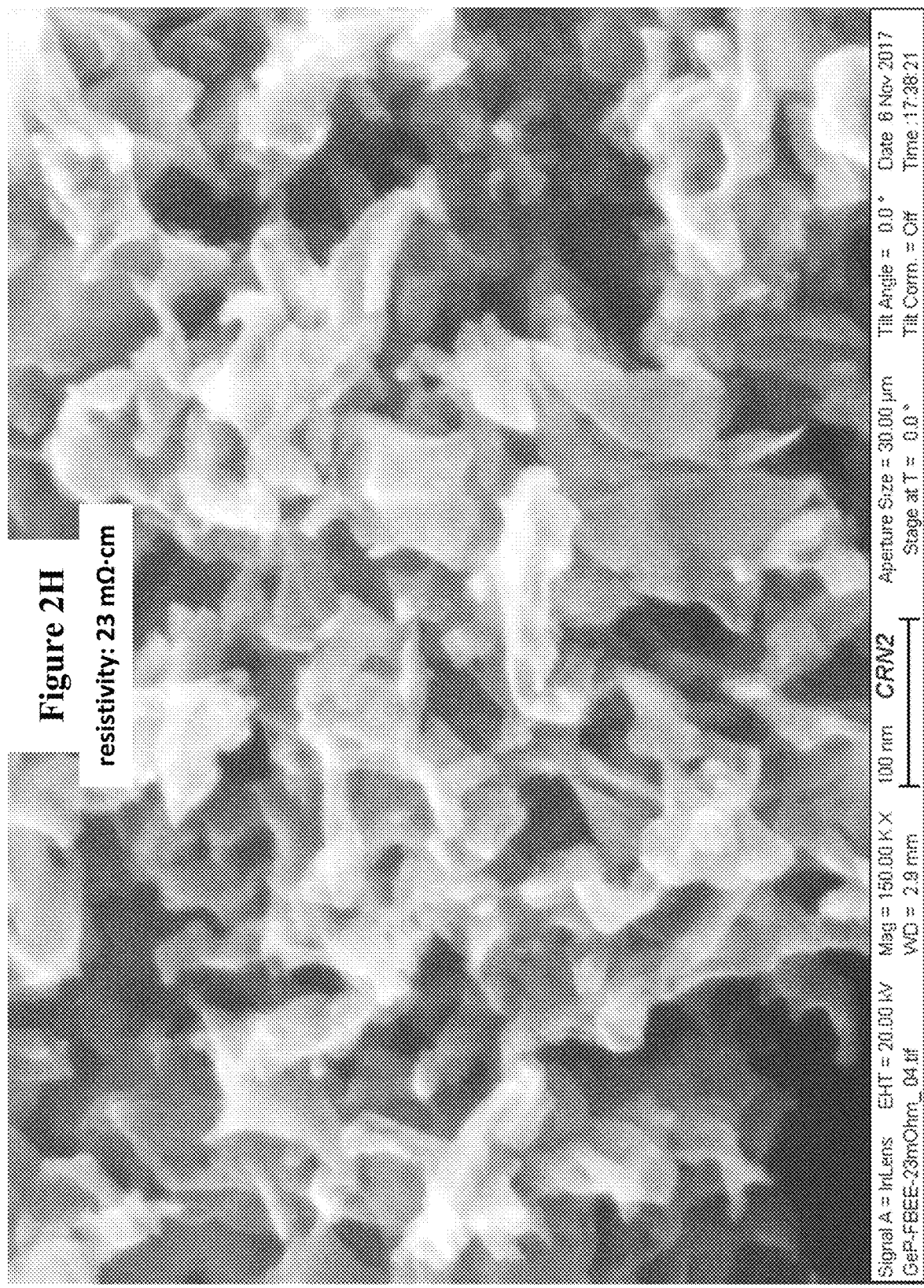
FIG. 2H shows a ×5 magnification of the cross-section SEM views of porous germanium sample of FIG. 2G with resistivity of 23 mΩ·cm.
Figure 2I:
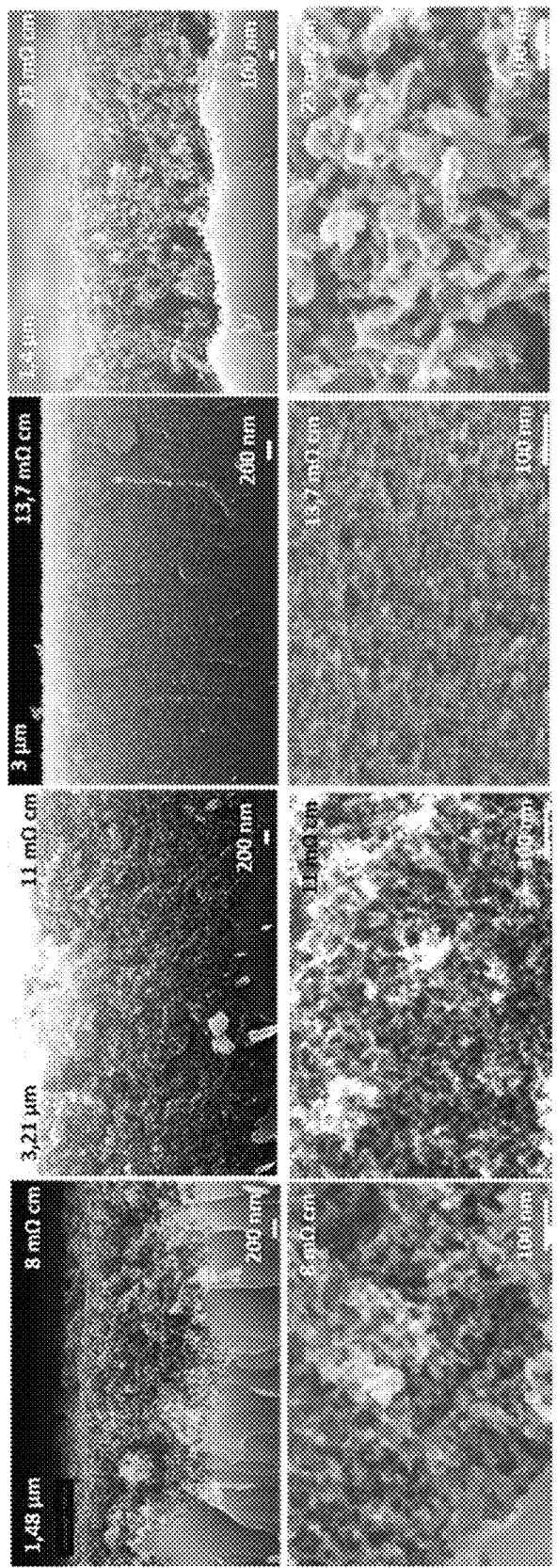
FIG. 2I is a compilation of the embodiments presented in FIGS. 2A to 2H to help better visualize the effect of the resistivity.
Figure 2J:
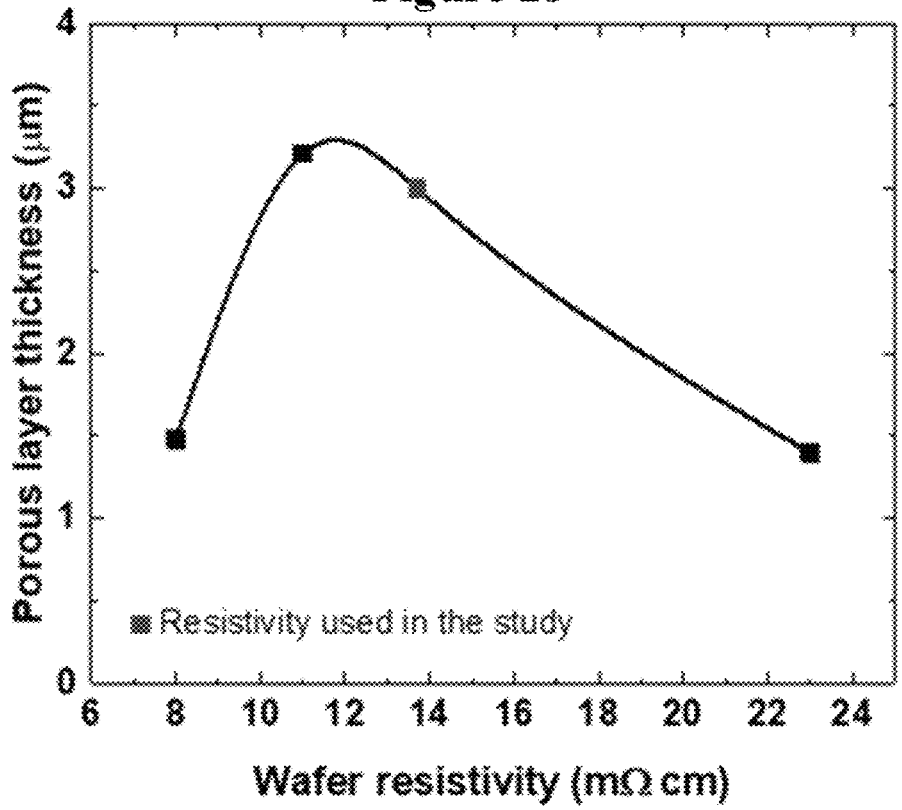
FIG. 2J shows the evolution of porous layers thickness as a function of the wafer's resistivity of the sample presented in FIGS. 2A and 2B.
Figure 2K:
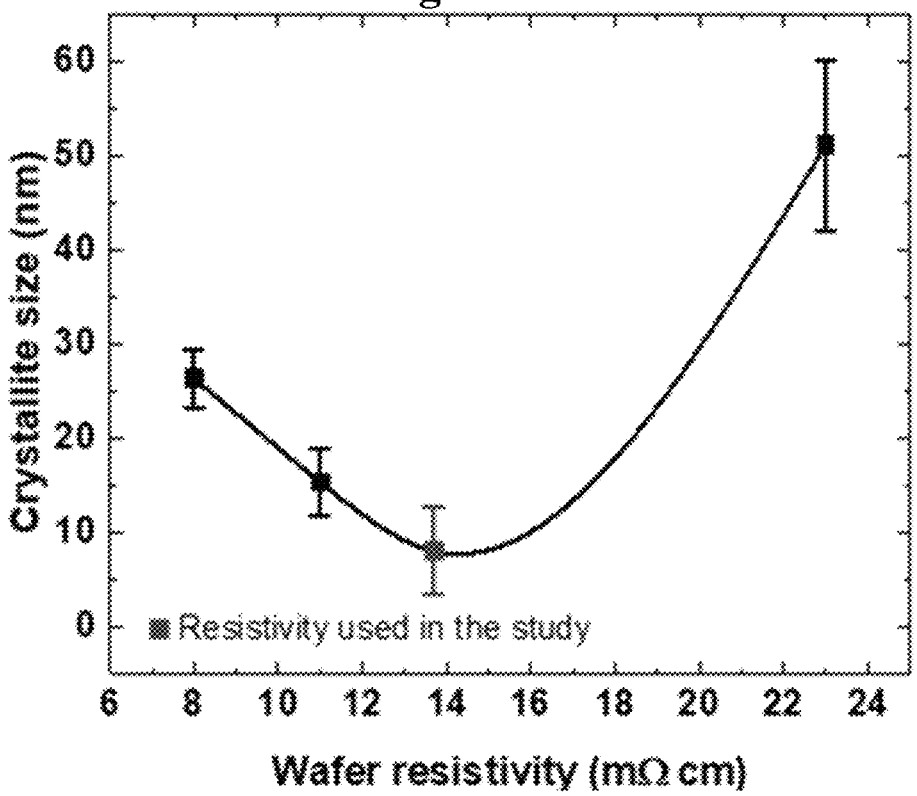
FIG. 2K shows the evolution of crystallite size as a function of the wafer's resistivity of the sample presented in FIGS. 2A and 2B.

The embodiments of FIGS. 2A to 2H show exemplary results of what could be obtained using the same recipe of FBEE on 4 substrates for various embodiments with different applied resistivities between the possible values of about 1 to 40 mΩ·cm, for resistivities of 8 mΩ·cm (for FIGS. 2A and 2B), 11 mΩ·cm (for FIGS. 2C and 2D), 13.7 mΩ·cm (for FIGS. 2E and 2F) and 23 mΩ·cm (for FIGS. 2G and 2H). More particularly, in those exemplary embodiments, a similar recipe with an etching current density of 30 mA/cm$^2$ with a pulse duration of 0.05 sec, a passivation current density of 60 mA/cm$^2$ with a pulse duration of 0.2 sec and a total time of porosification of 30 min can be applied. As it can be seen in FIGS. 2J and 2K, porous thickness and crystallite size, respectively, may change as a function of wafer resistivity. FIG. 2I is a compilation of the embodiments presented in FIGS. 2A to 2H to help better visualize the effect of the resistivity. In the case of germanium porosification, dopant density can play a major role in determining the space charge region thickness as well as the height of the energy barrier at the electrolyte/semiconductor interface. Thereby, the germanium reaction rate (porous layer formation and wafer dissolution) can be influenced by the dopant density. Also, a change of wafer resistivity can imply a variation of crystallite size, porosity and/or porous thickness. The value of 13.7 mΩ·cm may be considered for a preferred embodiment because it was the resistivity which can give a good porous thickness, a best porous layer homogeneity and a good reproducibility.

Current Density and Charge Quantity Reaction

Figure 3A:
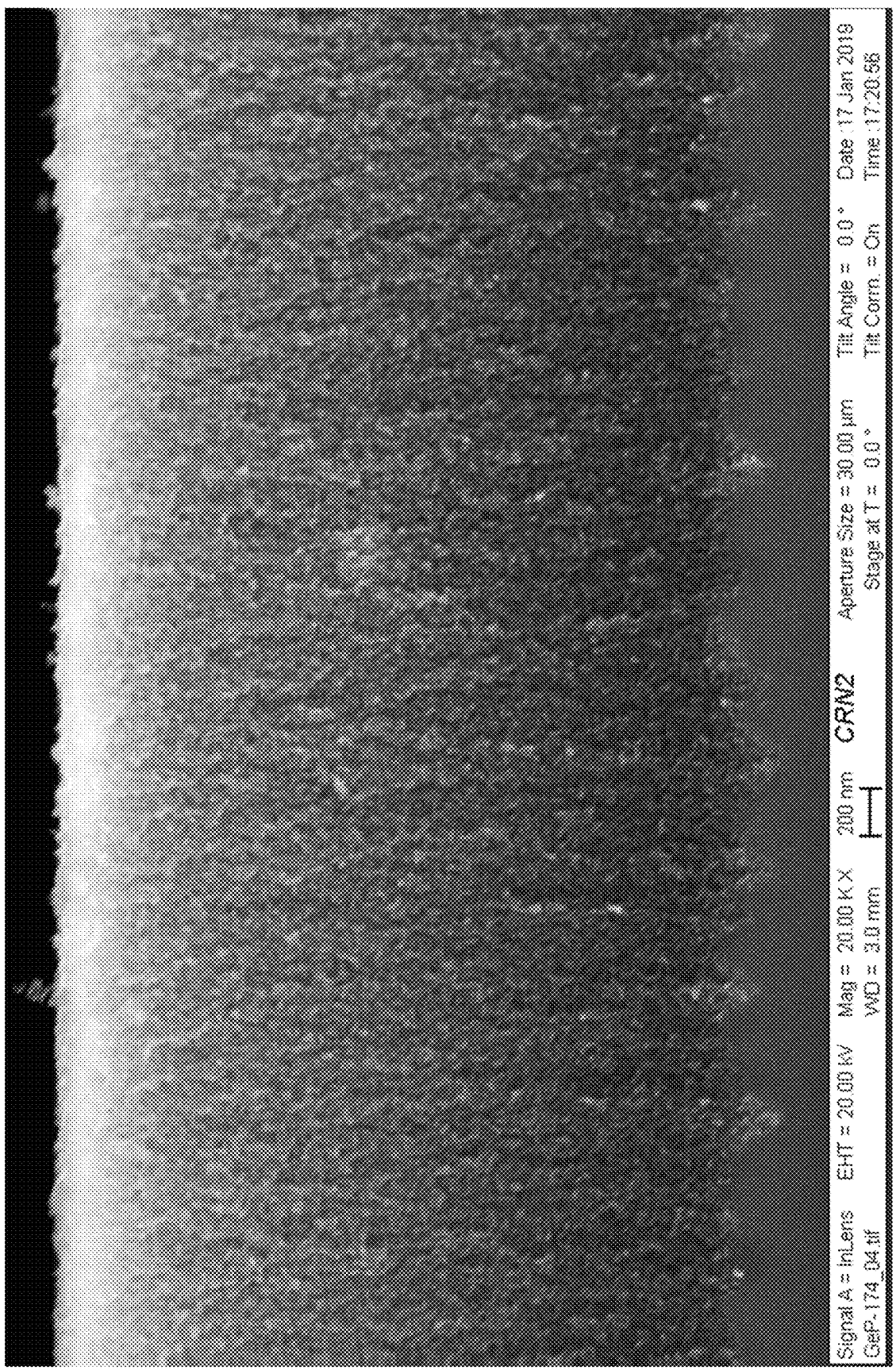
FIG. 3A shows cross-section SEM views of porous germanium sample with various current density of 30 mA/cm$^2$ for etching and of 60 mA/cm$^2$ for passivation.
Figure 3B:
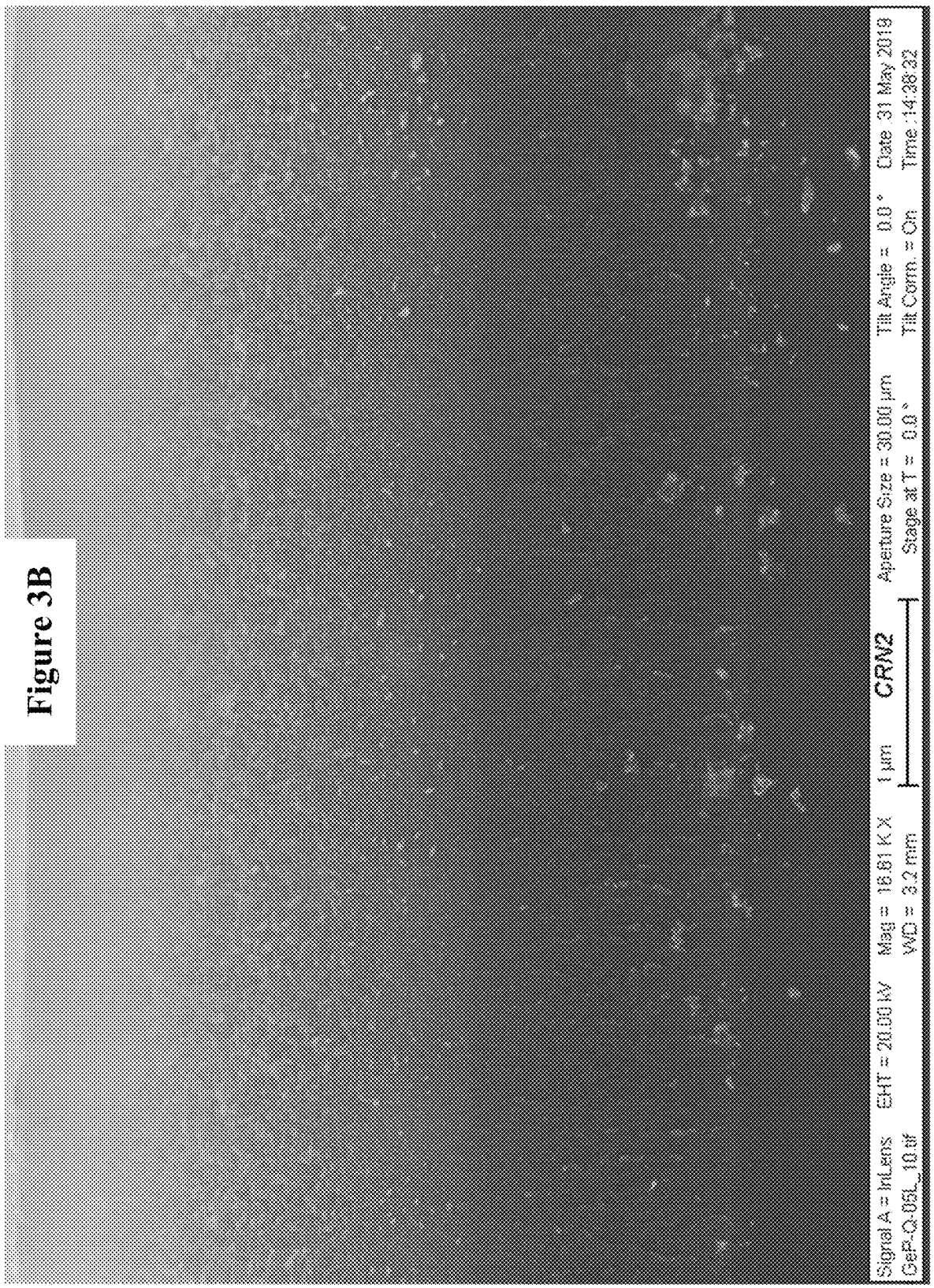
FIG. 3B shows cross-section SEM views of porous germanium sample with various current density of 55 mA/cm$^2$ for etching and of 60 mA/cm$^2$ for passivation.
Figure 3C:
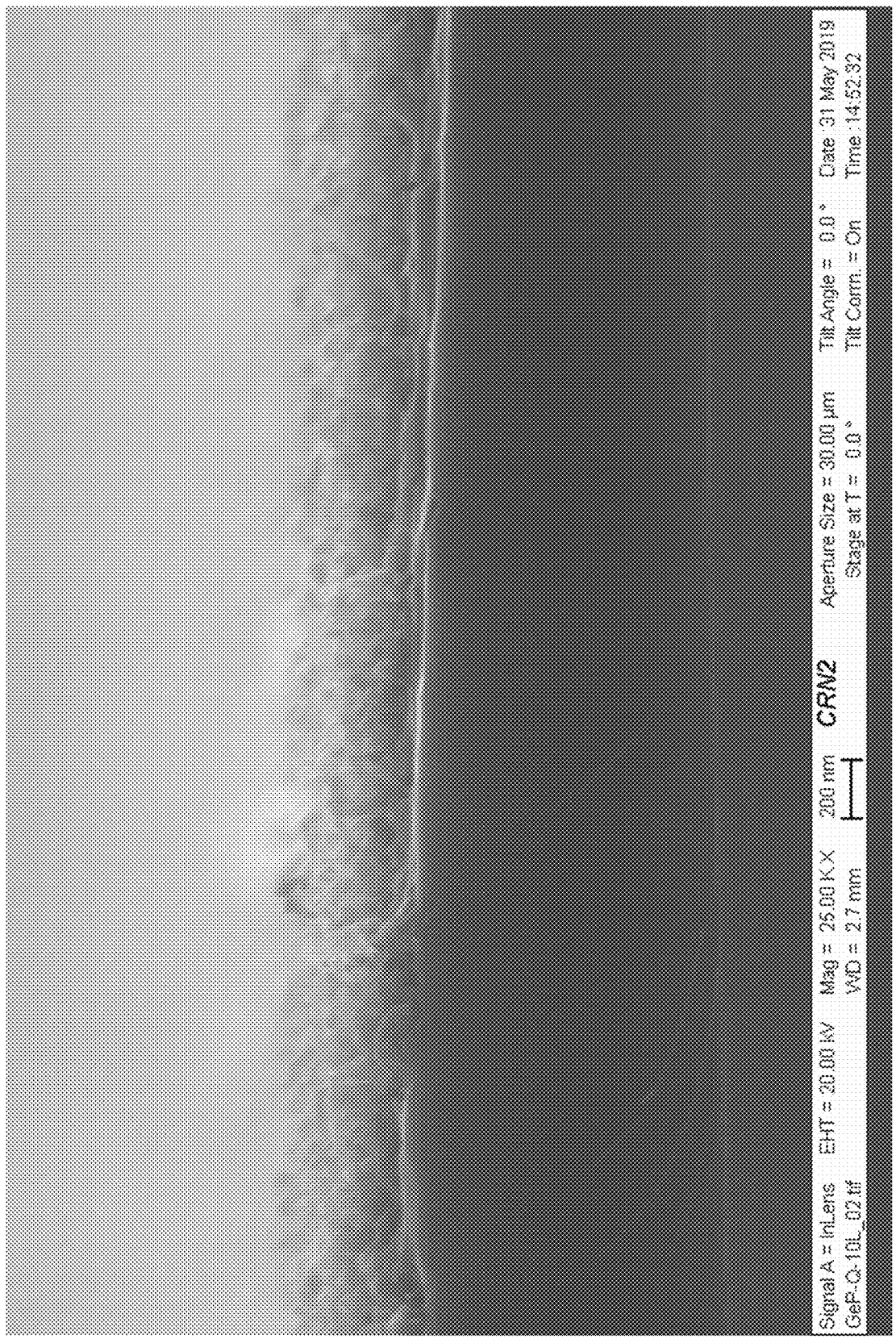
FIG. 3C shows cross-section SEM views of porous germanium sample with various current density of 55 mA/cm$^2$ for etching and of 180 mA/cm$^2$ for passivation.
Figure 3D:
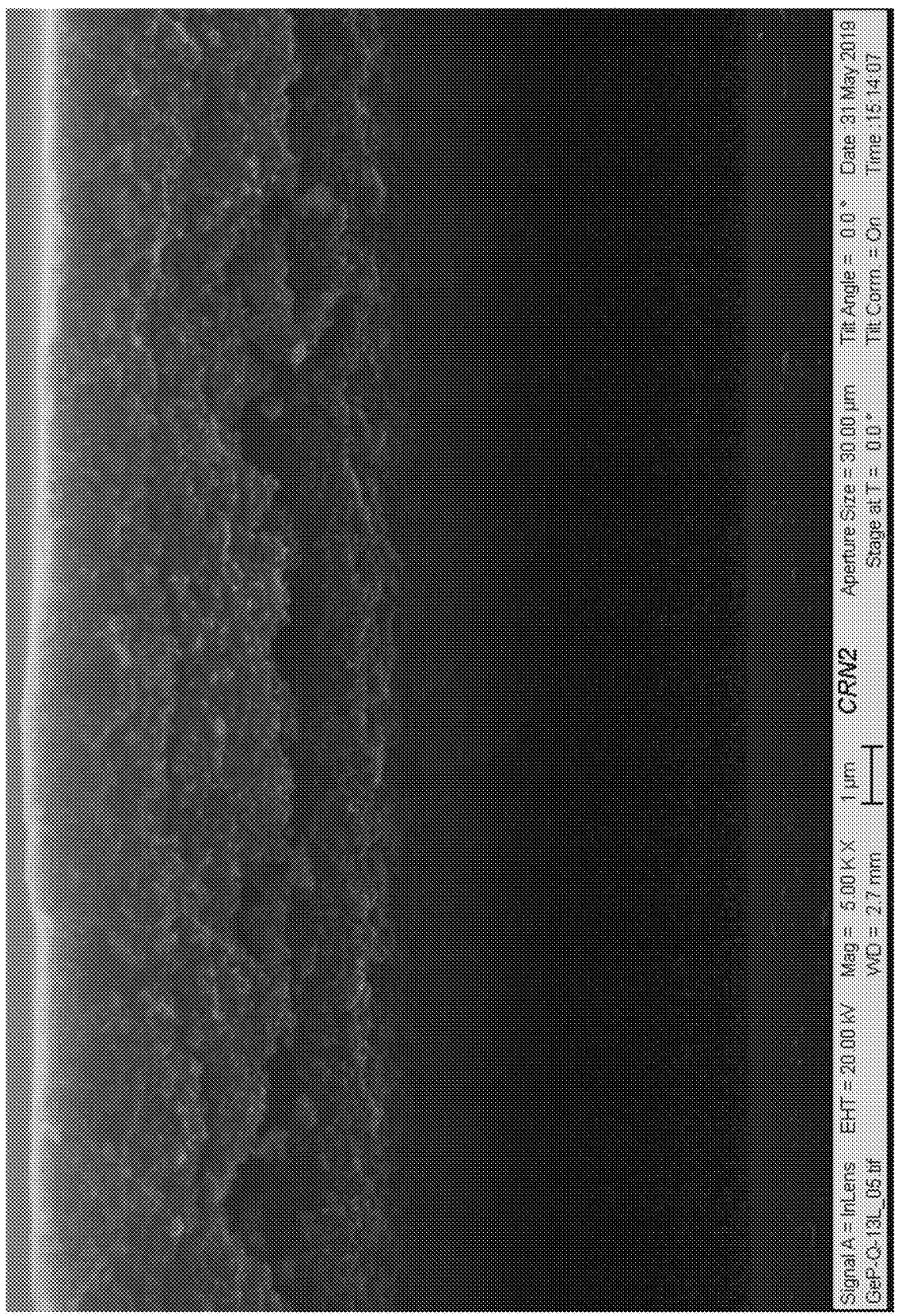
FIG. 3D shows cross-section SEM views of porous germanium sample with various current density of 55 mA/cm$^2$ for etching and of 600 mA/cm$^2$ for passivation.
Figure 3E:
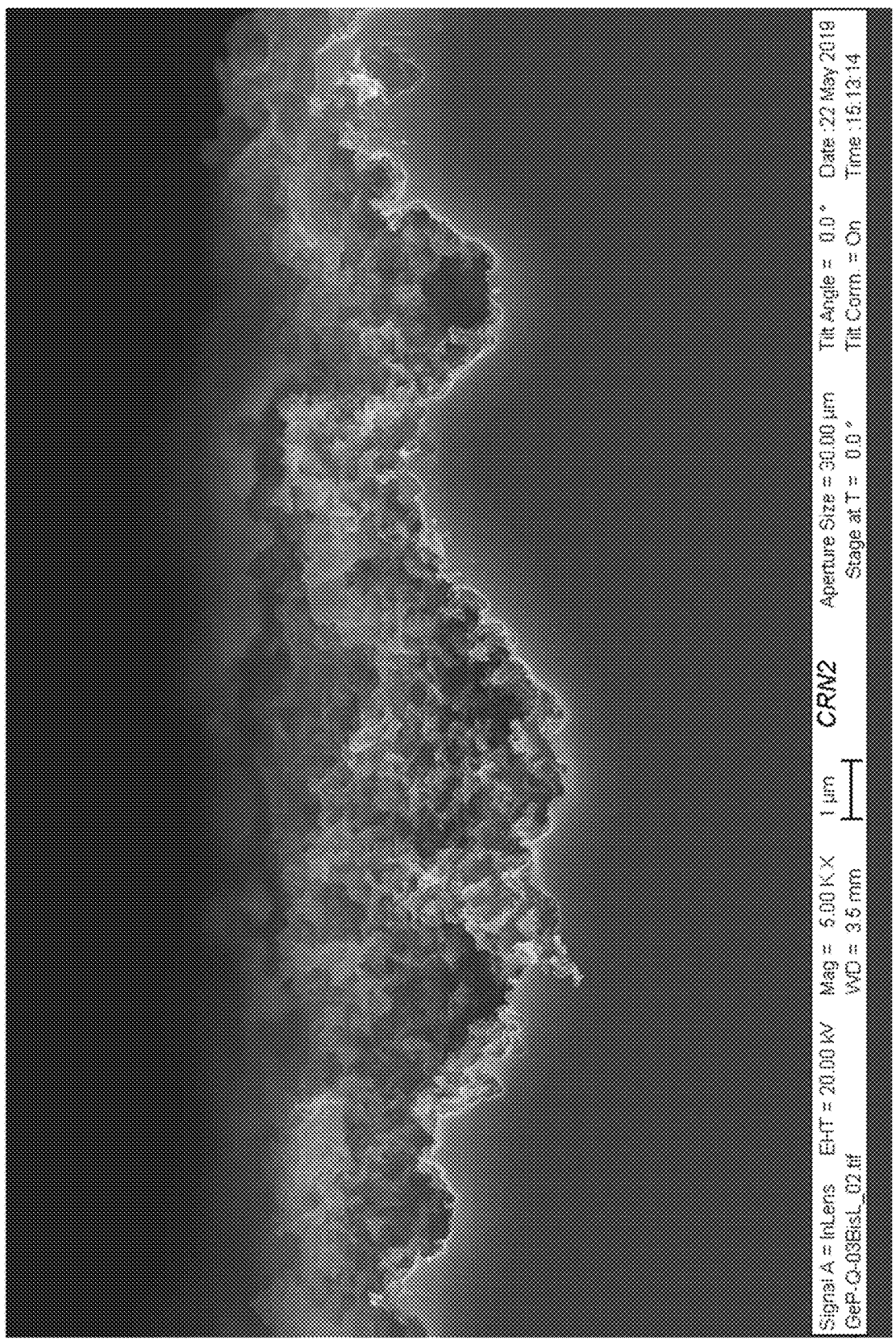
FIG. 3E shows cross-section SEM views of porous germanium sample with various current density of 165 mA/cm$^2$ for etching and of 60 mA/cm$^2$ for passivation.
Figure 3F:
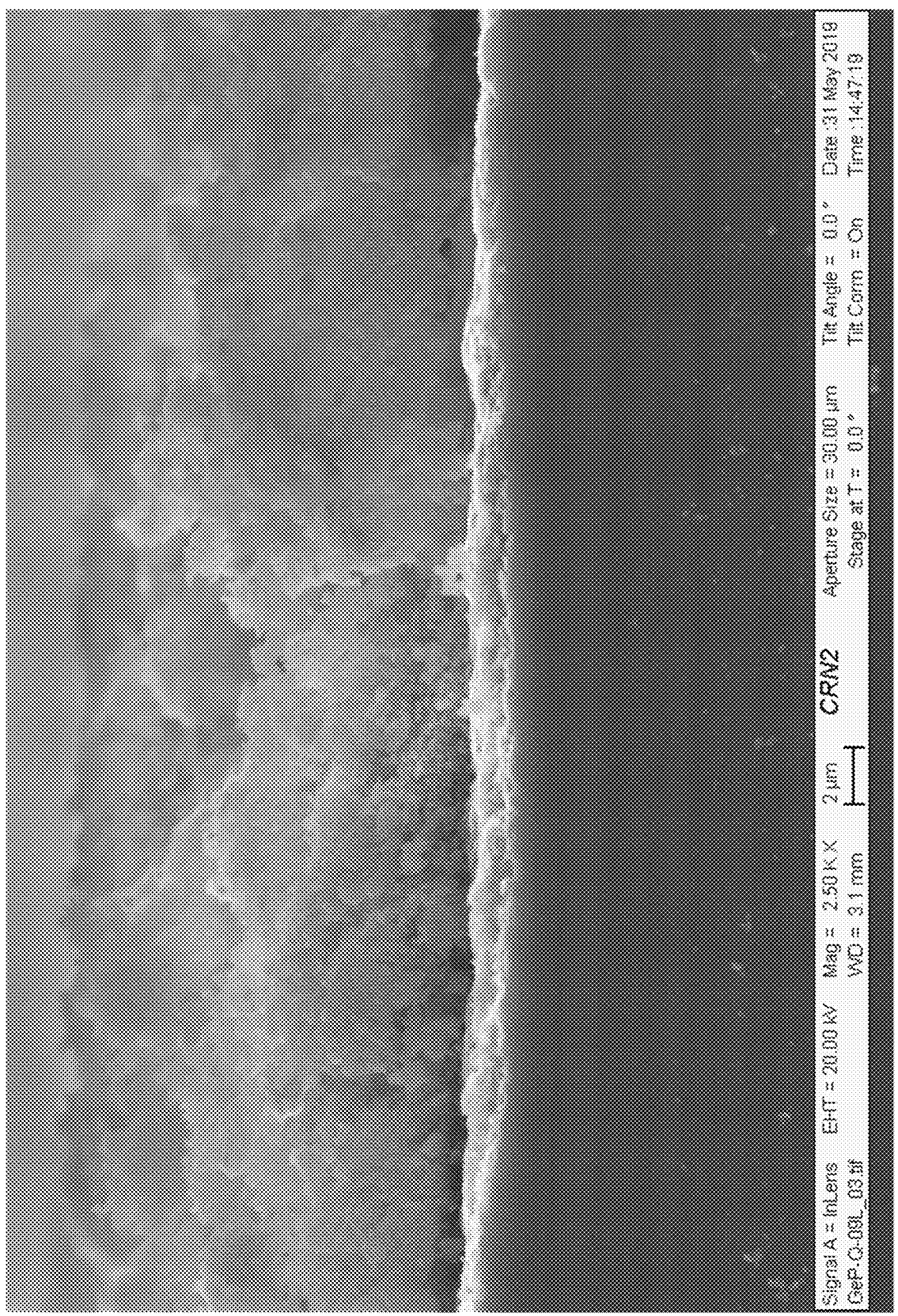
FIG. 3F shows cross-section SEM views of porous germanium sample with various current density of 165 mA/cm$^2$ for etching and of 180 mA/cm$^2$ for passivation.
Figure 3G:
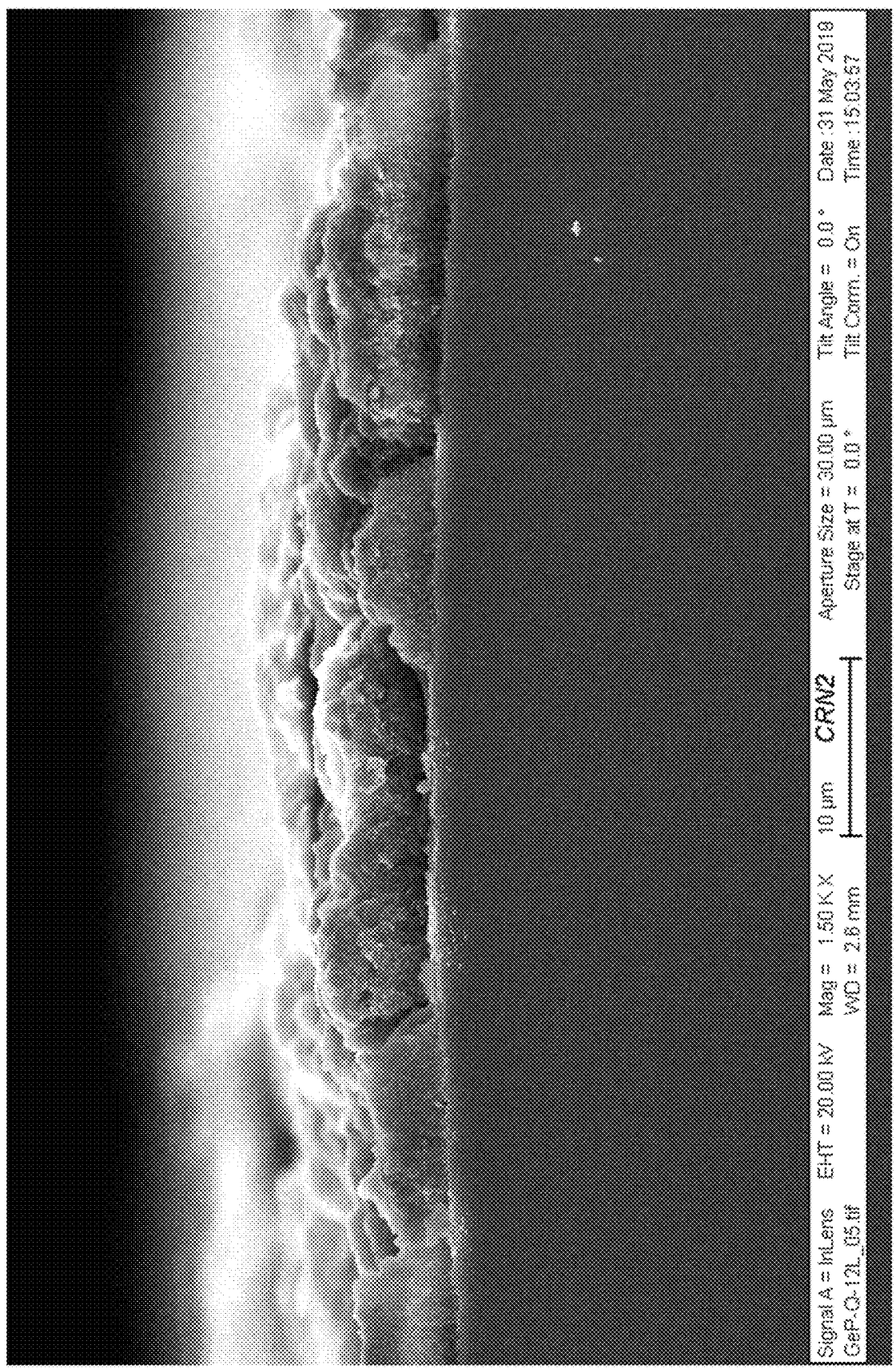
FIG. 3G shows cross-section SEM views of porous germanium sample with various current density of 165 mA/cm$^2$ for etching and of 600 mA/cm$^2$ for passivation.
Figure 3H:
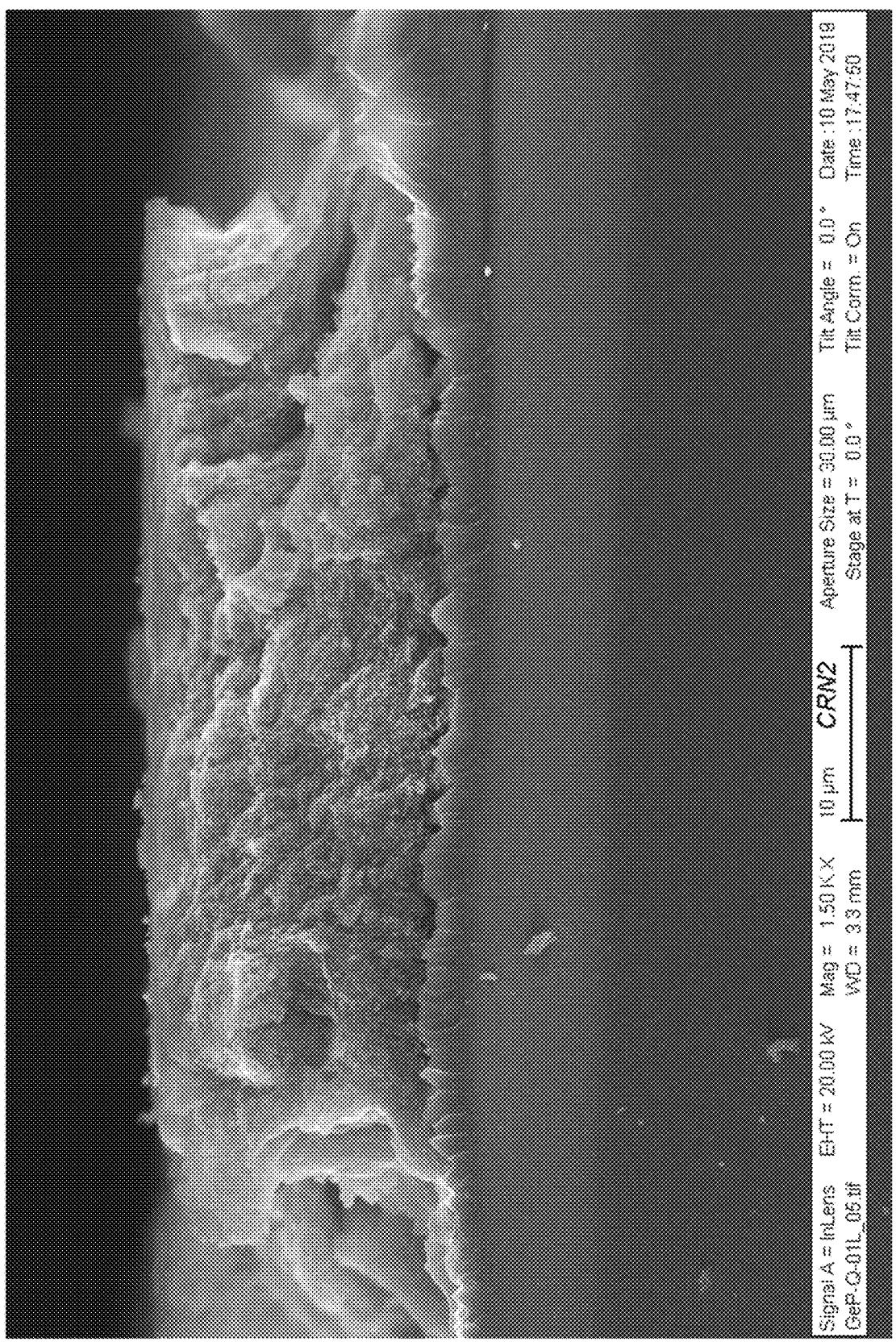
FIG. 3H shows cross-section SEM views of porous germanium sample with various current density of 560 mA/cm$^2$ for etching and of 60 mA/cm$^2$ for passivation.
Figure 3I:
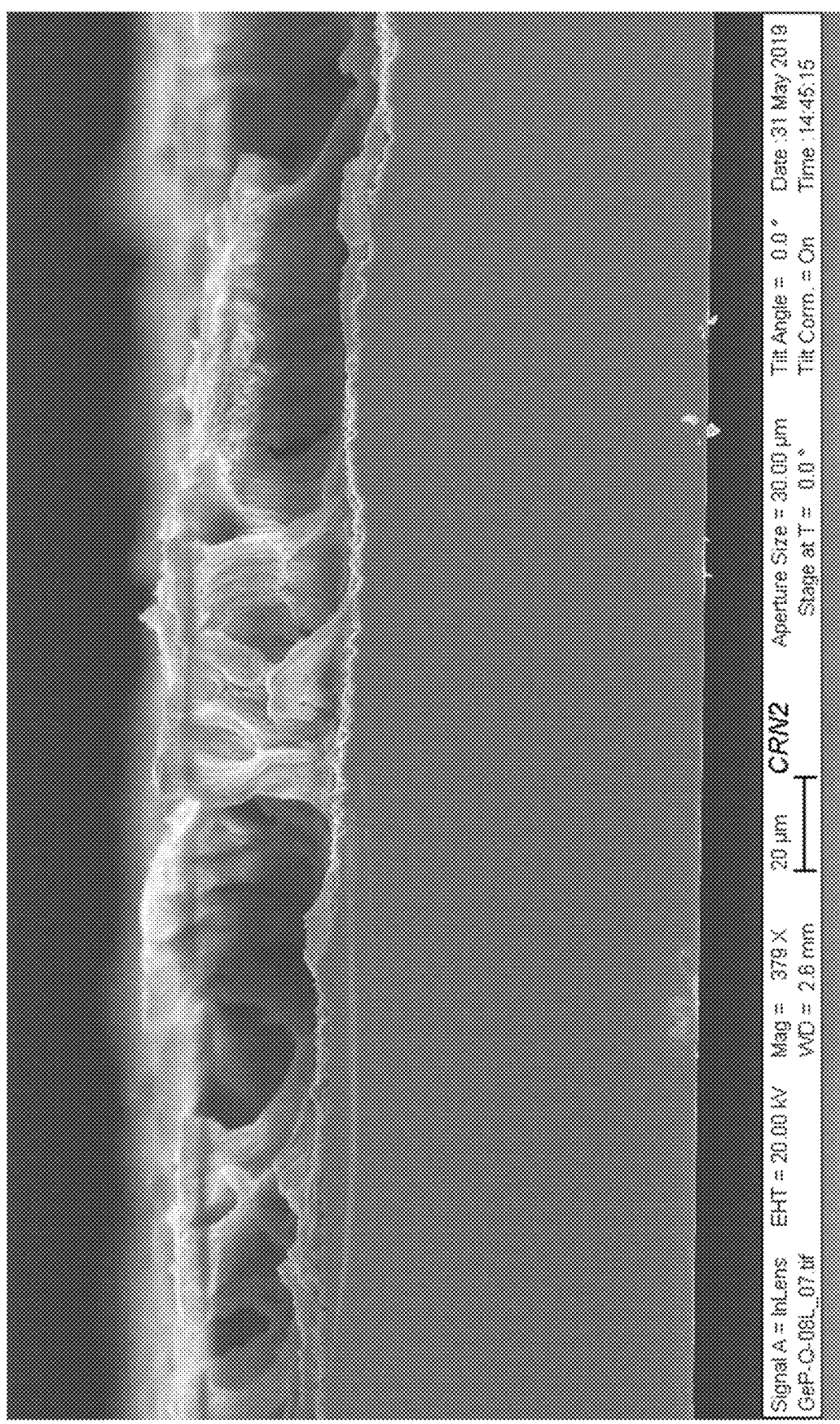
FIG. 3I shows cross-section SEM views of porous germanium sample with various current density of 560 mA/cm$^2$ for etching and of 180 mA/cm$^2$ for passivation.
Figure 3J:
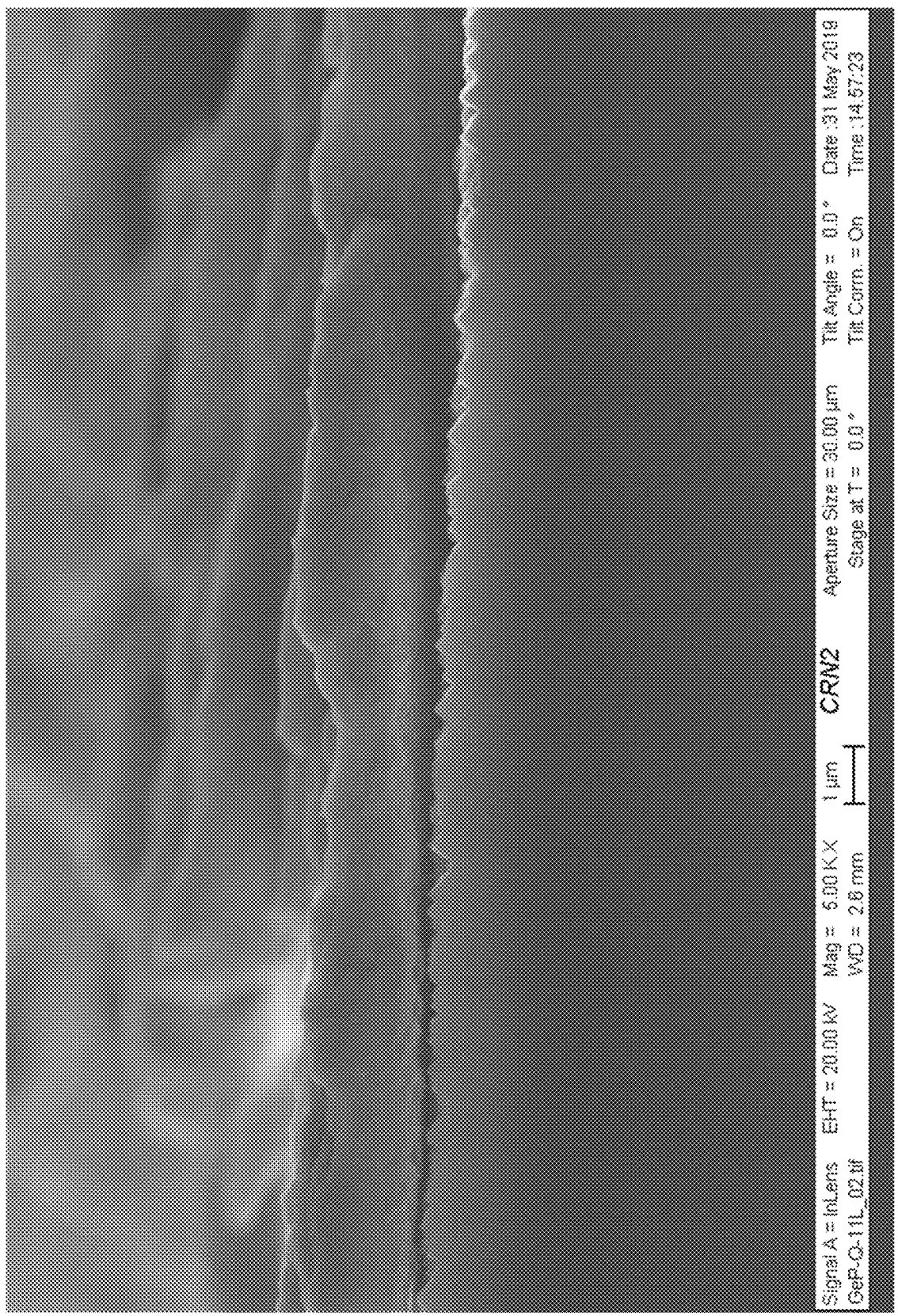
FIG. 3J shows cross-section SEM views of porous germanium sample with various current density of 560 mA/cm$^2$ for etching and of 600 mA/cm$^2$ for passivation.
Figure 3K:
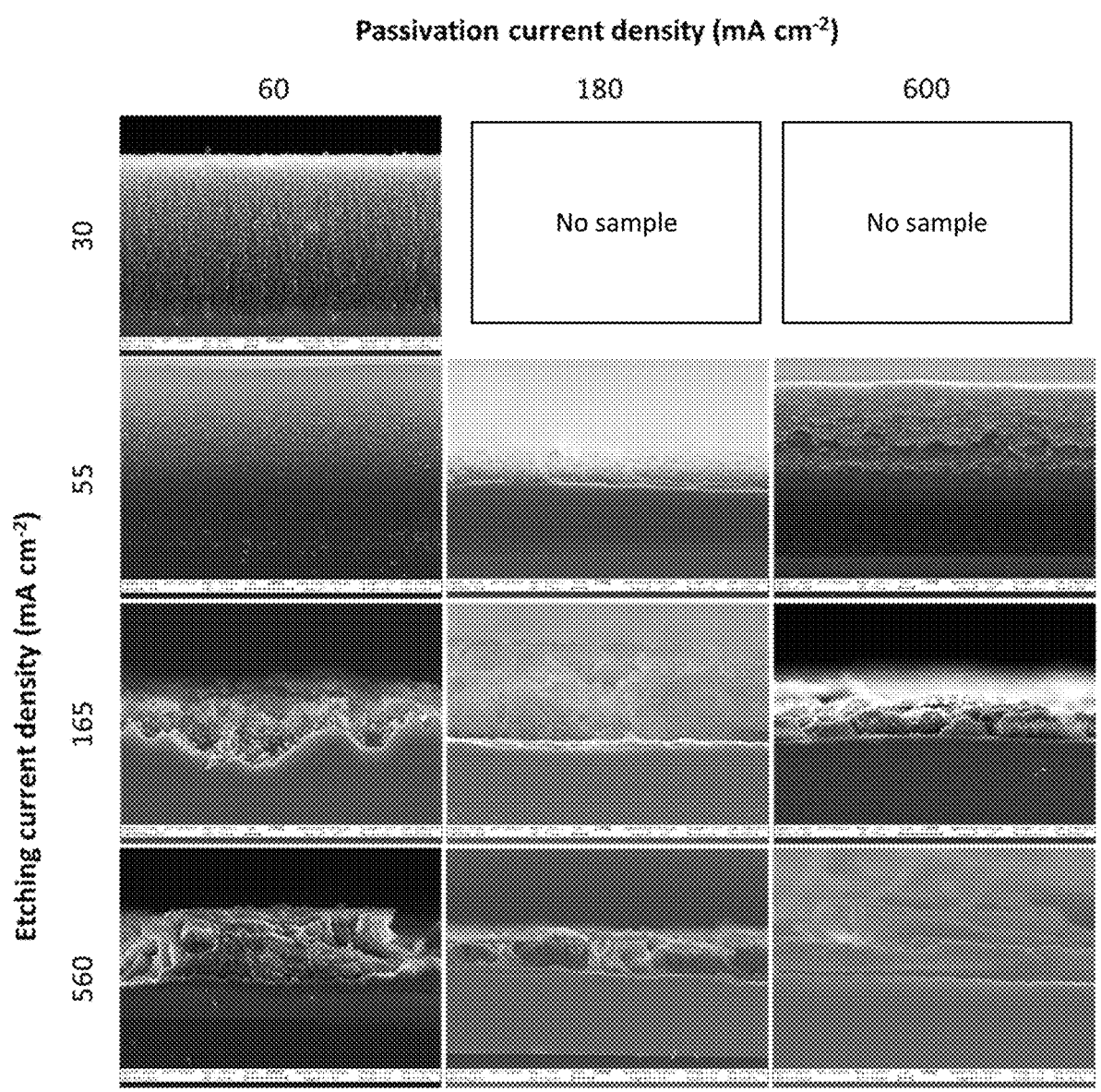
FIG. 3K is a compilation of the cross-section SEM views of porous germanium sample of the embodiments presented in FIGS. 3A to 3J to help better visualize the influence of the current densities.

To appreciate the influence of current density, different experiments may be performed with various values of etching and passivation current density for pulse duration of about 0.05 sec and 0.2 sec for etching and passivation, respectively. To assess a possible influence of the charge quantity reaction into the porosification process, a same value of charge reaction was kept constant during etching as well as during passivation processes in the presented embodiments. As is can be appreciated for the embodiments presented in FIGS. 3A to 3J, porosification of germanium can be more efficient for low values of etching and passivation current density, e.g. between about 30 and 60 mA/cm$^2$. FIG. 3K is a compilation of the cross-section SEM views of porous germanium sample of the embodiments presented in FIGS. 3A to 3J to help better visualize the influence of the current densities. In these embodiments, the related charge reaction quantities can be between about 10.8 and 86.4 C for etching and passivation, respectively. This corresponds to a ratio passivation/etching of about 8, which can be used as a reference for further porosification.

Passivation Pulse Duration

Figure 4A:
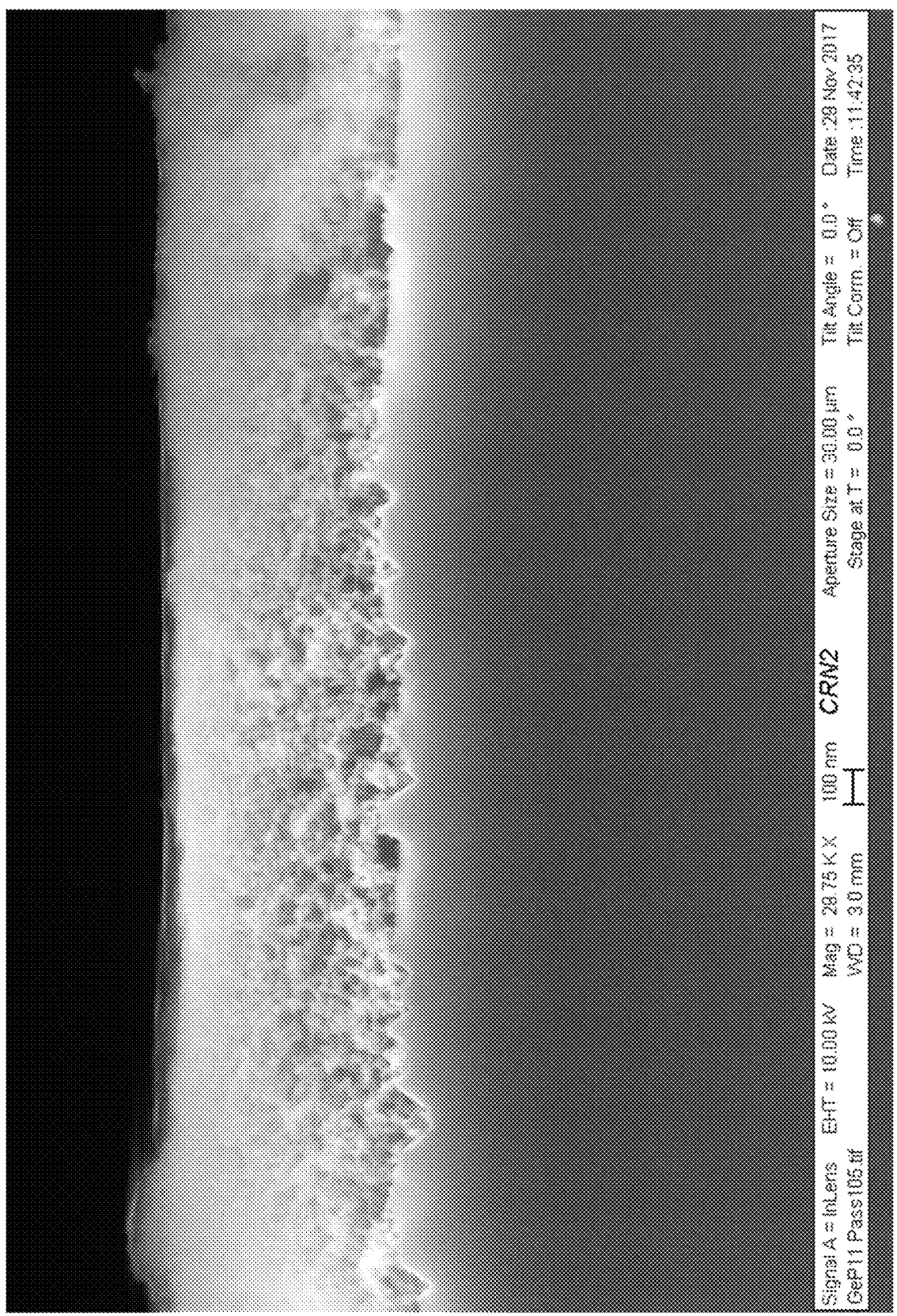
FIG. 4A shows cross-section SEM views of porous germanium sample with a passivation pulse duration of 0.001 s.
Figure 4B:
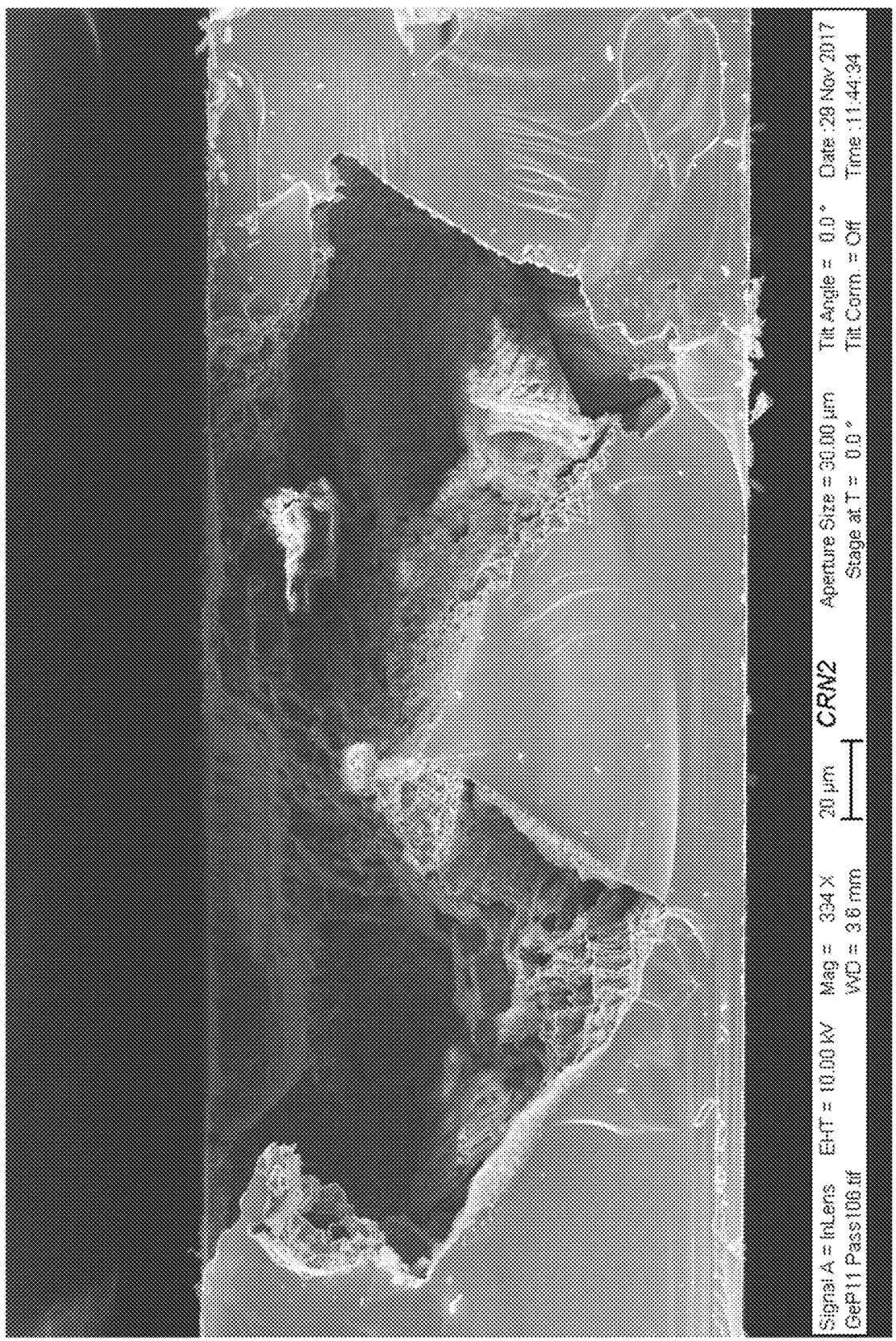
FIG. 4B shows cross-section SEM views of porous germanium sample with a passivation pulse duration of 0.01 s.
Figure 4C:
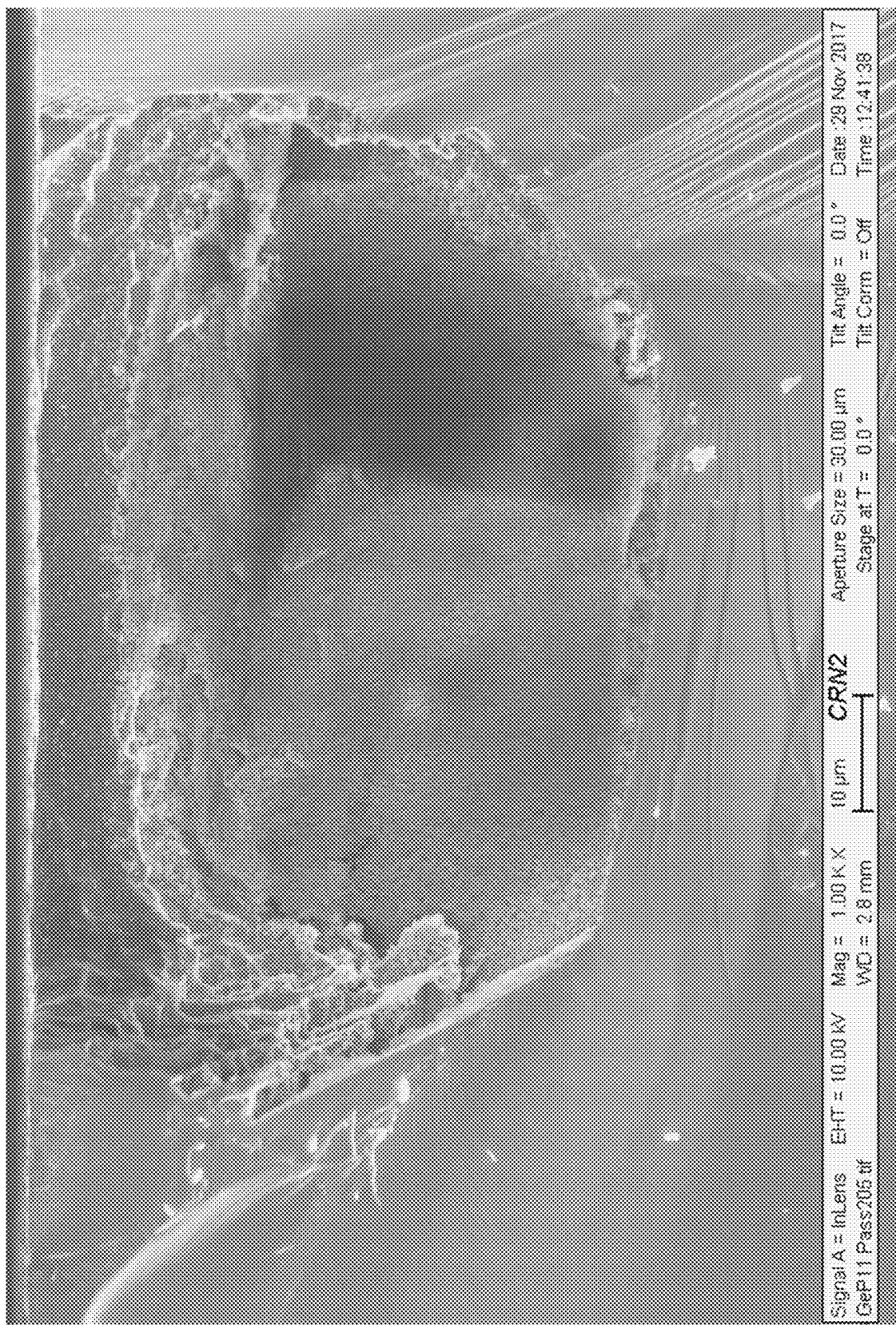
FIG. 4C shows cross-section SEM views of porous germanium sample with a passivation pulse duration of 0.02 s.
Figure 4D:
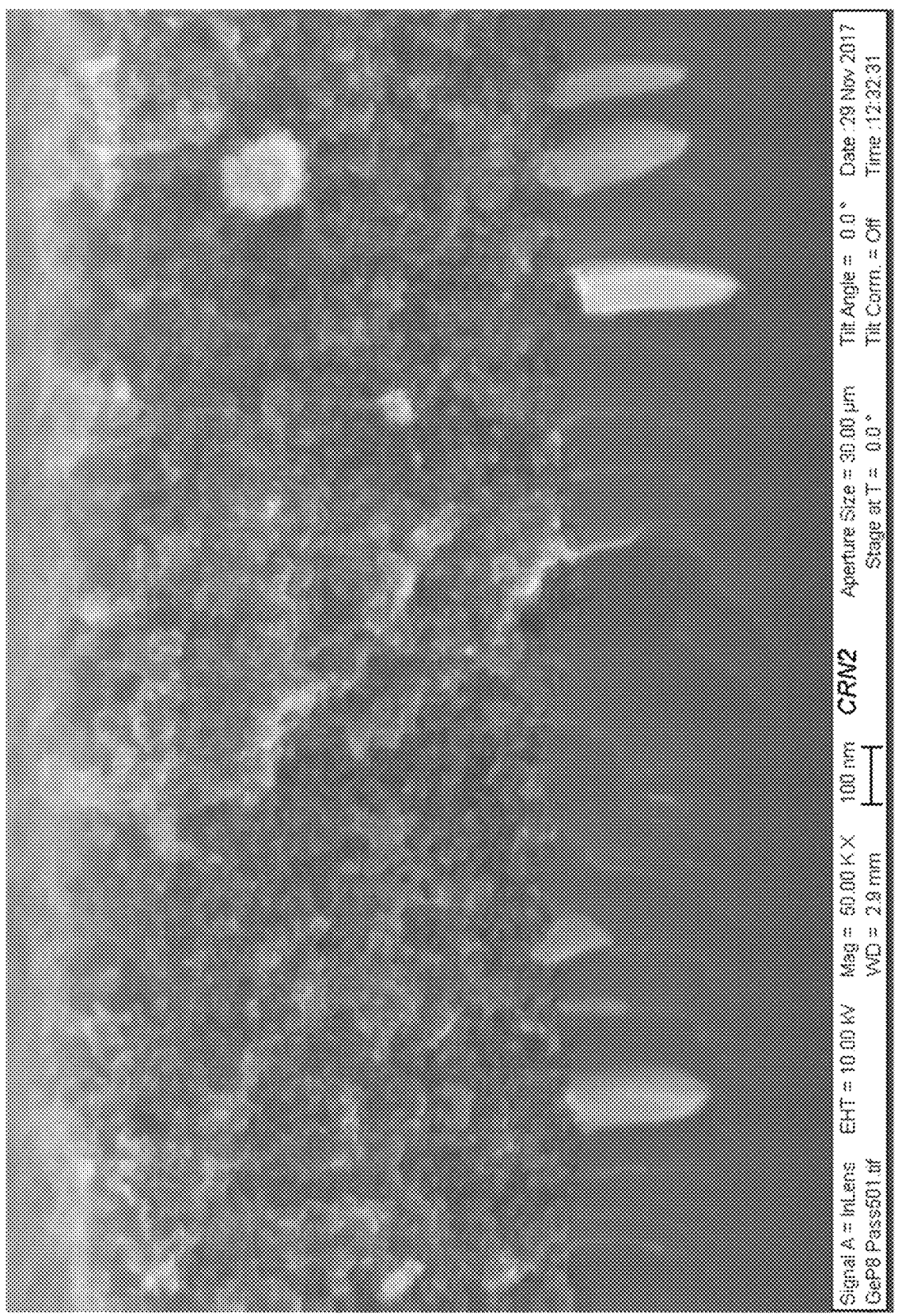
FIG. 4D shows cross-section SEM views of porous germanium sample with a passivation pulse duration of 0.1 s.
Figure 4E:
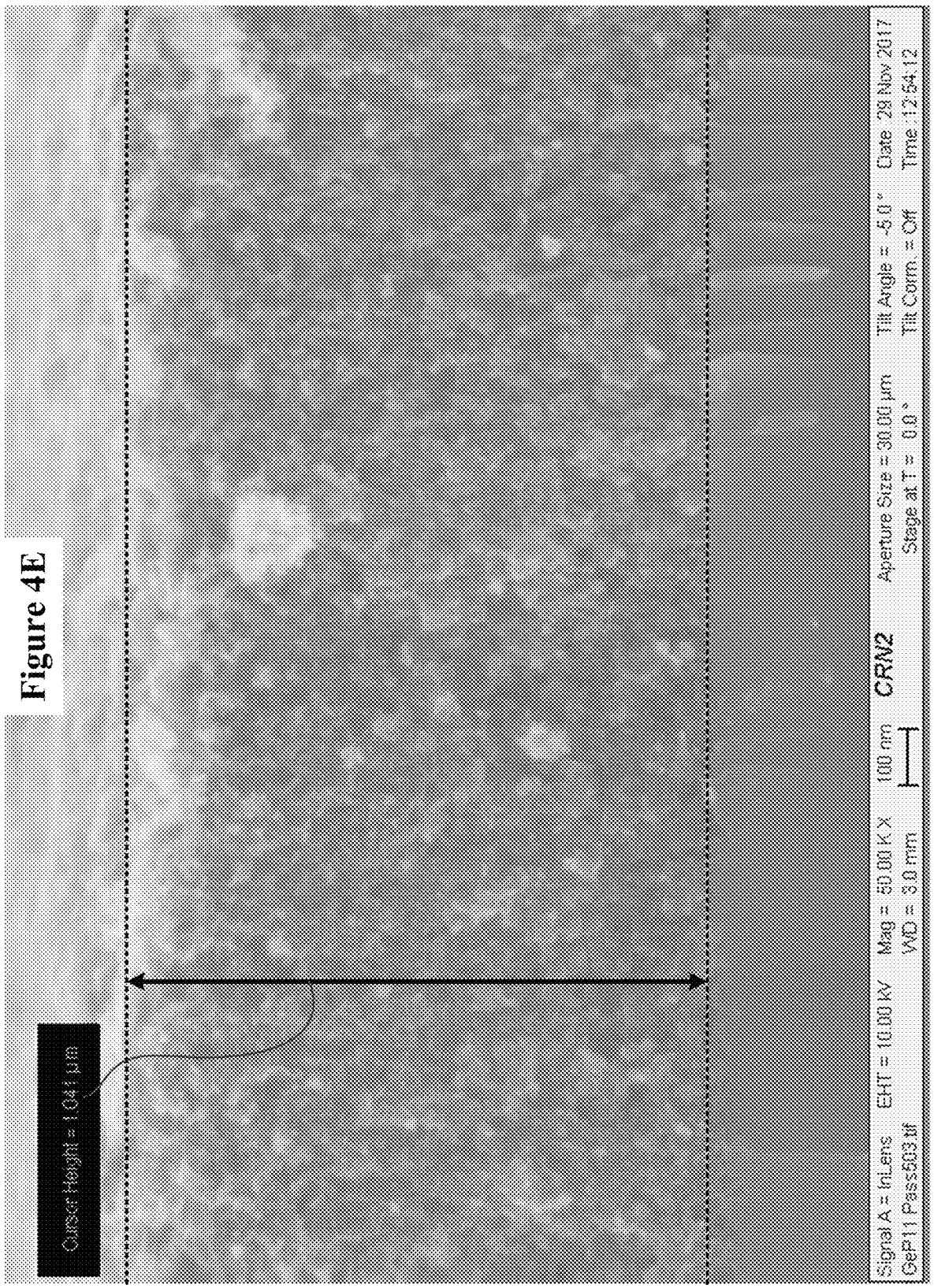
FIG. 4E shows cross-section SEM views of porous germanium sample with a passivation pulse duration of 0.2 s.
Figure 4F:
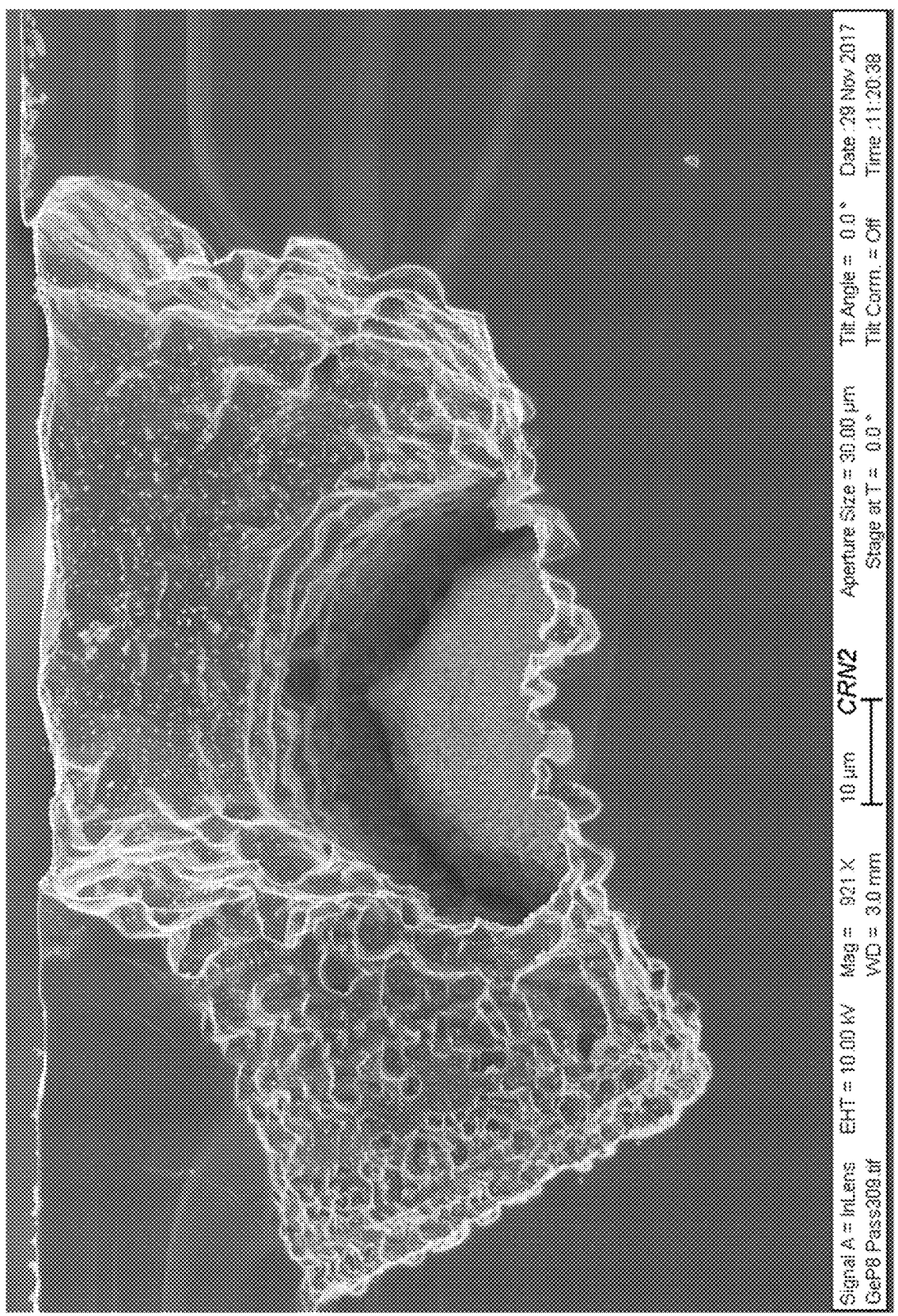
FIG. 4F shows cross-section SEM views of porous germanium sample with a passivation pulse duration of 0.5 s.
Figure 4G:
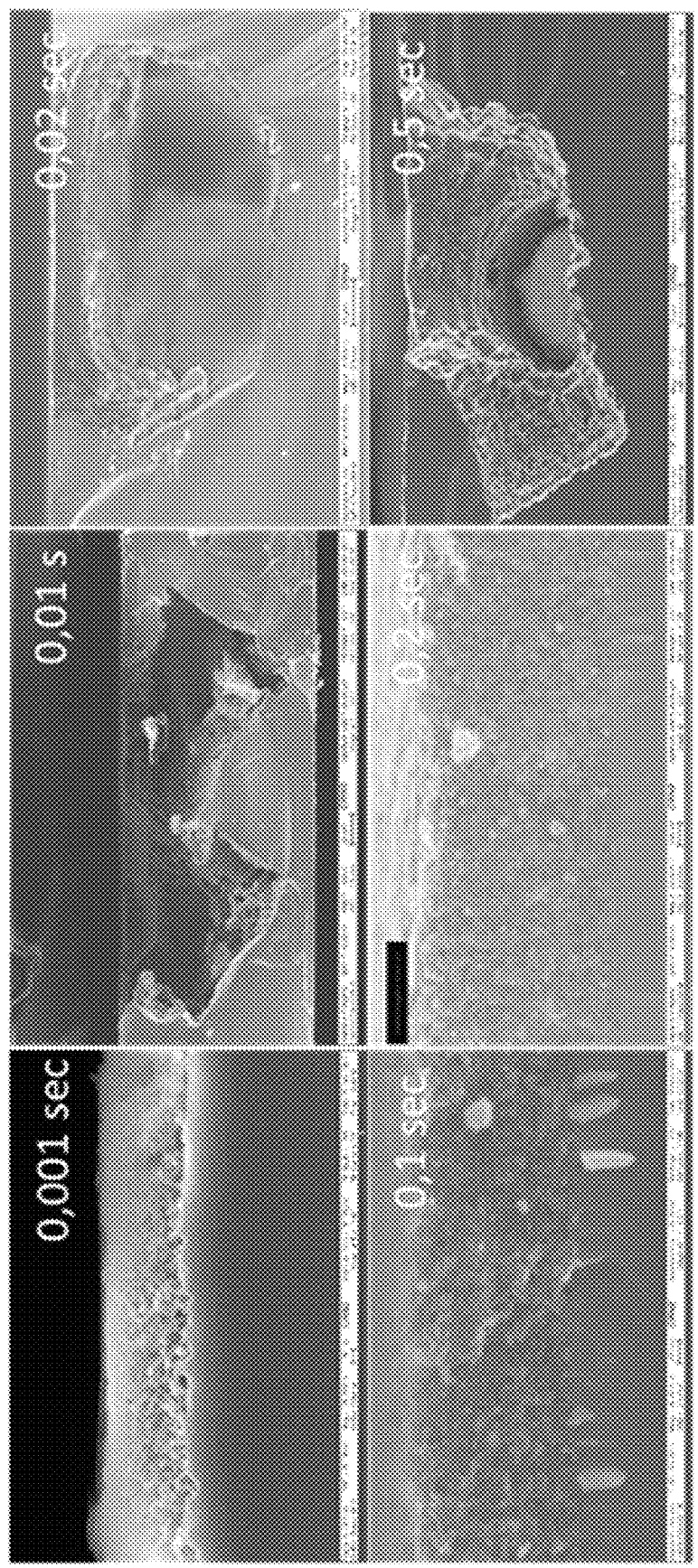
FIG. 4G is a compilation of the cross-section SEM views of porous germanium sample of the embodiments presented in FIGS. 4A to 4F to help better visualize the influence of the current passivation pulse duration.

In some embodiments, passivation pulse duration may be chosen between about 0.1 and 0.2 seconds, due to the high porous layer variation when passivation duration outside of this range can be used. To illustrate this, the embodiments presented in FIGS. 4A to 4F shows how porous germanium can react when subjected to an exemplary recipe of about 30 mA/cm$^2$ of etching current density for about 0.05 seconds etching current and about 60 mA/cm$^2$ passivation current density can be applied. FIG. 4G is a compilation of the cross-section SEM views of porous germanium sample of the embodiments presented in FIGS. 4A to 4F to help better visualize the influence of the current passivation pulse duration. As it can be seen, for the present embodiments that passivation value between about 0.1 and 0.2 seconds may allow for the formation of an homogeneous layer of porous germanium. It is important to note that the passivation effect can be strongly dependent on other porosification parameters, especially the etching current density value.

Influence of Etching Current Density

Figure 5A:
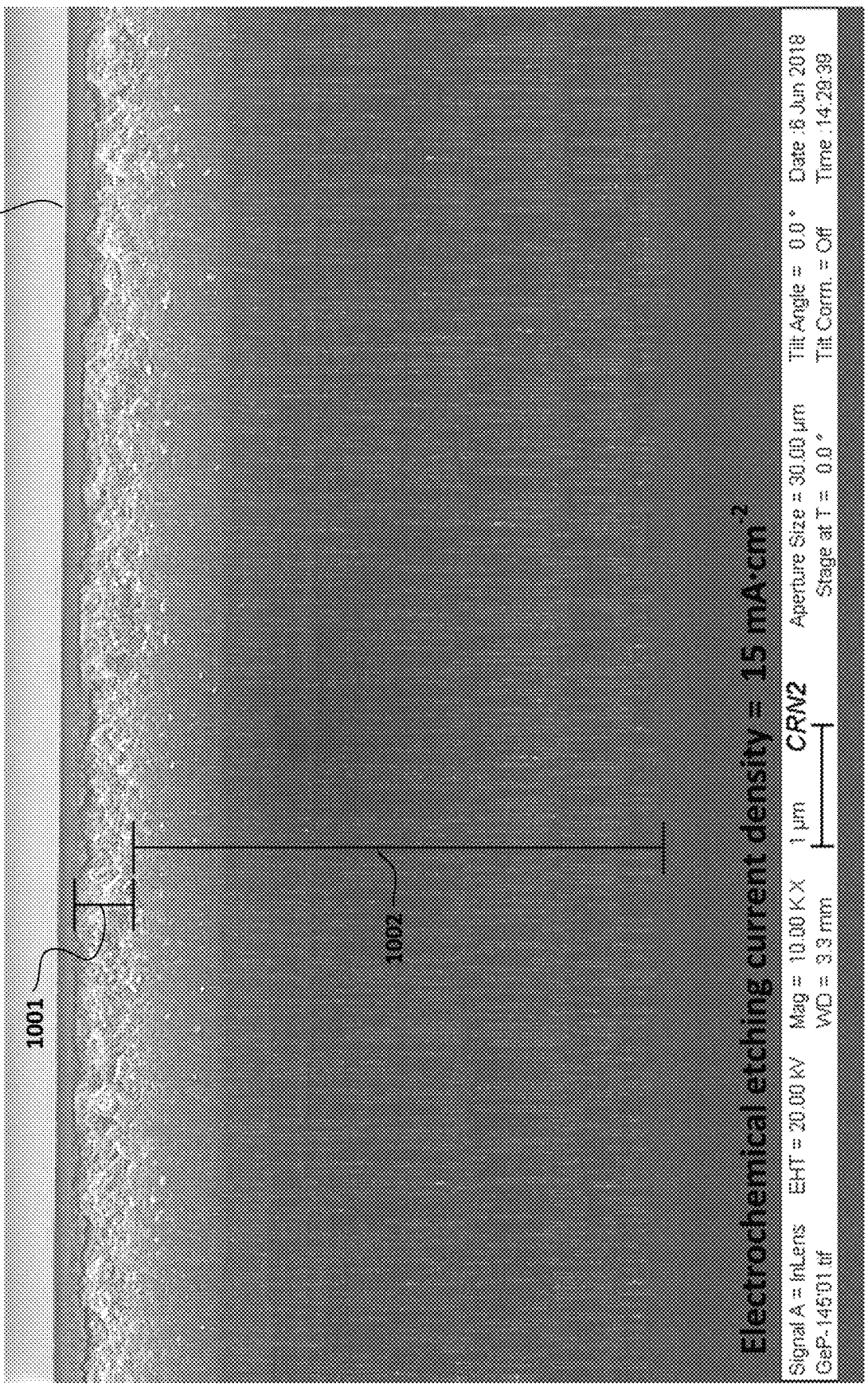
FIG. 5A shows cross-section SEM views of various porous germanium with sponge-like and/or tubular morphologies, etched during 120 min with an etching current density of 15 mA/cm$^2$.
Figure 5B:
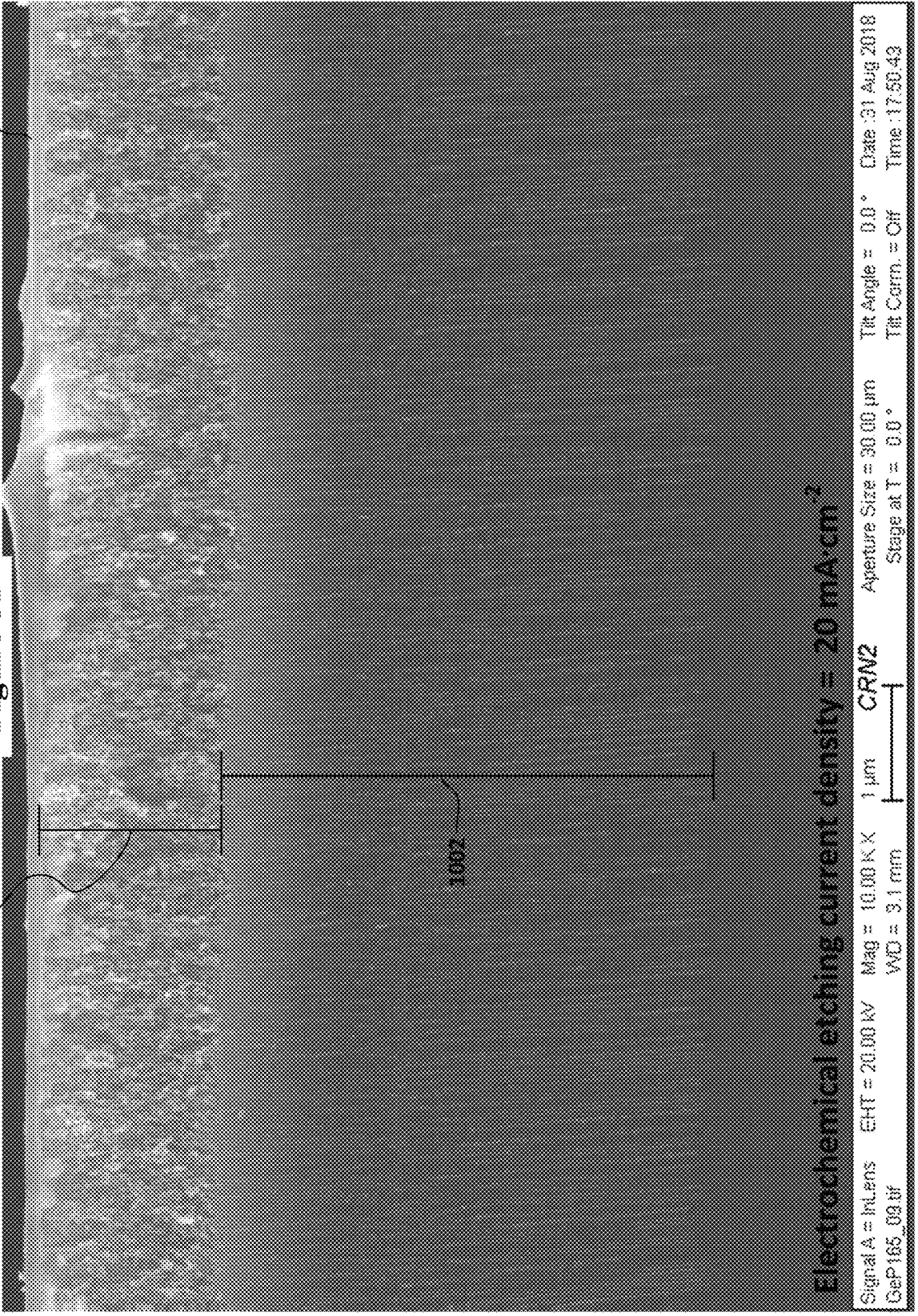
FIG. 5B shows cross-section SEM views of various porous germanium with sponge-like and/or tubular morphologies, etched during 120 min with an etching current density of 20 mA/cm$^2$.
Figure 5D:
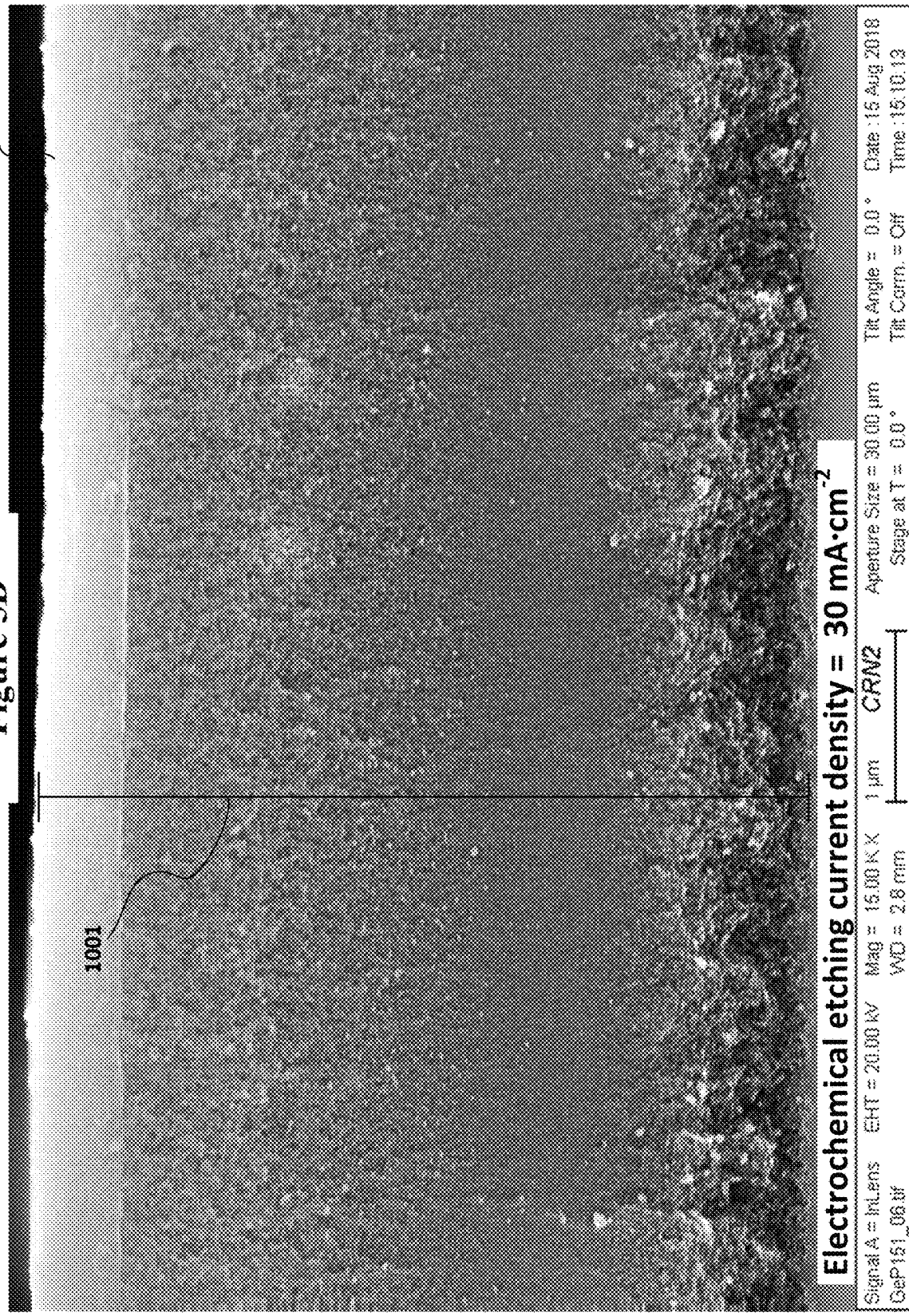
FIG. 5D shows cross-section SEM views of various porous germanium with sponge-like and/or tubular morphologies, etched during 120 min with an etching current density of 30 mA/cm$^2$.

Cross-sectional SEM images of porous germanium for electrochemical etching current densities of 15, 20, 25 and 30 mA/cm$^2$ are shown in the embodiments presented in FIGS. 5A, 5B, 5C and 5D, respectively. By comparing these SEM images, someone skilled in the art can appreciate the evolution of the porous morphology as a function of the etching current density. As can be seen in the embodiment of FIG. 5A, the etching current density of 15 mA/cm$^2$ can result in the formation of a porous germanium layer with a predominantly tubular morphology 1002 and a total thickness of 4.9 μm (a layer with sponge-like morphology 1001 with a thickness of about 450 nm can be noticed on the top region). Here, the term "tubular" pore refers herein to a mostly cylindrical pore shape or linear pore shape that has no significant secondary pore on the cylindrical pore walls. The sponge-like term, introduced by Tutashkonko et al. (DOI: 10.1016/j.electacta.2015.08.112), refers to a very disordered porous morphology, in which the pore size is very small (5 to 20 nm approximately), and the geometry is generally spherical and can be locally mostly isotropic. The SEM images of the embodiments presented in FIG. 5B and FIG. 5C indicate that increasing the current density to 20 mA/cm$^2$ and 25 mA/cm$^2$, respectively, led to the formation of porous layers with thicker areas of sponge-like morphology. Thus, while the total thickness of the porous layer remains in the range of 5.2 μm to 5.4 μm for current densities of 20 and 25 mA/cm$^2$, the thickness of the top region with sponge-like morphology 1001 reached 1.6 μm and 2.6 μm, respectively. In embodiments that may be avoided, FIG. 5D shows that applying a current of 30 mA/cm$^2$ results in a fully sponge-like porous layer with a thickness of 4.1 μm and without the formation of a tubular morphology underneath.

Therefore, two porous morphologies are obtained: sponge-like 1001 and tubular 1002 porous germanium. The first one was previously reported by Bioud et al. as the only morphology obtained by FBEE regime for an etching current density of 20 mA/cm$^2$ (Bioud et al. DOI: 10.1016/j.electacta.2012.10.031). This discrepancy with our results may be related to the different wafer resistivity of 25 mΩ/cm$^2$ used by Bioud et al. compared to 13.7 mΩ/cm$^2$ used in the presented embodiments. As for the tubular morphology 1002, it was already observed in pore layers formed in CBEE regime and where it can appear at low etching current densities, around 2 mA/cm$^2$ for a three-hour experiment (Tutashkonko et al. DOI: 10.1016/j.electacta.2012.10.031; Bioud et al. DOI: 10.1016/j.electacta.2012.10.031; Tutashkonko et al. DOI: 10.1016/j.electacta.2015.08.112). In some the presented embodiments, we observe a change from sponge-like 1001 to tubular 1002 morphology for etching current densities between 15 and 30 mA/cm$^2$ for 120 min experiment in FBEE regime, which may be the preferred current density in some of the preferred embodiments.

Figure 6A:
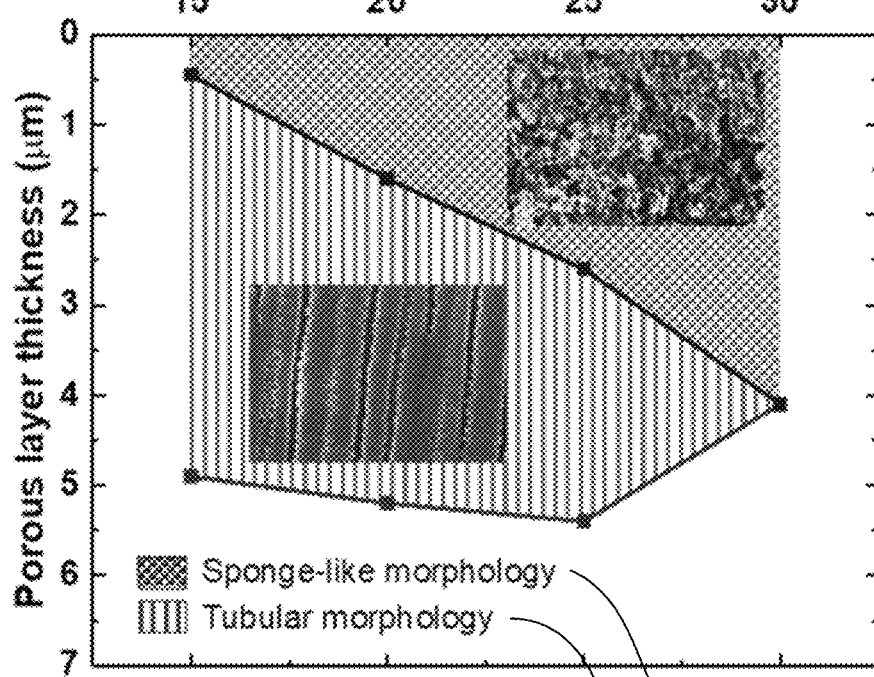
FIG. 6A shows the evolution of the porous layer thickness with morphology representation as a function of the etching current density.
Figure 6B:
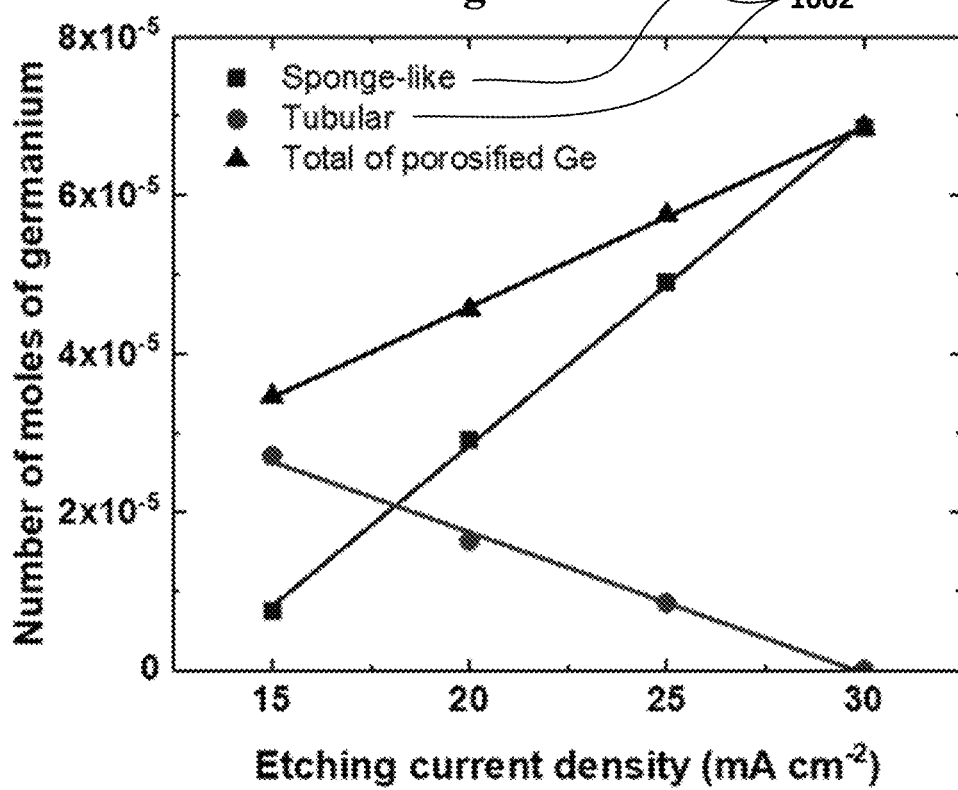
FIG. 6B shows the evolution of the number of moles of germanium reacting during porosification, for sponge-like, tubular and both morphologies.

FIG. 6A summarizes the thickness and distribution of sponge-like 1001 and tubular 1002 morphologies as a function of etching current density for embodiments undergoing a 120 min porosification. FIG. 6B indicates the number of moles of germanium reacting during the electrochemical etching. The number of moles, represented by n in mole, can be calculated from the following equation:

$$n = P \frac{\rho_{Ge}}{M_{Ge}} t_{PGe} S \qquad (1)$$

Where $\rho_{Ge}$ is the density of germanium (5.323 g·cm$^{-3}$), $M_{Ge}$ the molar mass of germanium (72.64 g·mol$^{-1}$), S the surface of etched sample (about 4.15 cm$^2$ in the presented embodiments), $t_{PGe}$ is the thickness of the porous layer obtained from SEM characterizations and P is the porosity of the porous layer obtained from SEM characterizations.

FIG. 6A shows that, ss the etching current density is increased, the thickness of the tubular morphology layer can decrease as it is replaced by the sponge-like layer. Moreover, based on the results illustrated in FIG. 6B, the linear evolution of the amount of germanium reacting during porosification is in agreement with the Faraday's first law, which can indicate a switch between sponge-like and tubular morphology formation. With the increase of etching current density, pore wall nucleation and growth can be allowed. This secondary nucleation can reduce the quantity of fluoride ion diffusing along the pores and consequently preventing anisotropic porosification, leading to the main formation of sponge-like nanostructure. In addition, sponge-like formation can consume a higher amount of germanium, and therefore can correspond to a higher quantity of hydrogen fluoride, than for tubular formation. Thus, the thicker the formed sponge-like layer formed, the more difficult it can be for anisotropic pores to grow.

In the presented embodiments, the tubular morphology can be initially created near the surface and propagates deeper with time as the sample is etched using the presented methods. In some of the presented embodiments, the tubular morphology can be replaced by a sponge-like morphology after a certain time, as the passivation effects of the FBEE process wear off. In those cases, the sponge-like morphology can gradually replace the tubular structure as it propagates deeper into the sample. Increasing the current density can increase the speed of that change of morphology, from tubular to sponge-like, hence the larger proportion of sponge-like morphology for larger current density values. In some embodiments, the speed of the transformation from tubular to sponge-like morphology can consequently be controlled with the etching current density. This can be explained by considering the correlation between the etching orientations with density-dependent electric field at pore tips. In fact, the etching orientation can switch from a crystal orientation of the germanium substrate to a current line orientation of the FBEE as a function of etching current density. Initially, etching proceeds following the crystal orientation with a higher etching rate compared to other directions, because of the relatively high electric field at the pores tip (Santinacci et al. DOI: 10.1016/ j.crci.2008.06.004). However, as proposed by Tutashkonko et al. (DOI: 10.1016/j.electacta.2015.08.112), the value of etching current density can be high enough to break the barrier energy at the interface of semiconductor-electrolyte, at the pore walls, and a sponge-like morphology can then be formed in germanium. To sum up, high values of etching current density can lead to etching with a current line orientation, while low values of etching current density can lead to etching with a crystal orientation. Hence, low values of etching current density can lead to a tubular structure that can follow the <100> direction and 6° miscut angle of the germanium substrate used in some of the previously presented embodiments, where the current density can be maximum at the pore tips. Someone skilled in the art will appreciate that, while the crystalline orientation of the presented embodiments can be chemically stable and can allow for a better charge transfer at the surface of their germanium substrate, it does not have to be limited to the one considered in the presented embodiments. In the presented embodiments, the crystalline orientation is fixed at <100> direction to better explain the working principals of the presented etching method and to better illustrates the influence of the various etching parameters on the resulting porosity. This observation is consistent with the general theory of pore formation due to excessive electric field at pore tips, initially proposed by Lehmann et al. (Lehmann et al. 10.1016/50921-5107(99)00286-X) for silicon and reported in other works for germanium (Garralaga Rojas et al. DOI: 10.1149/1.3147271; Fang et al. 10.1016/j.jelechem.2006.02.021; Tutashkonko et al. DOI: 10.1016/j.electacta.2012.10.031). However, in the presented embodiments, both crystal orientation and current line orientation etching mechanisms can contribute to the porosification process for medium values of etching current density. This means that by applying enough current density, it is possible to switch from a crystal orientation regime to the current line orientation regime, and so to etch the pore walls. It is important to note that current line orientation etching, can relate to sponge-like formation, starts near the sample surface, then go further in depth with higher etching current densities. This phenomenon can be associated with a facilitated charge transfer on the walls close to the surface rather than at the pores bottom, which may be due to a lower energy barrier and/or a higher hydrogen fluoride concentration. Indeed, due to a very low pH of the HF/Ethanol electrolyte, which can be below 1, the main specie present in the solution can be hydrogen fluoride (M. E. Denham, M. R. Millings, Geochemistry of hydrofluoric acid in kaolinitic soils (U), (2003)).

An underlying mechanism that can allow to control the conditions for creating tubular morphology with the proposed rapid bipolar electrochemical etching method may be the degree of the electric field at the interface of semiconductor/electrolyte that can be modulated by the etching current density. With the increase of the etching current density, the electric field, initially concentrated at the pore tips, can be distributed around the pore and can allow nucleation on the walls at the origin of the sponge-like structure.

Influence of Total Porosification Time

Figure 7A:
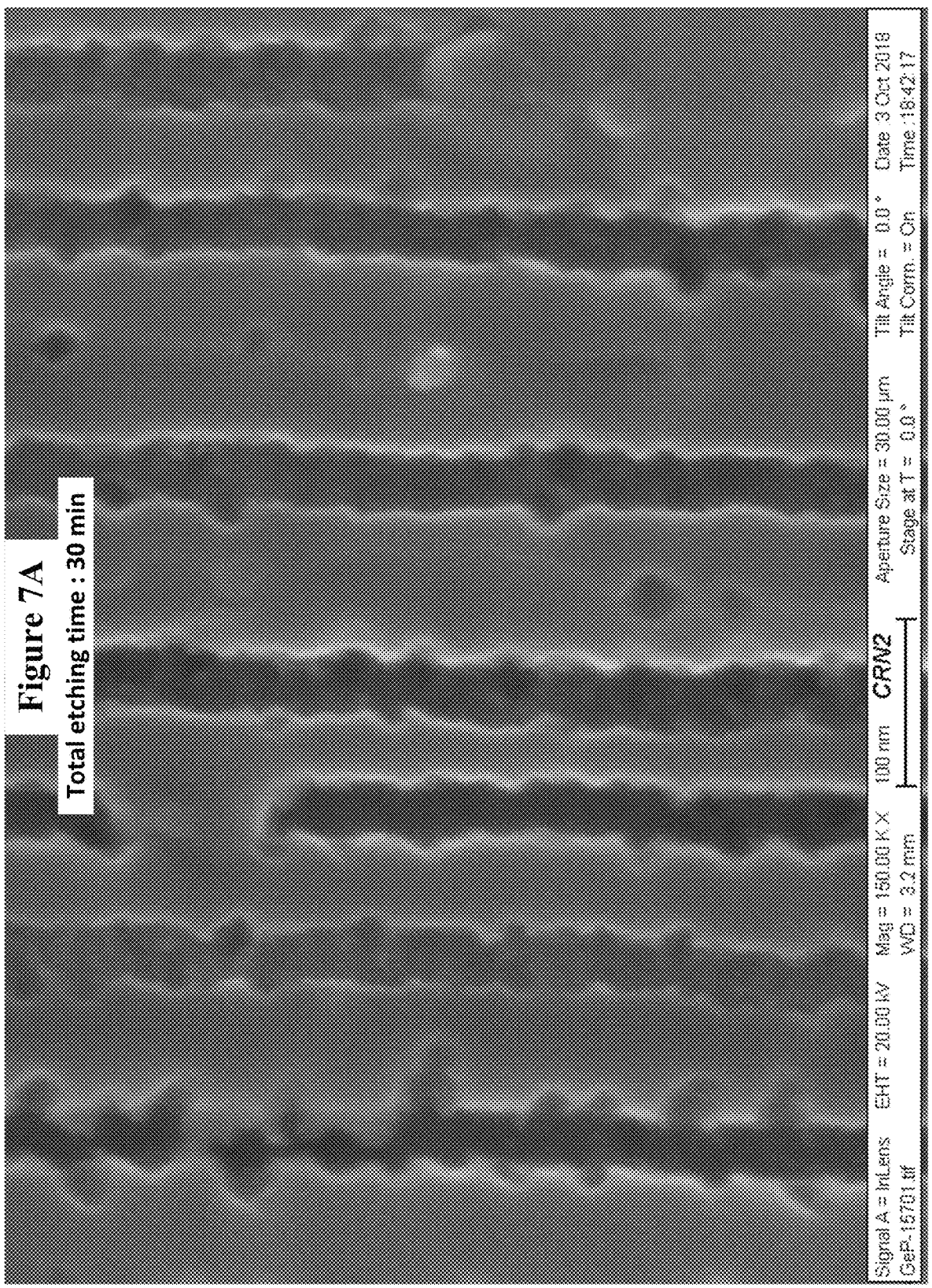
FIG. 7A shows cross-sectional SEM views of porosified germanium having a full electrochemical etching time of 30 minutes and an etching current density of 15 mA·cm$^{-2}$.
Figure 7D:
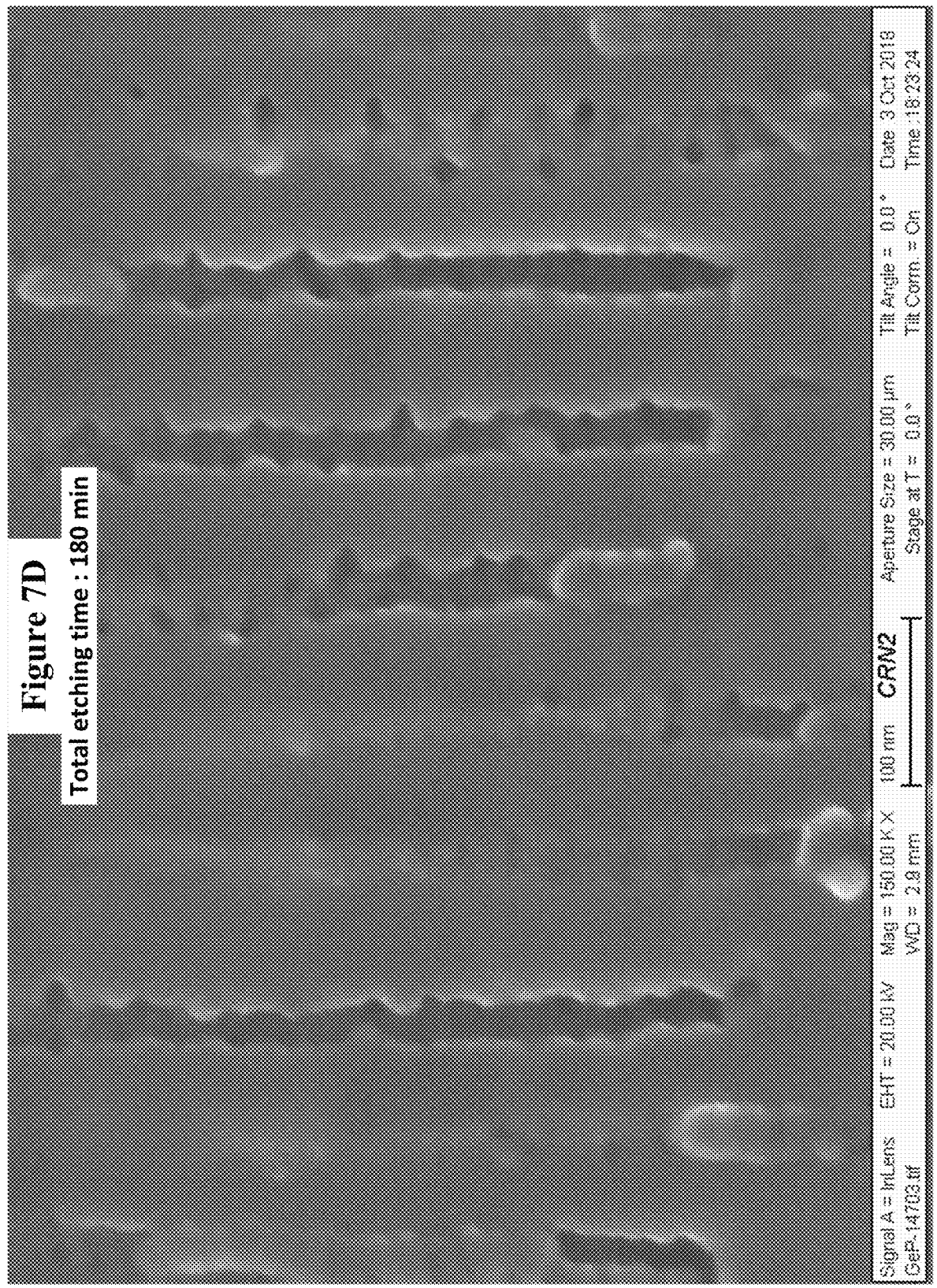
FIG. 7D shows cross-sectional SEM views of porosified germanium having a full electrochemical etching time of 180 minutes and an etching current density of 15 mA·cm$^{-2}$.
Figure 7G:
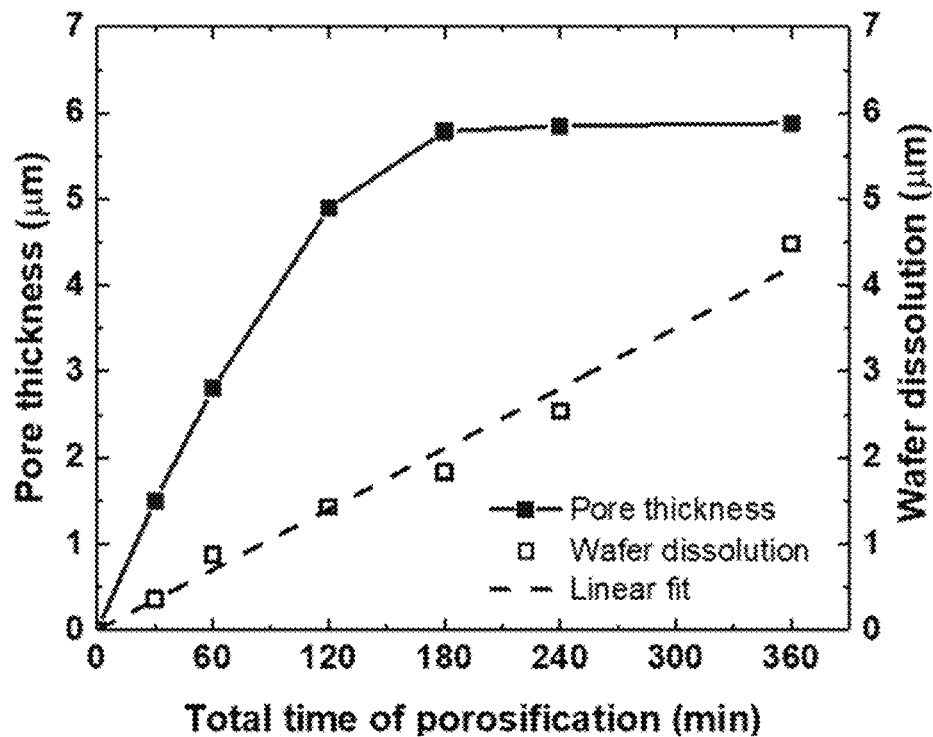
FIG. 7G shows the evolution of pore thickness and wafer dissolution as a function of the total time of porosification.
Figure 7H:
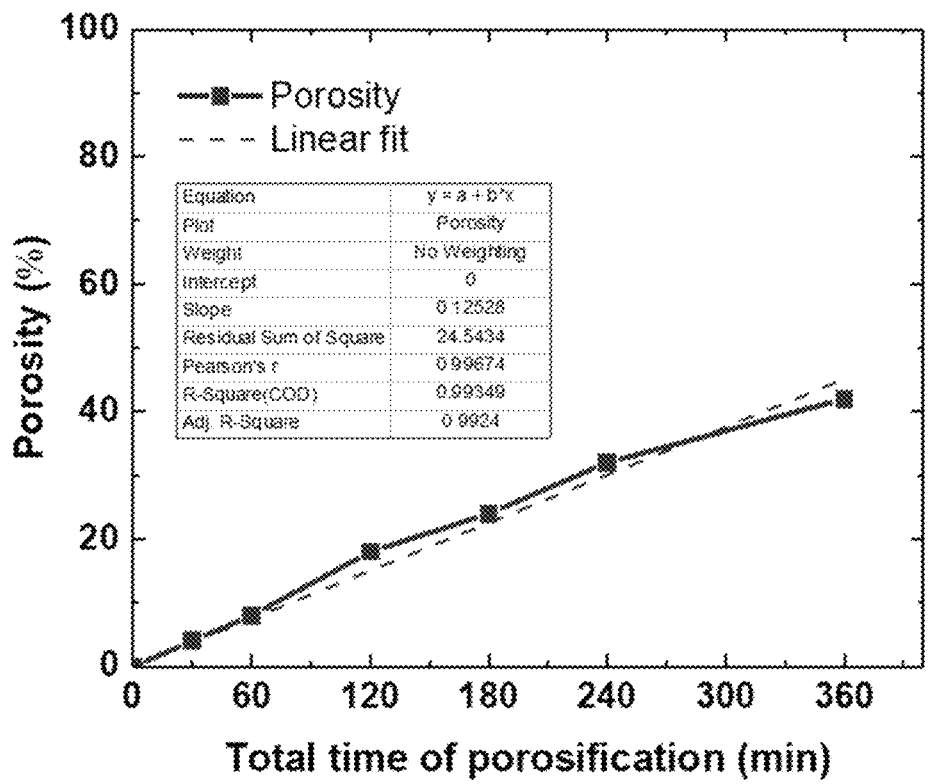
FIG. 7H shows the evolution of porosity as a function of the total time of porosification.
Figure 7I:
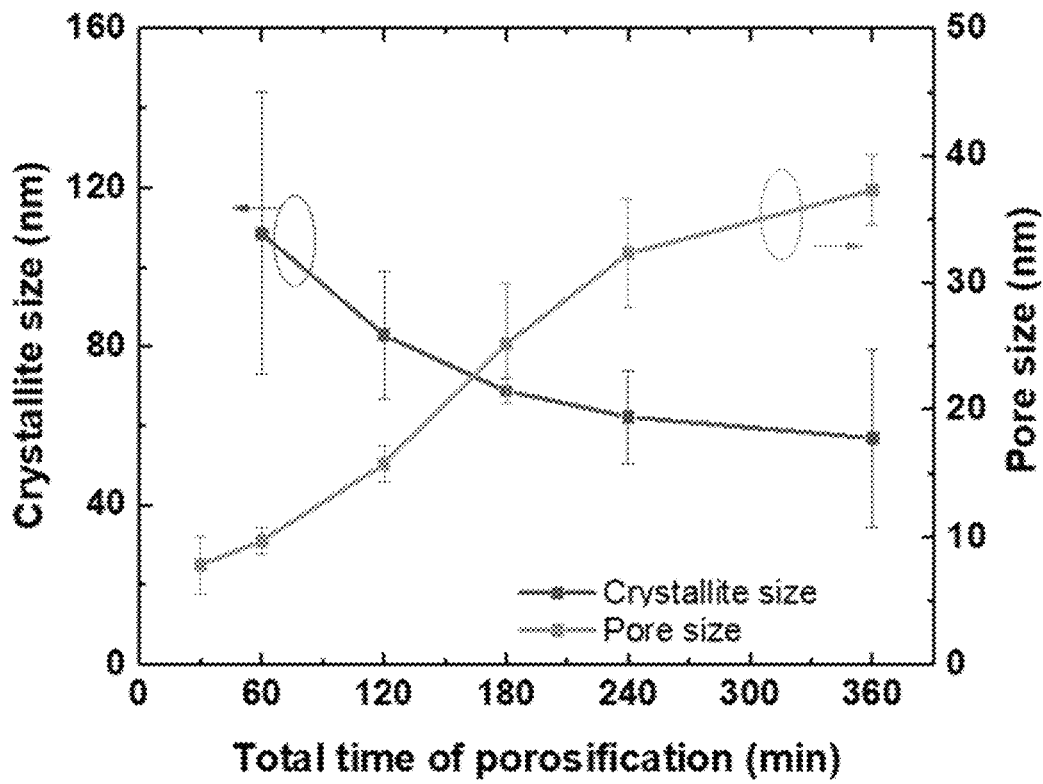
FIG. 7I shows the evolution of crystallite size and pore size as a function of the total time of porosification.
Figure 7J:
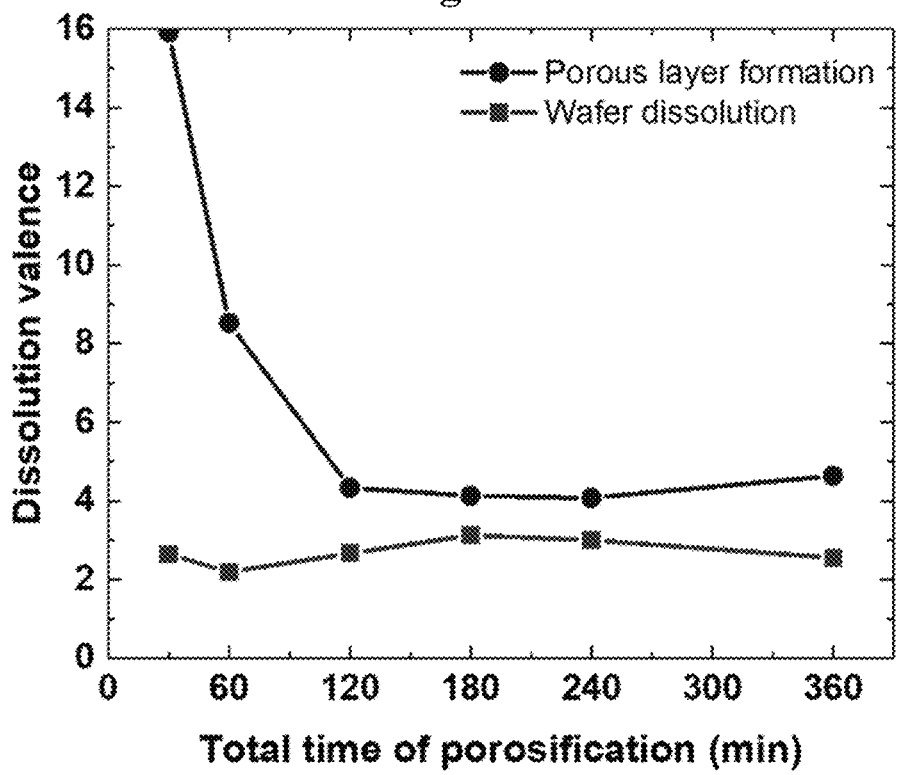
FIG. 7J shows the value of dissolution valence for porous layer formation and wafer dissolution as a function of the total time of porosification.
Figure 7K:
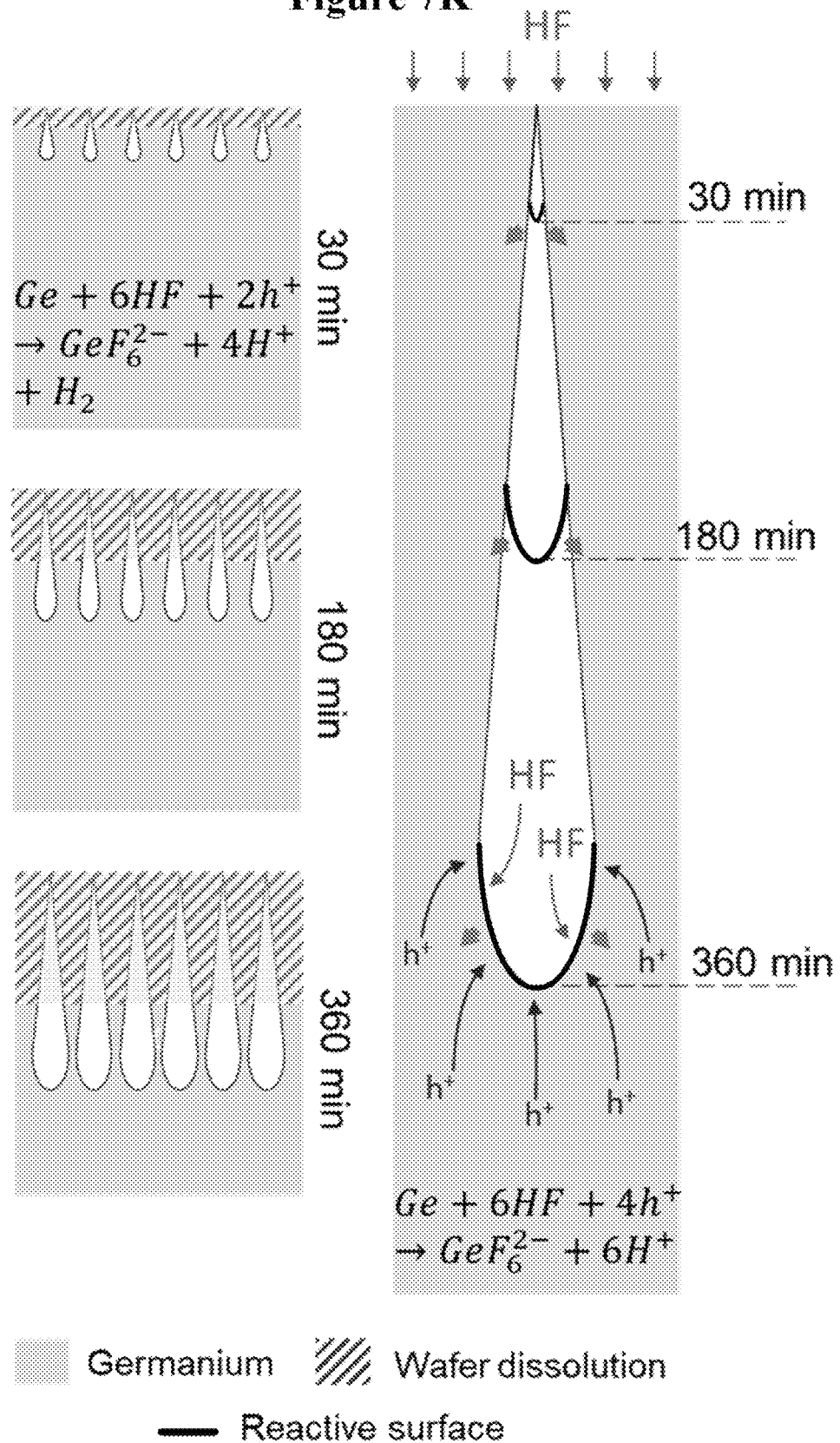
FIG. 7k shows a schematic illustration of tubular porous morphology evolving through the germanium wafer.

To obtain an anisotropic morphology and to study its formation mechanism, an etching current density of about 15 mA·cm$^{-2}$ can be selected in the following embodiments where the influence of the total etching time corresponding to the sum of the etching pulse durations of all the etching pulses applied can be investigated. FIGS. 7A to 7F shows cross-sectional SEM images of porous layers obtained with an etching current density of 15 mA/cm$^2$ and total etching time of the FBEE process varying from about 30, 60, 120, 180, 240 and 360 minutes, respectively. Evolutions of morphologies over the entire porous layer thickness of similar embodiments are shown in FIGS. 16A to 16F, respectively, and where only a thin sponge-like morphology can be observed (about 200 nm) at the top of the porous layer. According to those last SEM images, a tubular morphology can be identified for every value of the total time of porosification. For these embodiments, the thickness of the porous layer can be equivalent to the length of the pore, hereafter called pore thickness. FIG. 7G shows the evolution of pore thickness and wafer dissolution as a function of total etching time; FIG. 7H shows the evolution of porosity as a function of total etching time; and FIG. 7I shows the pore and crystallite size as a function of total etching time. For these embodiments, as it can be observed on these figures, the tubular pore size, porosity, wafer dissolution and pore thickness can be increased with the total time of porosification. For the pore thickness (FIG. 7G), two regimes can be observed for these embodiments: a first one that can be associated with a high etching rate (35 nm min') for a total time of porosification that can be between 0 and about 180 min, and a second one that can be associated with a low etching rate for a total time of porosification beyond about 180 minutes (0.49 nm·min$^{-1}$). However, wafer dissolution, which can be defined by the difference between the wafer thickness before and after electrochemical etching, can be associated with a linear trend with an almost constant rate of around 12 nm·min$^{-1}$ (FIG. 7G). This can be explained by the continuous dissolution of the sample surface, e.g. the porous layer surface, during porosification. In other terms, two mechanisms could be involved during the electrochemical etching of Ge. The first one can be localized at the pore tips and directly connected to the intense local electric fields; the second one can be intervening on the surface and can be acting as a continuous electropolishing and can be causing the dissolution of the wafer as the porosification progresses. Concerning the porosity, the linear increase can be related to the increase of the pore diameter during porosification. FIG. 7H further shows that, porosity can increase linearly from 5% to 40% with a rate of 0.125% min$^{-1}$ and thickness increases up to a maximum of 6 µm after about 180 min of etching duration. This rate of porosification means that a porosity of about 45% could be reached after about 360 min of porosification process and 100% porosity (electropolishing) could theoretically be reached in about 800 min. However, it could be theoretically argued that the porosity would reach a saturated value due to the crystallite depletion over the course of porosification. In addition, with a continued thinning of the crystallites, the porous layer could become mechanically weak, which could cause electropolishing of the porous before the expected 800 minutes of total time of porosification. FIG. 7I displays variation of the pore size and crystallite size as a function of a total time of porosification, where it can be observed that the pore size can be increased by increasing the total time of porosification and where it can also be observed that the crystallite size can be reduced by increasing the total time of porosification. It is interesting to note that FIG. 7H can be interpreted to be presenting a linear increase of porosity, for these embodiments, while FIG. 7I highlights a seemingly non-linear evolution in average pore size. This may indicate that pore density can be changed with the increasing of total etching time. FIG. 7K schematically depicts the evolution of tubular morphology into the germanium wafer of some embodiments with the increase of a total time of porosification. The relative mechanism reaction displayed in FIG. 7K can be determined based on the following valence dissolution calculations. Divalent reaction (Turner et al. DOI: 10.1149/1.2430289; Memming et al. DOI: 10. 1016/s0 022-0728(69)80 097-5; E. J. Garralaga Rojas, Mesoporous Germanium Layer Formation by Electrochemical Etching, Christian-Albrechts-Universitat zu Kiel, 2010) may be the main reaction at the surface and at the origin of the wafer dissolution, while tetravalent reaction (Tutashkonko et al. DOI: 10.1016/j.electacta.2012.10.031) may be to be the reaction at the origin of pore growth in accordance with Bioud et al. (DOI: 10.1016/j.electacta.2012.10.031). Both reaction equations are written in FIG. 7K.

Valence dissolution $\eta_V$ can be calculated following the equation (Lehmann et al. DOI: 10.1002/3527600272):

$$\eta_V = \frac{I \cdot T_e \cdot m_{Ge}}{e \cdot m_{diss}}$$

Where I is the applied current, $T_e$ the total etching time, $m_{Ge}$ the atomic mass of germanium ($1.20622 \cdot 10^{-22}$ g), e the elementary charge ($1.6 \cdot 10^{-19}$ C) and $m_{diss}$ the dissolved mass of germanium during porosification. $T_e$ was calculated by the equation $T_e = T \cdot (t_e/(t_e + t_p))$, wherein T is a total time of porosification, then $t_e$ and $t_p$ are the pulse durations for etching and passivation, respectively. The dissolved mass for wafer dissolution ($m_{diss_{WD}}$) can be calculated with the following equation:

$$m_{diss_{WD}} = \rho_{Ge} \cdot S \cdot t_{WD}$$

The mass for the porous layer formation ($m_{diss_{PL}}$) can be calculated with the following equation:

$$m_{diss_{PL}} = \rho_{Ge} \cdot S \cdot t_{PL} \cdot P$$

Where $\rho_{Ge}$ is the density of germanium (5.323 g·cm$^{-3}$), S is the surface are of sample (4.15 cm$^2$), t is the thickness of wafer dissolution or porous formation layer and P is the porosity. FIG. 7J illustrates the dissolution valence values calculated for the porous layer formation and wafer dissolution of the presented embodiments. Based on these results, the wafer dissolution may follow a divalent reaction mechanism (Turner et al. DOI: 10.1149/1.2430289), with $\eta_V$ that may be close to 2, and that can be expressed as:

Ge+6HF+2$h^+$→GeF$_6^{2-}$+4H$^+$+H$_2$

Similarly, the porous layer formation may mainly be following a tetravalent reaction mechanism (Tutashkonko et al. DOI: 10.1016/j.electacta.2012.10.031), which can be expressed as follows:

Ge+6HF+$h^+$→GeF$_6^{2-}$+6H$^+$

This last result can be in good agreement with the study of Bioud et al. (DOI: 10.1016/j.electacta.2017.02.115) who explained that a layer formed by FBEE is mainly due to the tetravalent reaction. However, in some embodiments, a dissolution valence greater than 4 can be obtained for porosification times of about 30 and 60 min. This may indicate that another mechanism could be involved in the formation of porous layers.

The increase of pore diameter and so porosity over a total time of porosification can be related to the current distribution at the pore tips. Indeed, Lehmann et al. (DOI: 10.1016/S0921-5107(99)00286-x) explained that the effective local current density is maximal at the pore tips, then decreases from pore tips towards the pore walls and becomes zero when the pore wall is truly cylindrical, which explains the favored initial formation of tubular morphology. Thereby, due to the local distribution of the current on the hemispherical surface in contact with the electrolyte, called reactive surface, pore radius could be increases over the porosification, which could be leading to the increase of porosity. Logically, a variation of pore diameter and porosity should be observed over the porous thickness. However, with the continuous wafer dissolution during the porous layer formation, as shown in FIG. 7G and illustrated in FIG. 7K, only the freshly porosified part can be preserved. That may be why the observed pores can have a same roughly similar diameter. With the increasing of reactive surface area during porosification for a constant etching current density, the current needed to maintain this density can be increasing proportionally. Moreover, due to the consumption of ions involved in wafer dissolution at the sample surface, and to the pore length growth during porosification leading to an increasing of diffusion length of the hydrogen fluoride, the concentration at the pore tips is strongly depleted. Both phenomena, the increasing of reactive surface area and the depletion of hydrogen fluoride at the pore tips, are at the origin of the drastic decrease of pore formation rate that can be observed for some embodiments after about 180 min of porosification in FIG. 7G. Thereby, it could be expected that the limited porous thickness obtained for some embodiments at about 360 min can be related to the maximal diffusion length of hydrogen fluoride within tubular morphology and so the maximal value which could be obtained with the used parameters.

Figure 7L:
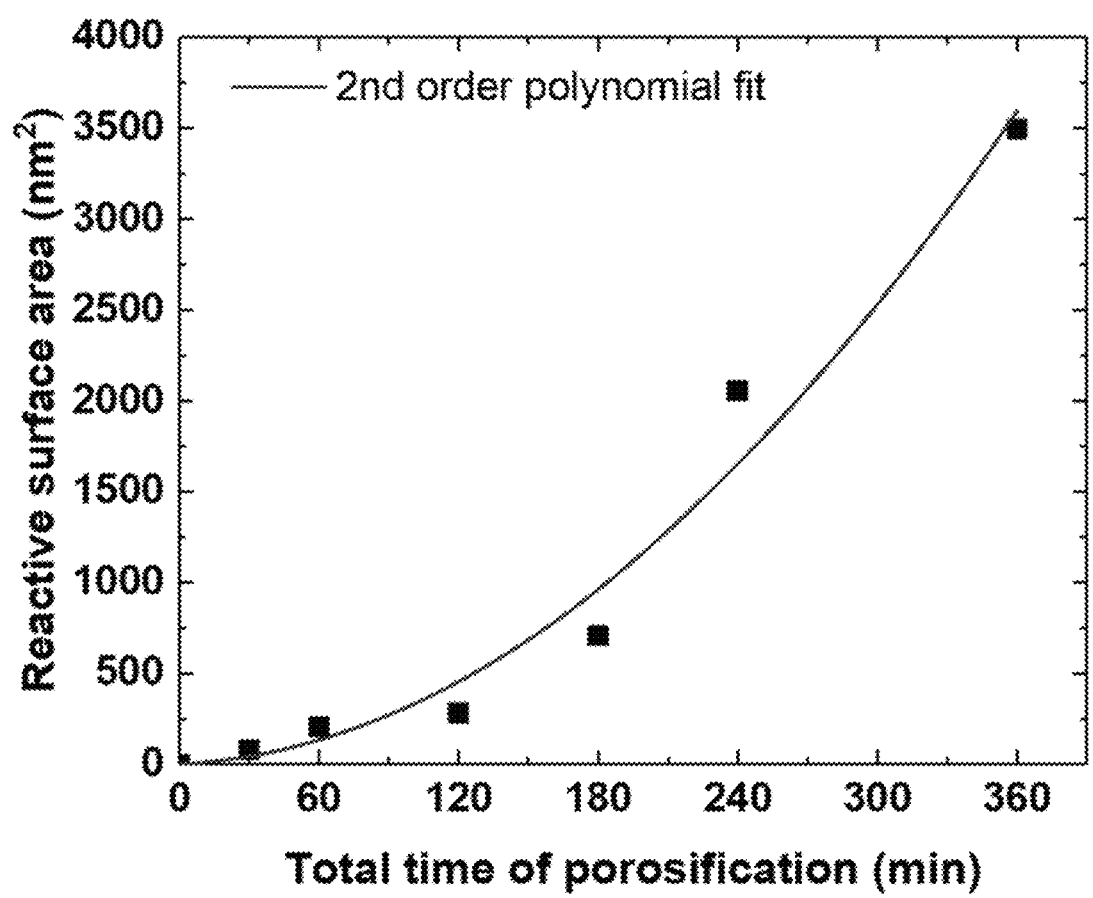
FIG. 7L shows the evolution of pore density, reactive surface area and charge quantity reaction happening at pore tips, as a function of the total time of porosification.

To fully understand the change of etching rate before and after 180 min of total time of porosification, reactive surface area $S_r$ can be calculated, according to the following equation:

$$S_r = 2\pi \cdot r_p^2$$

Where $r_p$ the pore radius. FIG. 7L represents the evolution of reactive surface area as a function of a total time of porosification. For these embodiments, this evolution can be fitted with a 2$^{nd}$ order of polynomial fit, corresponding to the following equation:

$$S_r = a \cdot T + b \cdot T^2$$

Where T represents the total time of porosification and a. and b. are the constant that can be calculated from the fit, related to 0.69 nm$^2$·min$^{-1}$ and 0.026 nm$^2$·min$^{-2}$, respectively.

As it can be seen in some embodiments, reactive surface area can be lower than about 300 nm$^2$ for a unique pore for experiment less than about 180 min. This range may be corresponding to the linear evolution of porous thickness from about 0 to 5 µm. After about 180 min, the reactive surface area reached high value, and the related range of total time porosification can be the plateau observed on porous thickness of some embodiments. Thereby, the limited value of porous thickness after about 180 min may be correlated by the increasing of reactive surface area of some embodiments.

To obtain a tubular porous morphology, a low etching current density can be required, as demonstrated with the embodiments presented in FIGS. 5A to 5D. Nevertheless, to obtain an anisotropic structure, a long total etching time can be needed. Bioud et al. (DOI: 0.1038/s41467-019-12353-9) reported the formation of sponge-like morphology with porosity range of 40% to 60%. In the present work, it is demonstrated that the formation of tubular nanostructures with low values of porosity, under 40%, is possible. Such a degree of porosity variations is highly valuable for creating multilayer porous morphologies for lift-off process in epitaxial applications (Boucherif et al. DOI: 10.1063/1.4775357; Bioud et al. DOI: 0.1038/s41467-019-12353-9; Garralaga Rojas et al. DOI: 10.1016/j.elecom.2009.11.033).

Influence of Passivation Pulse Duration and Etching Current Density

Figure 8J:
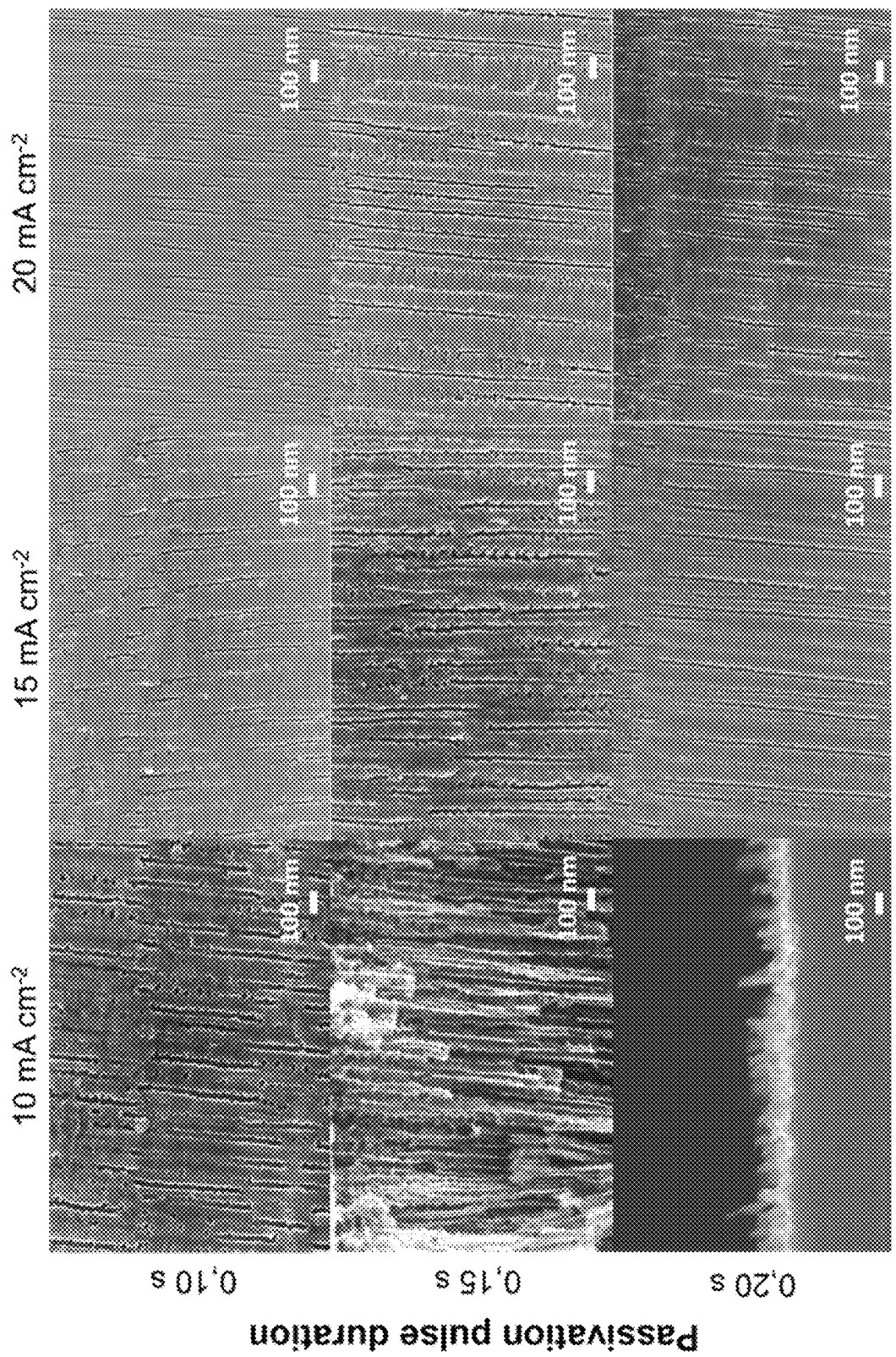
FIG. 8J shows cross-section view SEM images presented in FIGS. 8A to 8I to better compare the effects to the varied parameters.
Figure 9A:
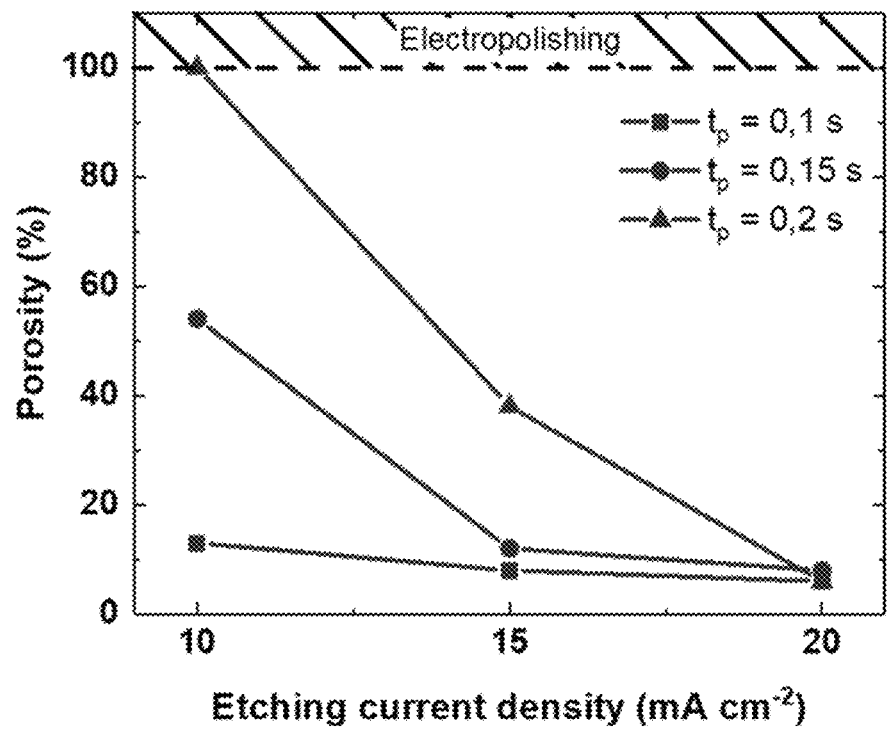
FIG. 9A shows the evolution of porosity as a function of etching current density with a passivation pulse duration of 0.1 s, 0.15 s and 0.2 s.
Figure 9B:
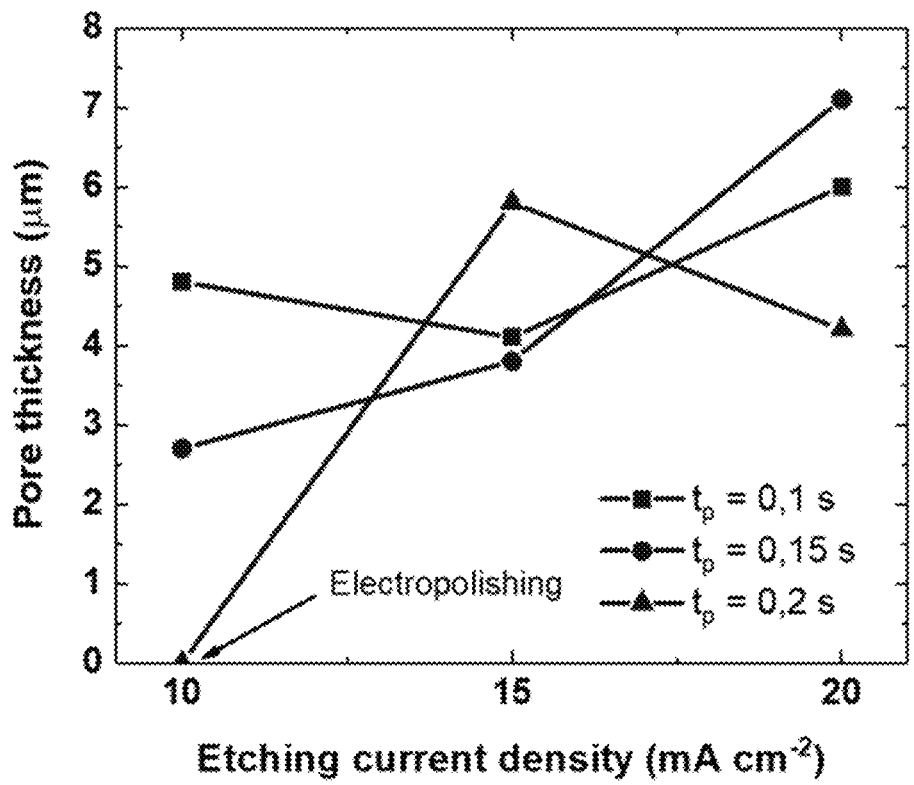
FIG. 9B shows the evolution of the pore thickness as a function of etching current density with a passivation pulse duration of 0.1 s, 0.15 s and 0.2 s.
Figure 9C:
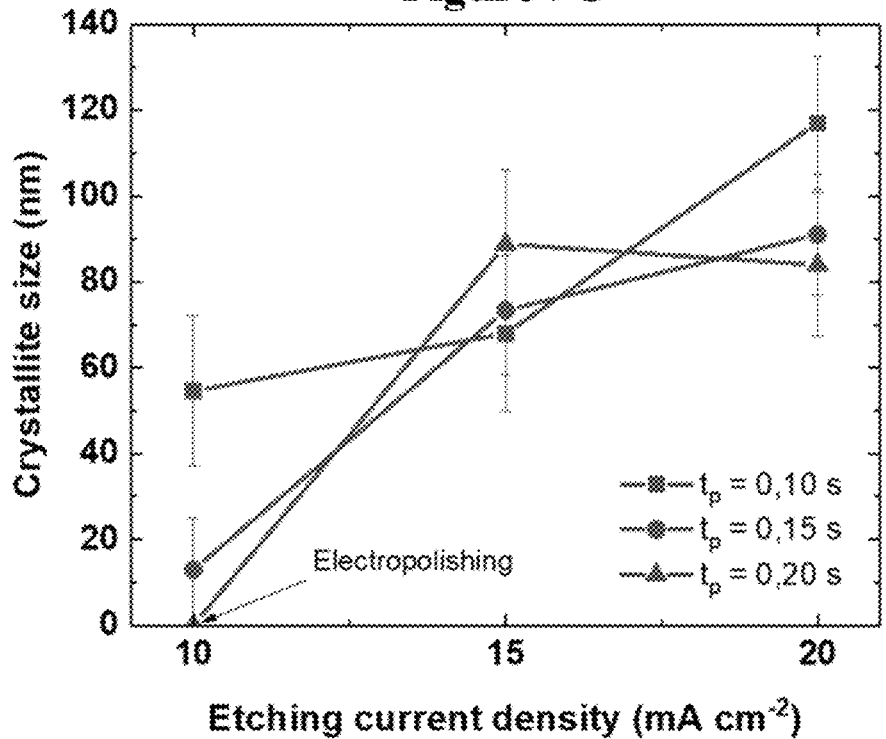
FIG. 9C shows the evolution of crystallite size as a function of etching current density with a passivation pulse duration of 0.1 s, 0.15 s and 0.2 s.
Figure 9D:
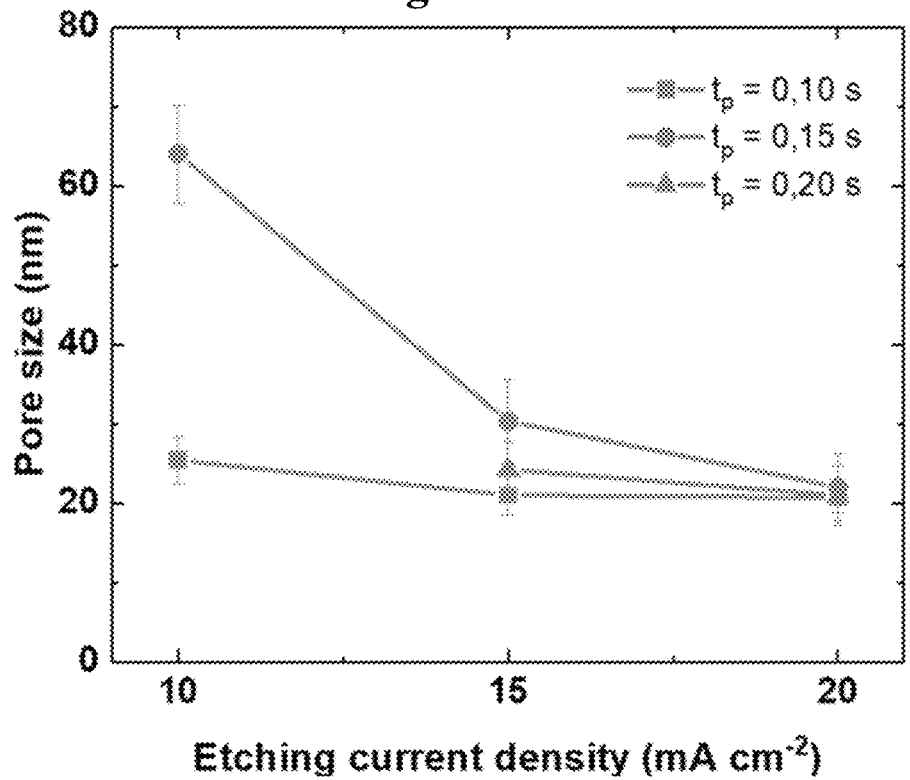
FIG. 9D shows the evolution of pore size as a function of etching current density with a passivation pulse duration of 0.1 s, 0.15 s and 0.2 s.
Figure 9E:
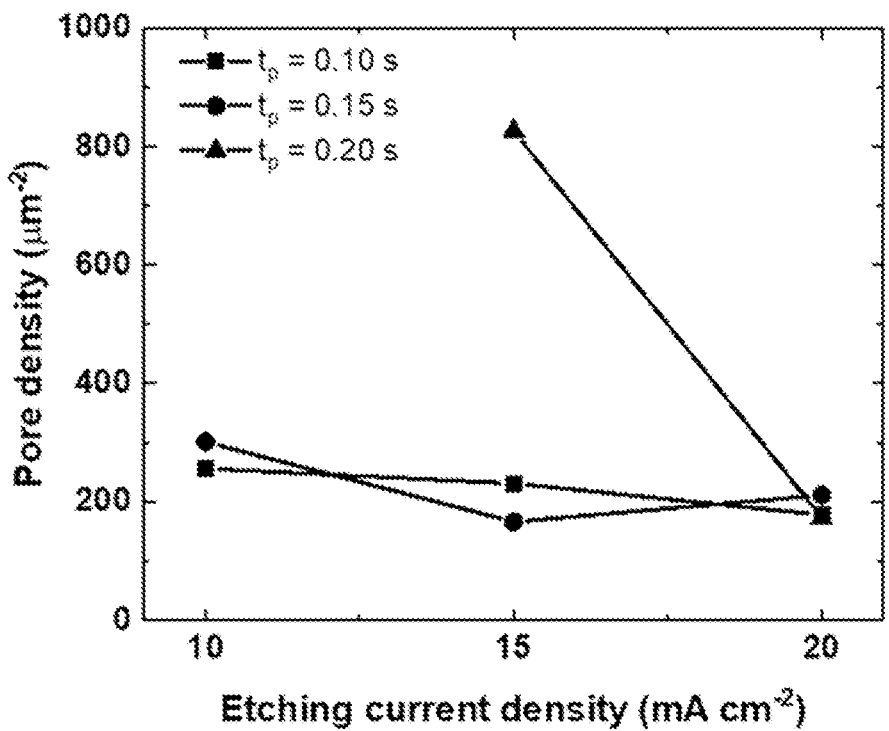
FIG. 9E shows the evolution of pore density in function of etching current density with a passivation pulse duration of 0.1 s, 0.15 s and 0.2 s.
Figure 9F:
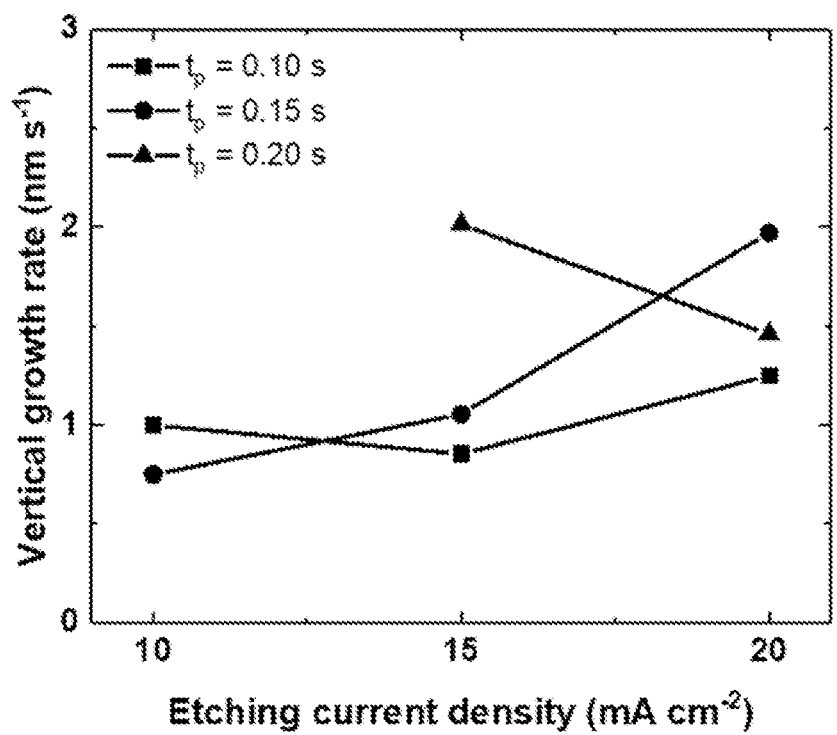
FIG. 9F shows the evolution of vertical growth rate in function of etching current density with a passivation pulse duration of 0.1 s, 0.15 s and 0.2 s.

In this next section, the presented embodiments will have a porosification time of about 240 minutes. FIGS. 9A to 9D summarize the impact of etching current density and passivation pulse duration on the development of tubular porous morphology of such embodiments. More specifically, FIGS. 8A to 8I shows cross section SEM images of porous germanium as a function of etching current density and passivation pulse duration. Porous morphologies are reported for etching current densities of about 10, 15 and 20 mA/cm$^2$ and passivation pulse duration of about 0.1, 0.15 and 0.2 s. FIG. 8J shows cross-section view SEM images presented in FIGS. 8A to 8I to better compare the effects to the varied parameters, i.e. the current density and the passivation pulse duration. FIGS. 9A to 9D display evolution as a function on the etching current density of the porosity, the porous layer thickness, the crystallite and the pore size respectively. Also, only two points are shown in FIG. 9D for embodiments with a passivation pulse duration of about 0.2 s due to the absence of pores at low etching current density value in the embodiment presented in FIG. 8G. As can be seen in FIGS. 8A to 8I, the obtained tubular morphologies for etching current densities of about 15 mA/cm$^2$ and about 20 mA/cm$^2$ seem consistent with result from FIGS. 5A to 5D, even with different passivation pulse duration. However, for the samples that were etched with a current density of about 10 mA/cm$^2$, porosity can be noticeably changed and the porous layer can eventually be almost totally dissolved, also referred to as electropolishing, at high relatively high passivation pulse duration of about 0.2 s. As presented in FIG. 9A, passivation pulse duration can have a key effect on the porosity. Based on the SEM observations of these embodiments, changing passivation pulse duration at low etching current densities can alter the etching regime from porous formation to electropolishing. However, this may not the case for high values of etching current density, for which no variation of porosity can be observed. It is already known from the literature that the porosity of germanium layer is linearly proportional to the etching current density applied for CBEE (Garralaga Rojas et al. DOI: 10.1149/1.3147271; Bioud et al. DOI: 10.1016/j.electacta.2017.02.115). Tutashkonko et al. (DOI: 10.1016/j.electacta.2015.08.112), by studying the influence of a passivation step, and demonstrated the change of porous morphology. However porosity variation has not been measured. In the case of his FBEE, Bioud et al. (DOI: 10.1016/j.electacta.2012.10.031) showed a non-linear dependence of the etching current density on the porosity of sponge-like layer, where for values between about 5 to 20 mA/cm$^2$, porosity range was between 40 and 60%. In the present proposed method of FBEE, it is shown for the first time that it can be possible to tune the porosity of porous layers from 0 to about 100% by varying both the passivation pulse duration and the etching current density. Furthermore, the thickness of the porous layer as well seems to be sensitive to the passivation pulse duration (FIG. 5C), showing an increasing tendency with higher etching current density, regardless of passivation pulse duration value. Evolutions of pore size (FIG. 8M) and crystallite size (FIG. 9C) of these presented embodiments can be characterized to be following similar trends as that of porosity (FIG. 9A) and thickness (FIG. 9B), respectively. In these embodiments, pore size can reach a minimum value of about 20 nm, which can be associated with a minimum porosity value of about 4%. It can be demonstrated that, while the thickness of porous layer is at its maximum, the porosity and so the pore size can be at minimum values for the tubular morphology of the presented embodiments. Such results reveal that germanium etching can mainly be concentrated at the pore tip, hence pore etching rates can directly be related to the intensity of etching current density, as seen in with the embodiments presented in FIGS. 5A to 5D. However, in these embodiments, it can be shown that the decreasing of porous thickness and especially the increasing of porosity can be directly related to the passivation pulse duration parameter, which can be used to control the pore wall dissolution. The influence of a passivation step on the porous germanium morphology was explored and described by Tutashkonko et al. (DOI: 10.1016/j.electacta.2015.08.112) for CBEE regime. In their work, the authors explained that the passivation step can protect pore walls and a threshold value of etching current density is needed for breaking the potential barrier at the electrolyte/electrode interface at the pore walls. In other studies, it is mentioned that passivation has a life-span, which will decrease with an increasing etching current density (Garralaga Rojas et al. DOI: 10.1149/1.3147271; Tutashkonko et al. DOI: 10.1016/j.electacta.2012.10.031). In parallel, Fang et al. (DOI: 10.1016/j.jelechem.2006.02.021) explained that if a decrease of overpotential (the potential needed to overcome the energetic barrier and begin the redox reaction) happened around the pore tip (due to the ohmic and diffusion losses), the current flow will attack the surface and thus will create new pores close to the already formed pores. Such phenomena will lead to the formation of higher pore density regions, which directly increases the porosity. FIGS. 9E, 9F and 9G show the evolution of the pore density ($N_P$), as well as vertical ($R_V$) and lateral ($R_L$) growth rates of the presented embodiments as a function of the applied etching current density. Each of these parameters can be obtained with the following equation (Lehmann et al. DOI: 10.1016/50921-5107(99)00286-x).

$$N_P = \frac{P}{\pi \cdot r_P^2} \qquad (4)$$

where P is porosity and $r_P$ the pore radius. Then, the vertical and lateral growth rates were calculated from:

$$R_V = \frac{t_p}{T_e} \qquad (5)$$

$$R_L = \frac{r_p}{T_e} \qquad (6)$$

Where $L_p$ is the pore thickness and $T_e$ the total time of etching (equal to the sum of etching pulse duration during the porosification).

In FIG. 9E, a similar range of pore density, around 200 pores per µm$^2$, can be obtained for embodiments with passivation pulse durations of about 0.10 s and 0.15 s (FIG. 8D). However, for the values of etching current density of about 15 mA/cm$^2$ and passivation pulse duration of about 0.20 s, a drastically increased pore density can be observed. In the embodiment shown in FIG. 8H, can exhibit small pore radius and porosity values, meaning that for this etching current density, the pore nucleation at the surface can be higher than for the other samples. Moreover, the embodiment of FIG. 8D can present a high pore size and porosity region (obtained etching current density of about 10 mA/cm² and passivation pulse duration of about 0.15 s) having a low pore density value, but that can present a high lateral growth rate, as shown in the embodiment of FIG. 9G. FIG. 9F displays the evolution of vertical etching rate as a function of etching current density and passivation pulse duration. This signifies that the vertical etching rate can be directly related to the etching rate at the pore tip. As it can be seen in FIG. 9F, no significant variation of the vertical growth rate can be observed for the embodiments with a passivation time of about 0.10 s (e.g. FIGS. 8A, 8B and 8C). However, with a passivation pulse duration of 0.15 s the vertical growth rate increased with etching current density. In contrast, for embodiments with a higher passivation pulse duration of about 0.20 s (e.g. FIGS. 8G, 8H and 8I), the vertical growth rate can be decreased by increasing the etching current density. These results can further highlight the influence of the passivation step, which can accelerate or decelerate the porosification process, depending on the potential barrier formed at the surface. In FIG. 9G, the lateral growth rate is represented as a function of etching current density and passivation pulse duration. This lateral growth rate can represent the increasing of the pore diameter over porosification. For embodiments having a passivation pulse duration of about 0.10 s, the lateral growth can be almost constant or, in other words, almost independent of the etching current density. However, for embodiments with higher passivation pulse durations (0.15 s and 0.20 s), the rate of lateral growth can be increased while vertical growth rate can be decreased by increasing the etching current density. This suggests that vertical and lateral porosification rates can be correlated, and that passivation pulse time can have an effect on the distribution of the etching at the bottom or on the walls of the pores.

Figure 10:
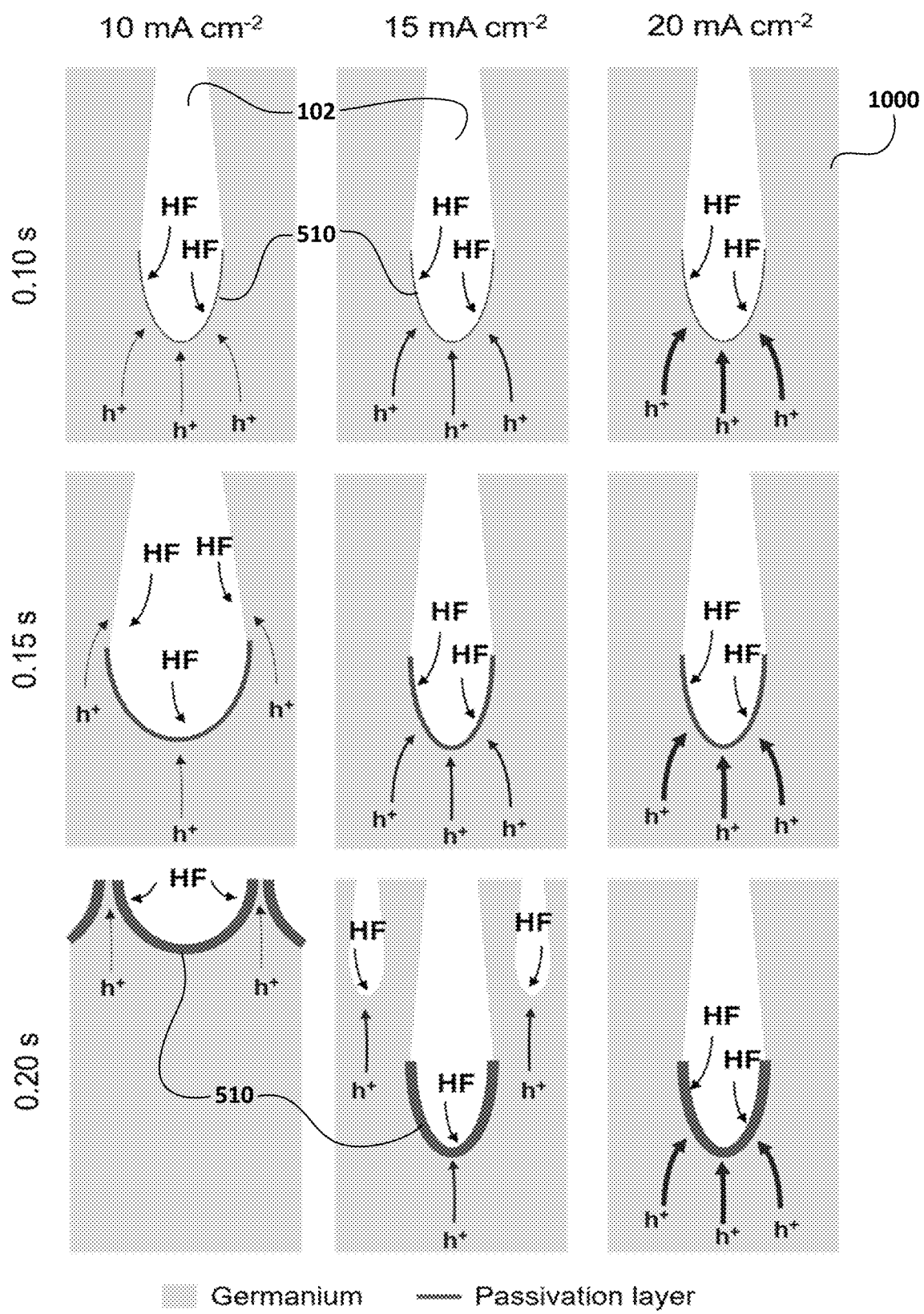
FIG. 10 shows a schematic illustration of the porous layer evolution for etching current density of 10, 15 and 20 mA/cm$^2$ and passivation pulse time of 0.10, 0.15 and 0.20 s

To summarize, based on the SEM characterizations, it was observed that porosity and pore diameter can be increased with low value of etching current density and high value of passivation pulse time. The embodiment of FIG. 8D (etching current density of about 10 mA/cm² and passivation pulse duration of about 0.15 s) can be associated with a higher porosity and pore size, while also corresponding what could be characterized as a higher lateral growth rate. While the embodiment of FIG. 8H (etching current density of about 15 mA/cm² and passivation pulse duration of about 0.20 s) can have a considerably high pore density and high vertical growth rate, it can also have a lower porosity. Such results may indicate that an etching current density of 15 mA/cm² is likely to be the threshold value for which the overpotential within the pore can be decreased, allowing for the formation of neighboring pores and therefore pore density variation. For the same passivation pulse durations, at low etching current densities, pore walls can preferably be engraved, compared to the surface. The synergy of these two phenomena, the lateral etching and the formation of neighboring pores, can then lead to the destruction of the porous layer as shown for the sample obtained in the embodiment of FIG. 8G having an etching current density of about 10 mA/cm² and a passivation pulse duration of about 0.20 seconds. FIG. 10 shows a schematic representation of both phenomena, the lateral growth etching and the neighbor pore multiplication, which can both be modulated by controlling the passivation pulse time and the etching current density. In some embodiments, the increased passivation layer 510 (hydrogen layer for some embodiments) width can be related to the preferential formation of GeH₂ groups, as disclosed by Tutashkonko et al. (DOI: 10.1016/j.electacta.2015.08.112), at the bottom of the pore, which can lead to a higher energy barrier at the electrode/electrolyte interface. In other words, the longer the passivation pulse duration is, the higher the potential barrier (passivation layer 510) at the pore tip can be. Based on these results of the presented embodiments, it is possible to form three hypotheses to explain the formation of tubular morphology while considering the potential barrier at the pore walls:

If the etching current density is high enough to break the potential barrier (higher than the threshold value), porosification can fully proceed at the pore tip following the crystal orientation, allowing formation of tubular pores 102 and of tubular morphology 1002 that can have a relatively low porosity and low pore diameter;

If the etching current density is close to the to break the potential barrier (around the threshold value), porosification will partially proceed at the pore tips, which can increase the pore diameter due to higher oxide formation and can also proceed at the surface, forming neighboring pores and thereby increasing the density of pores; and If the etching current density is not enough to break the barrier and it is lower than the threshold value, porosification can be mainly distributed on the pore wall and the surface, leading to an electropolishing regime.

Finally, based on these results and the hypotheses previously stated, it can be concluded that fast bipolar electrochemical etching (FBEE) of germanium strongly depends on the values of etching current density, passivation pulse time and total etching time. First, it can be demonstrated that tubular morphology can be obtained at etching current densities less than 30 mA/cm², with a crystal orientation etching instead of a current line orientation etching. Next, can be shown that the enlargement of the pore size as a function of the total porosification time allows precise control on the porosity of porous layers. Then, it can be demonstrated that for a given etching current density value, an optimal passivation pulse duration can exist, which can have an influence on the overpotential around the pore and can promote the surface nucleation and etching rather than pore tips etching, allowing pore density, pore diameter and porosity tuning.

Based on these results, one of the preferred embodiments consists of a recipe for formation of tubular mesoporous germanium using an etching current density of 15 mA/cm², passivation pulse duration of 0.15 s and a total etching time of 360 min was employed. The cross-sectional SEM image of this preferred embodiment as well as the evolution of the porosity over the thickness is shown in FIG. 11.

Figure 11:
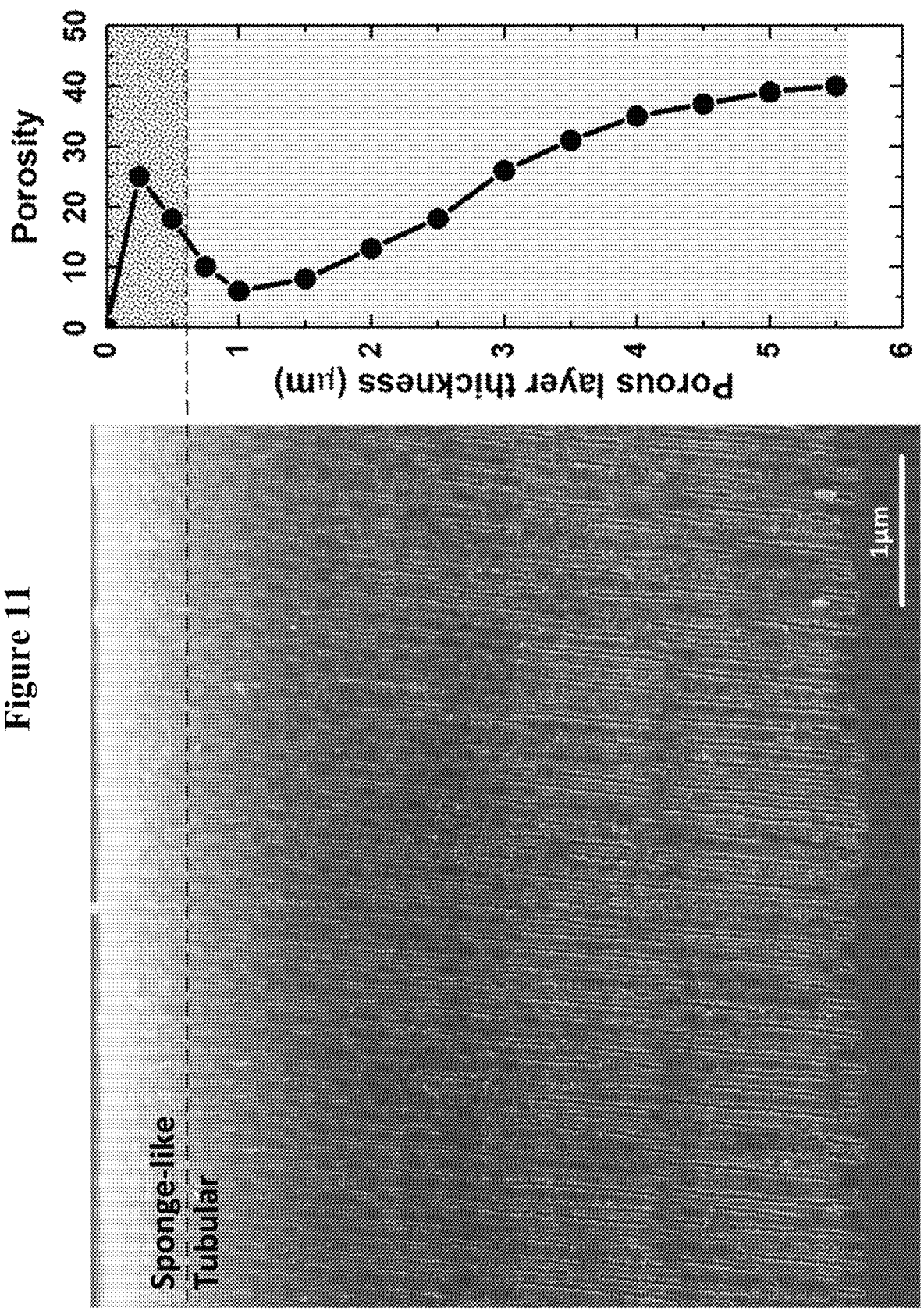
FIG. 11 shows a cross-section SEM view of optimized tubular porous morphology and the evolution of porosity as a function of porous layer thickness.

As it can be seen in the embodiment of FIG. 11, tubular morphology may have a higher porosity at the pore tips. The evolution of porosity over the thickness can correlate with the results obtained in the embodiment of FIG. 7F, where tubular pore size increases as the porosification progresses, related to a cone shape, and where the surface can be dissolved during the same porosification process. In this embodiment, the presence of a thin layer with high porosity associated with the sponge-like morphology can be seen at the surface of the sample, as already explained by the results corresponding to the embodiments presented in FIGS. 5A to 5D. Due to relatively high porosity associated with a small crystallite size, the morphology of this embodiment can be preceding the wafer dissolution and can be considered as the area where the majority of hydrogen fluoride is consumed. In another aspect, porosity at the pore tips can tend to stabilize and to be limited at around 40%. Since this limit cannot be attributed to the germanium crystallite depletion estimated to 13 nm by Bioud et al. (DOI: 10.1016/j.electacta.2012.10.031) and since higher porosity and pore density can be reached by changing the passivation pulse duration (as previously identified with the analysis of FIGS. 8A to 8E), the present limit of porosity at pore tips may directly be related to the chosen passivation pulse duration for this optimized recipe.

Chemical Etching Process

In some embodiments, columnar porous germanium 1003 can be obtained by further chemically etching of the previously tubular porous germanium 1002, which can be obtained via electrochemical etching as previously discussed, with the setup illustrated in FIG. 1C. The chemical etchant solution 306, may be various already used in the art to chemically etch germanium or any alternative that may be put forward. In a preferred embodiment, the chemical etching solution 306 can be a solution already used in the art for selective removal of germanium from silicon-germanium alloys, can be chosen according to the literature as HF:H2O2:CH3COOH (volume ratio of 1:2:3). The etching rates may be reduced by dividing the etchant concentration by about 3 and 5 respectively, through the addition of deionized water. In some embodiments, samples of tubular porous germanium may be dipped into the chemical etching bath 300 containing the etchant solution 306 from about 1 second to about 30 seconds. FIG. 1 illustrates schematic representations of both electrochemical and chemical etching processes used for synthesizing tubular porous germanium 1002 and columnar porous germanium 1003 morphologies, respectively.

Fabrication of Columnar Porous Germanium

Figure 12A:
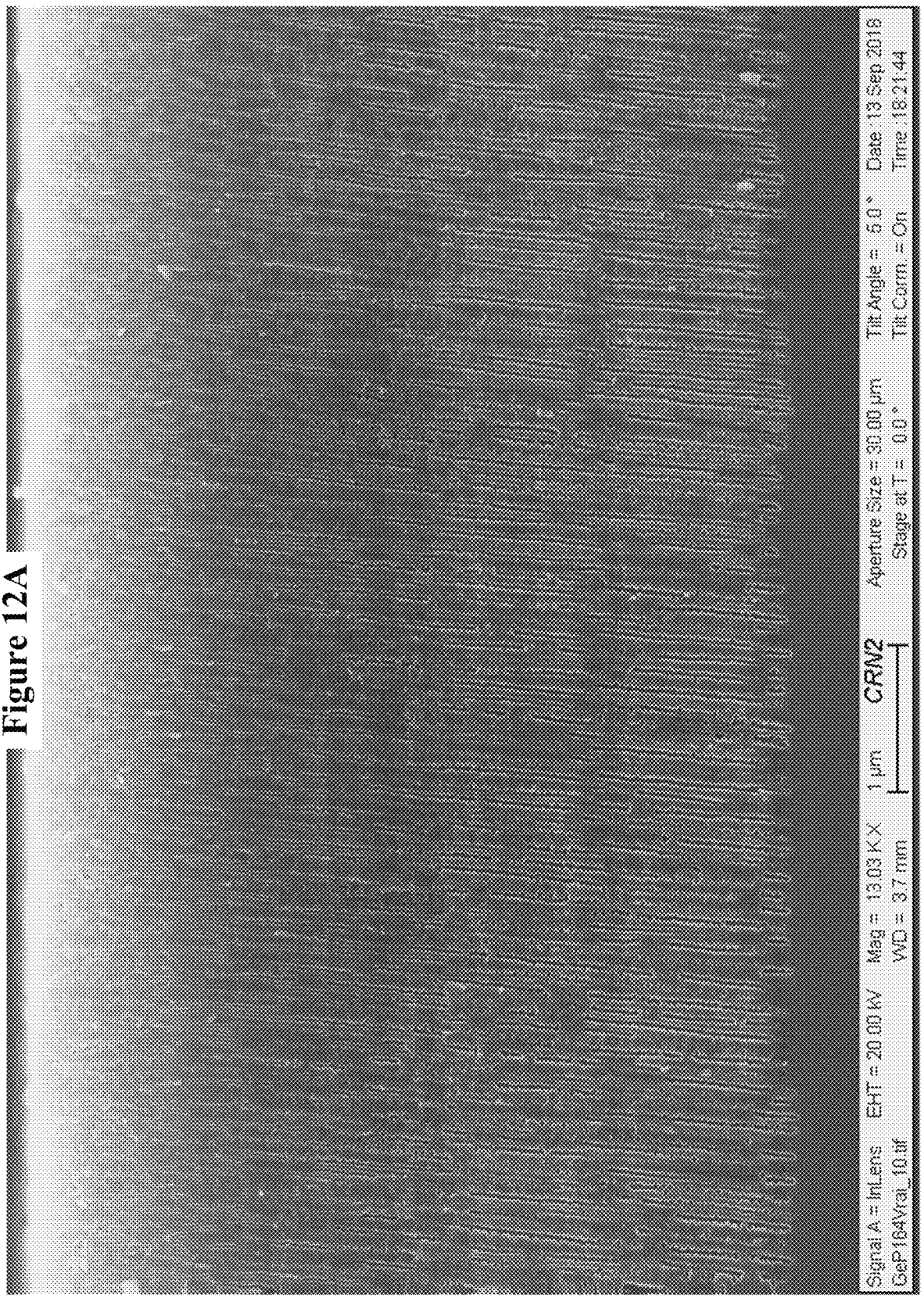
FIG. 12A shows cross-section SEM view of tubular porous germanium etched after 1 s dipping time in 5 times diluted solution.
Figure 12B:
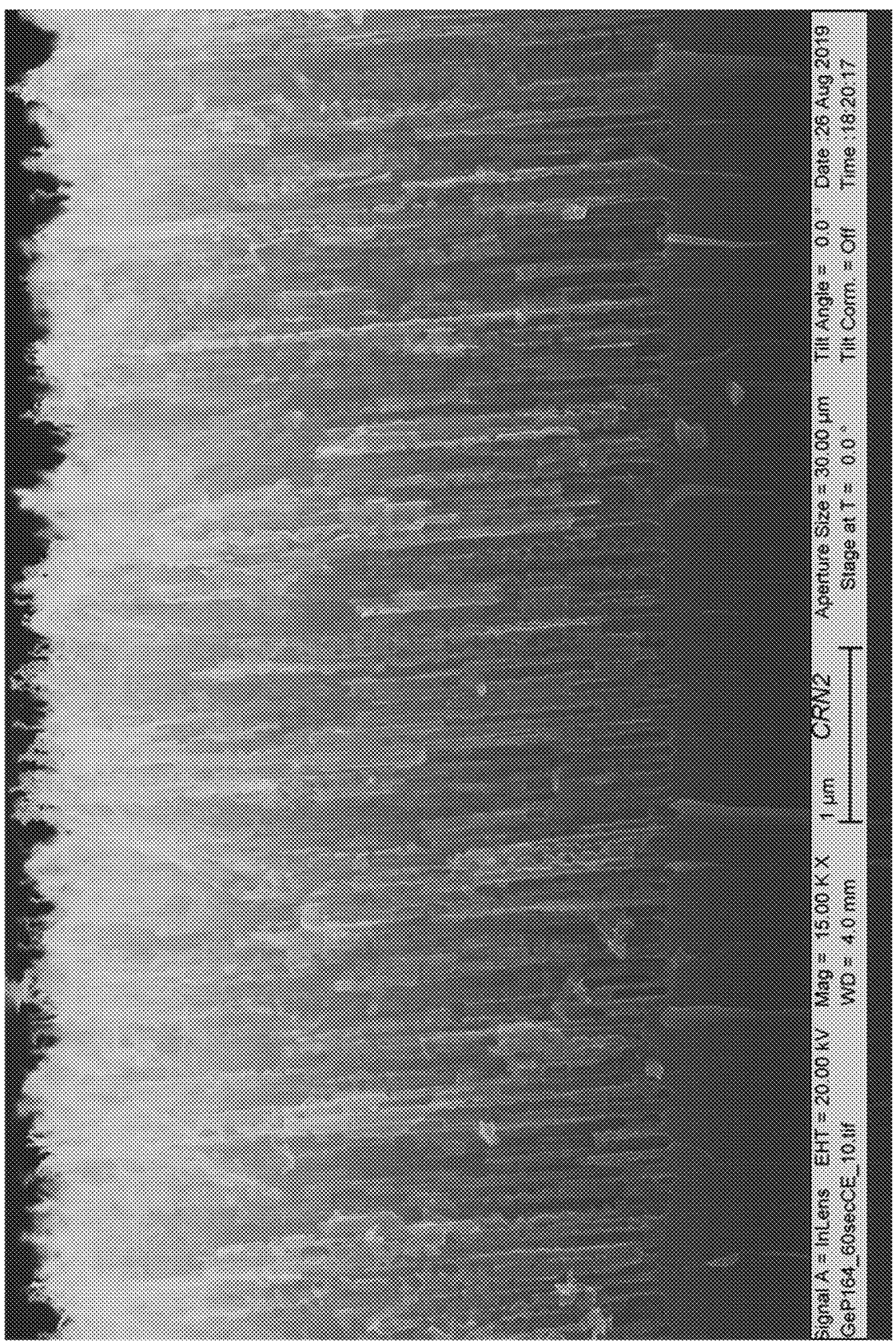
FIG. 12B shows cross-section SEM view of tubular porous germanium etched after 1 s dipping time in 5 times diluted solution.
Figure 12C:
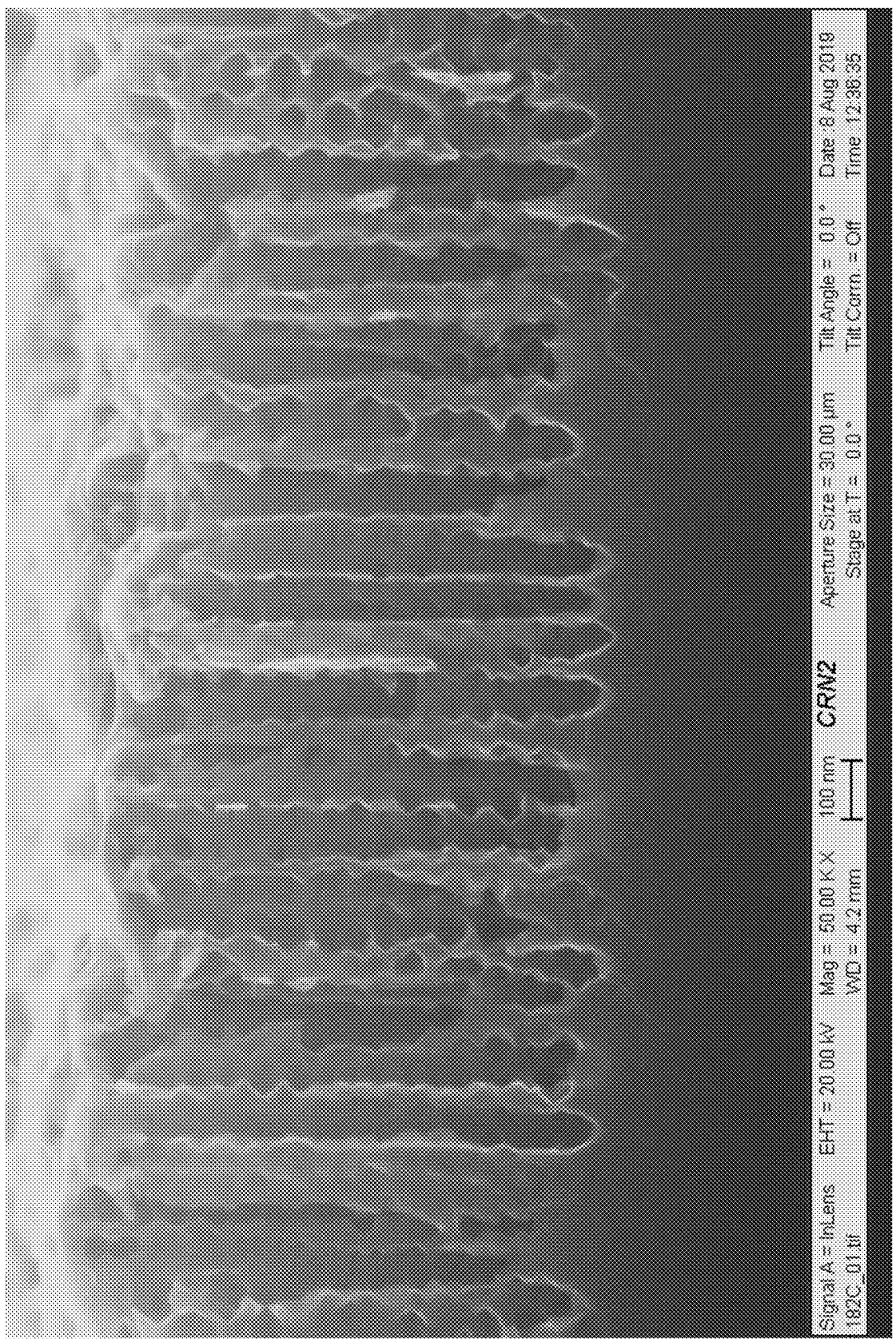
FIG. 12C shows cross-section SEM view of tubular porous germanium etched after 5 s dipping time in 5 times diluted solution.
Figure 12D:
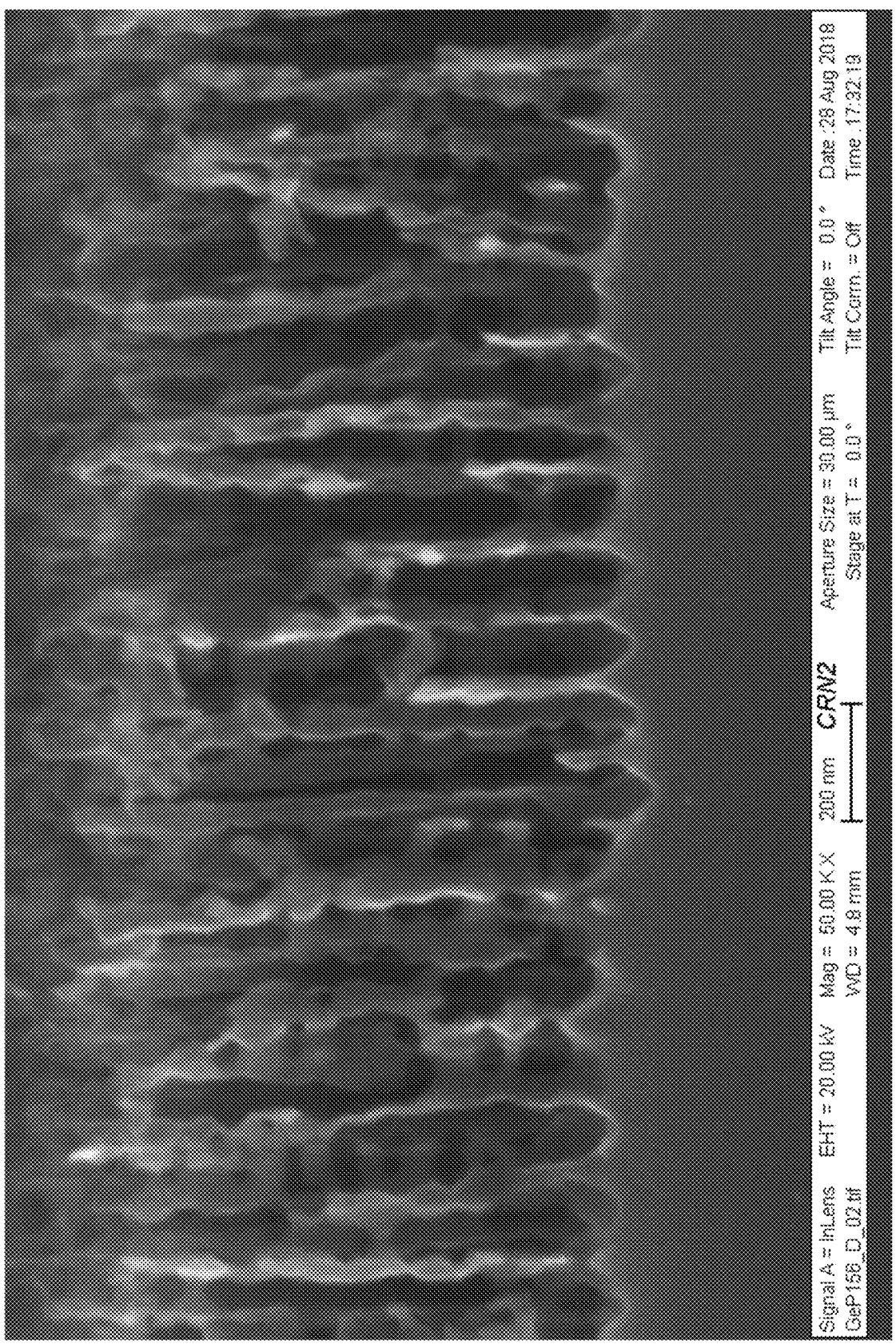
FIG. 12D shows cross-section SEM view of columnar porous germanium synthesized in 3 times diluted etching solution with 1 s dipping time.
Figure 12E:
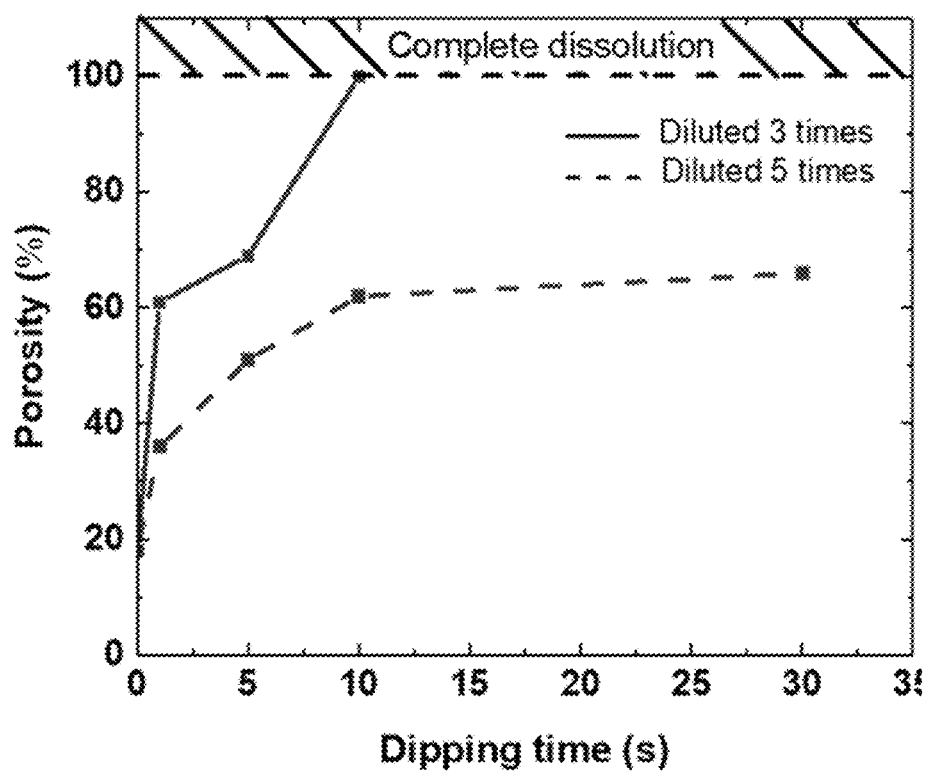
FIG. 12E shows the evolution of porosity as a function of dipping time, for the etching solutions diluted 3 and 5 times.
Figure 12F:
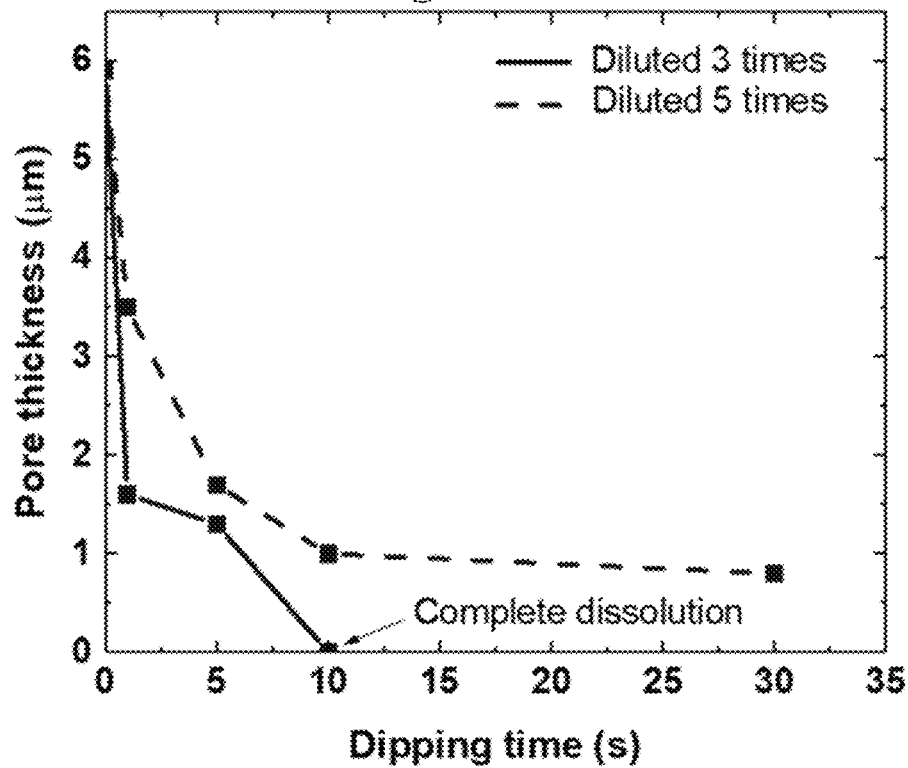
FIG. 12F shows the evolution of the pore thickness as a function of dipping time, for the etching solutions diluted 3 and 5 times.
Figure 12G:
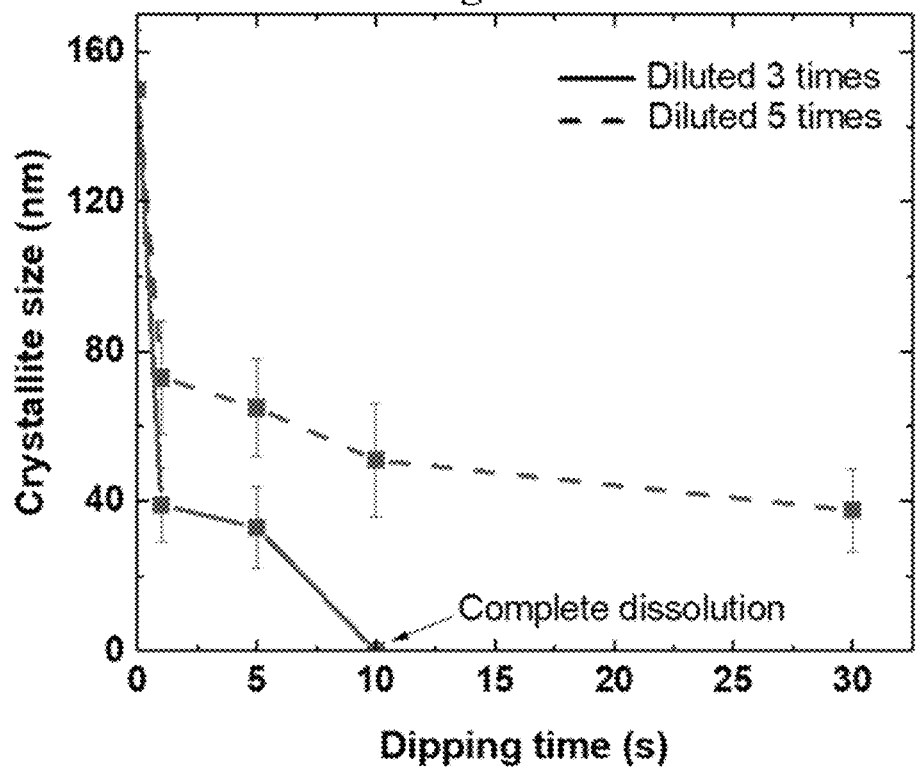
FIG. 12G shows the evolution of crystallites as a function of dipping time, for the etching solutions diluted 3 and 5 times.
Figure 12H:
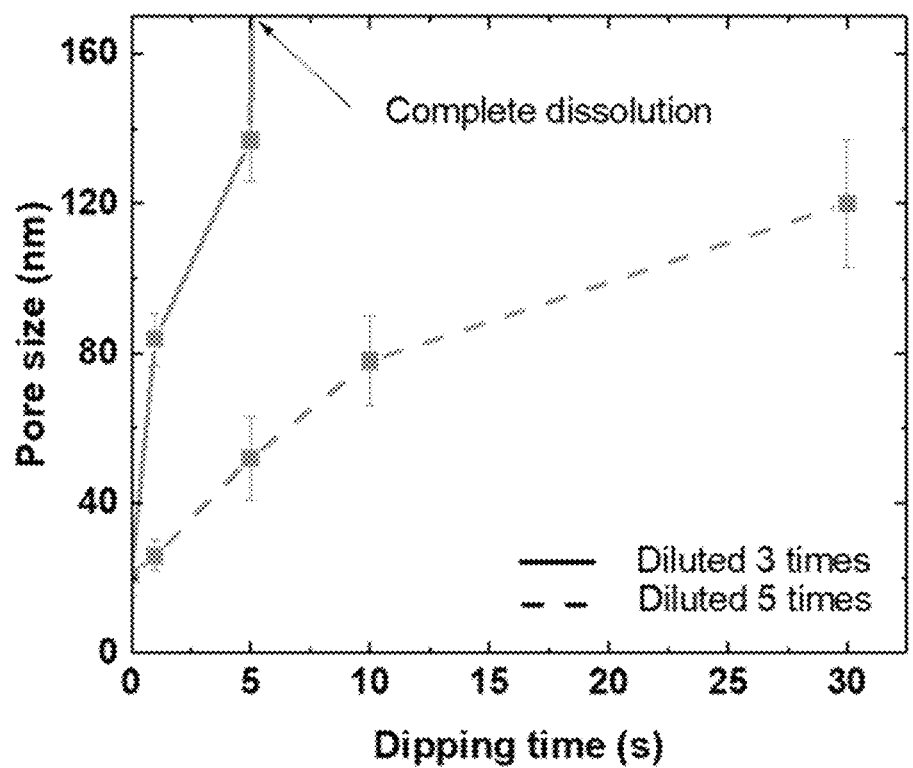
FIG. 12H shows the evolution of pore size as a function of dipping time, for the etching solutions diluted 3 and 5 times.
Figure 12I:
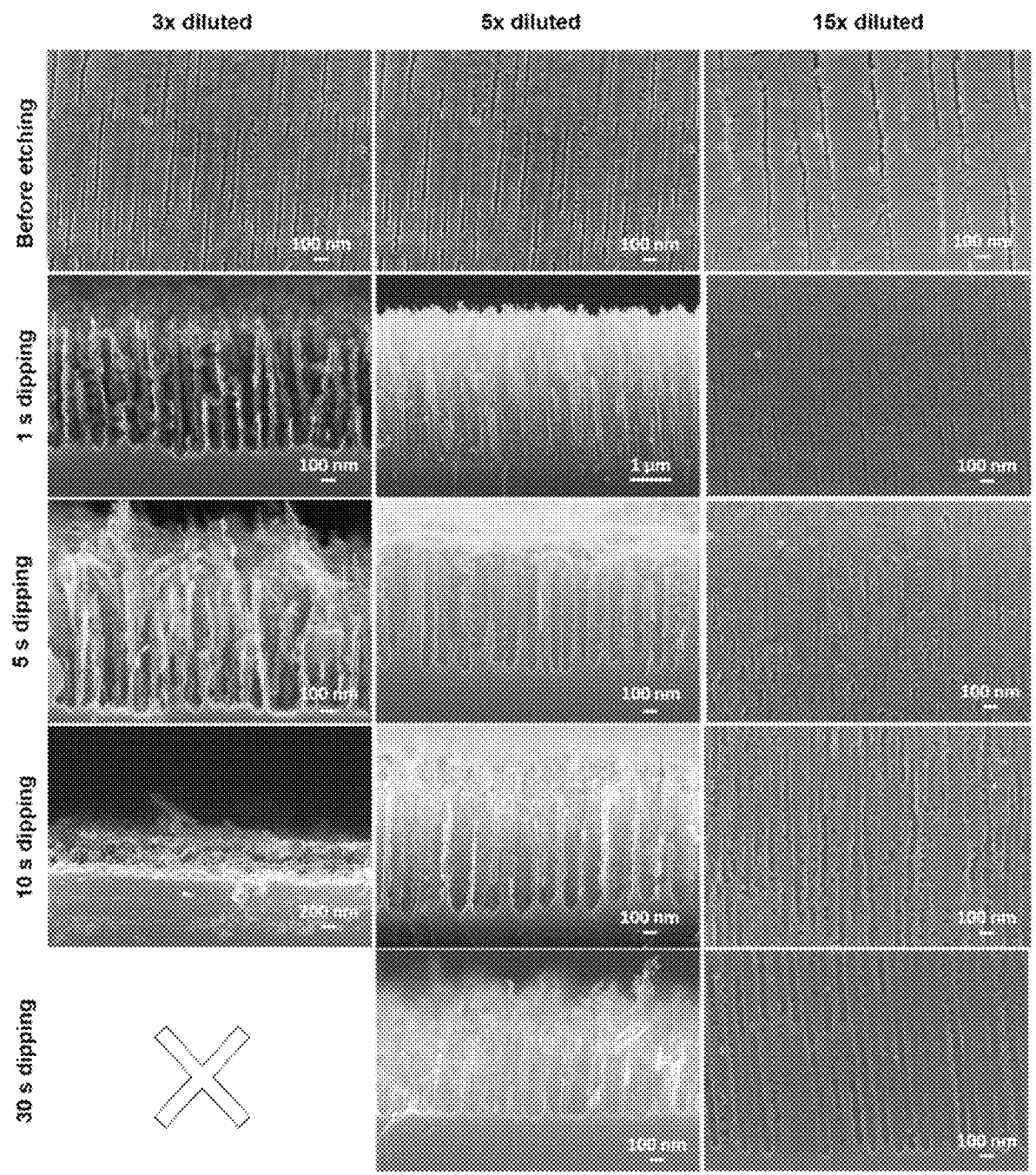
FIG. 12I show cross section SEM views of chemically etched tubular porous germanium samples for different diluted solutions and various dipping times.

Porous semiconductors, especially silicon and germanium, are particularly studied as an anode for lithium-ion batteries, because their nanostructures can accommodate volume expansion during lithiation (Goriparti et al. DOI: 10.1016/j jpowsour.2013.11.103). It was already shown in the literature that the size as well as the arrangement of pores are important parameters for ensuring a uniform distribution of electrolyte contact, Wang et al. (DOI: 10.1039/c0nr00068j) for example. Moreover, thin walls of pores allow short diffusion paths for lithium ions and electrons and then provide a uniform and high rates of charge transport throughout the material (Cho et al. DOI: 10.1039/b923002e). The tubular porous morphology of some of the preferred embodiments, as previously described, can have a relatively large crystallite dimensions (around 150 nm), low pore diameters (around 21 nm), and can have a nearly closed porosity surface (around 18%). To modulate crystallite and/or pore size and to reach opened porosity surface, a chemical etching step (over-etching) can be applied on a tubular porous germanium sample similar to, but limited to, the previously presented embodiments in order to dissolve germanium and transform tubular porous germanium to columnar porous germanium. The two-step process for synthesis of tubular porous germanium to columnar porous germanium used in some embodiments is illustrated in FIG. 1. In some embodiments, this chemical etching of tubular porous germanium can be completed using a HF:$H_2O_2$:$CH_3COOH$ solution (Kil et al. DOI: 10.5573/JSTS.2013.13.6.668; Drake et al. DOI: 10.1007/s11664-0 03-0232-x; Taraschi et al. DOI: 10.1116/1.1463727) or an HCl/$H_2O_2$ to dissolve p-type Ge(100) whose anisotropic etching has demonstrated Abrenica et al. (DOI: 10.1149/2162-8777/abb1c5). The $H_2O_2$ can allow germanium oxide formation, which can then be dissolved by hydrofluoric acid and the $CH_3COOH$ components, which can be considered as a surfactant. The use of such solutions can allow isotropic etching, which is important for increasing the pore diameter, relevant for maximizing the electrolyte diffusion when such a pore structure is used as an anode. In some embodiments, the etching rate of the etching solution can be reduced to better control the resulting characteristics of the columnar porous germanium. In some embodiments, it was diluted 3 or 5 times in DI $H_2O$. The embodiments presented in FIGS. 12A, 12B, 12C and 12D show cross section SEM images of porous germanium before chemical etching, after 1 second dipping in 5 times diluted solution, after 10 seconds dipping in 5 times diluted solution and after 5 seconds dipping 3 times diluted solution, respectively. FIG. 12I shows some more embodiments and helps to better appreciate the influence of both the number of dilution and the dipping time, where cross-section SEM views of porous germanium for 3-time, 5-time and 15-time diluted etching solutions, and dipping times ranging from 1 to 30 seconds. It will be appreciated that the porous layer for the embodiments etched during 30 seconds with the 3-times diluted solution can be totally dissolved, which can explain why no SEM view is shown for these parameters. The morphology similar to the one obtained with the embodiment shown in FIG. 12D can be referred to as columnar porous germanium. The embodiments presented in FIGS. 12E, 12F, 12G and 12H represent, for both diluted solutions (3 and 5 times diluted), the evolution of porosity, pore thickness, pore and crystallite size as a function of dipping time, respectively. Calculating the average pore size distribution and extracting the pore size distribution can be done using ImageJ. For example, the embodiments presented in FIGS. 17A and 17B shows the cross-sectional SEM images of an embodiment at ×50K magnification of samples and corresponding images obtained with ImageJ that can be used to determine the pore distribution. In these embodiments, the pore size can determine to be in the range of mesoporous, for both tubular porous germanium and columnar porous germanium. As it can be seen in FIG. 12F, in some embodiments, the porous germanium can rapidly dissolve in the electrolyte diluted 3 times, after only 10 s dipping time. However, no total dissolution of porous germanium can be observed for the embodiments being dipped in the 5 times diluted electrolyte, even for embodiments having a dipping time up to 30 sec. The change of etching rate observed for the embodiments considered in FIG. 12F, can be related to the presence of various crystallite size within the sample. At the beginning of the etching, all the porous layer close to the surface can be quickly etched due to the presence of sponge-like morphology and/or lower crystallite size for tubular morphology. After this step, the etchant molecules can penetrate the tubular morphology and can begin to dissolve the walls. Concerning the evolution of crystallite and pore size, FIGS. 12G and 12H show a decreasing of crystallite size and an increasing of pore diameter with higher dipping time, respectively, for the considered embodiments. The slope related to the pore evolution can be 9 times and 3 times higher than the slopes that can be related to crystallite size evolution, for 3 times diluted and 5 times diluted solutions, respectively. This behavior can be attributed to the total dissolution of the crystallites, joining two pores that are no longer separated by a wall. As the chemical etching progresses, pores can widen and can coalesce, which may explain the observation of high pore diameters and therefore may explain the etching rate that can be higher for pores than for crystallites. Based on the obtained results for the presented embodiments, mixing electrochemical etching with chemical etching can allow for the modulation of the tubular porous germanium morphologies and for generating unique architectures, such as but not limited to the columnar porous germanium of the presented embodiments. Such columnar porous morphologies can provide an higher specific surface of the germanium, which can improve the lithiation process within a battery.

Figure 18:
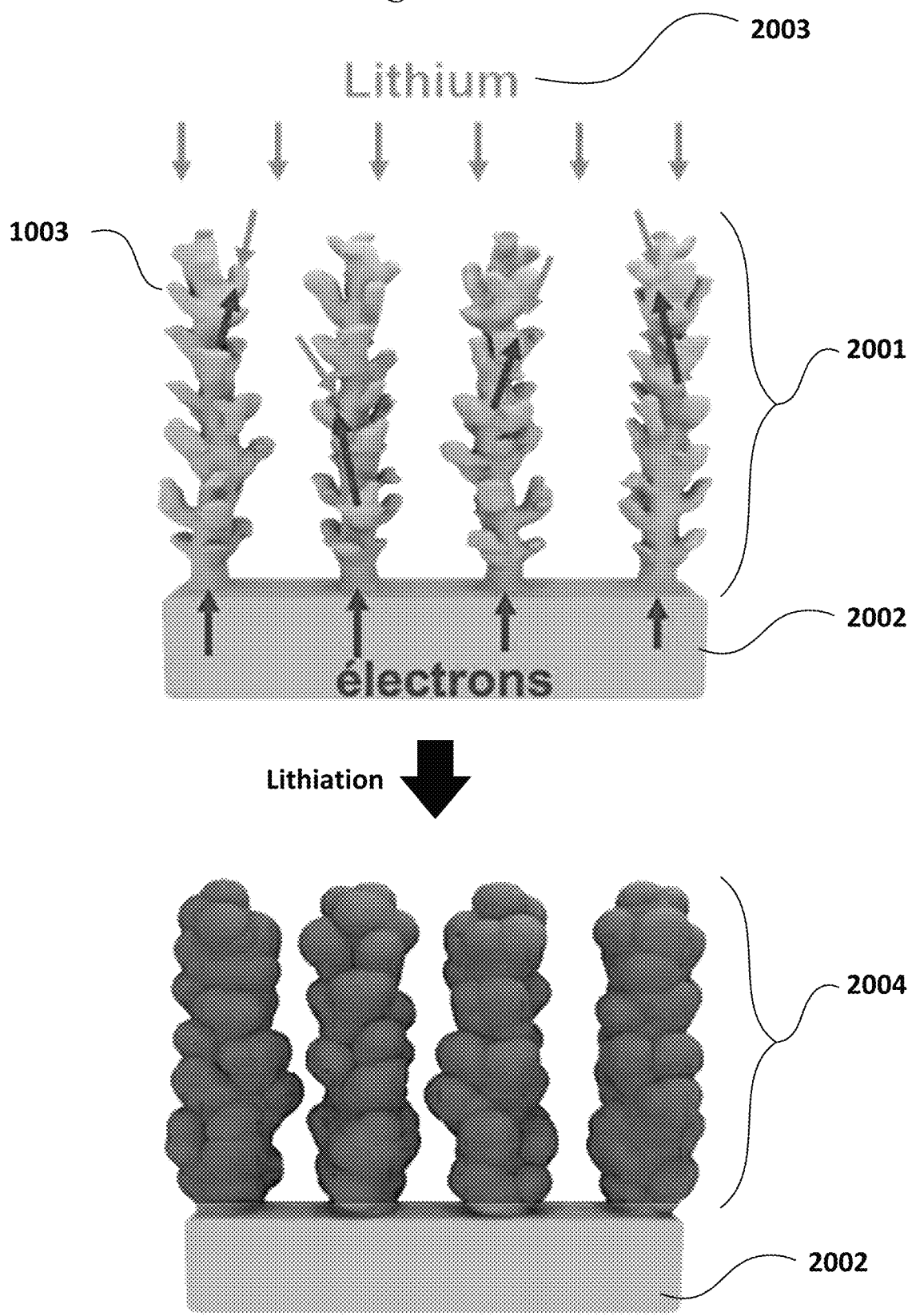
FIG. 18 shows a schematic representation of the lithiation process of porous germanium.

Integration of Tubular Porous Germanium and Columnar Porous Germanium as On-Chip Anode In some embodiments, an on-chip anode can comprise directly using the produced columnar porous germanium as a monolithic anode, where the nanostructured columnar porous germanium 1003 can be used as the active material 2001 of the anode and where the remaining non-structured germanium layer can be used as the current collector 2002 of the anode, as schematized in FIG. 18. This structure may allow to ensure a perfect electrical contact between the anode's current collector 2002 and the active material 2001 of the anode. As illustrated in FIG. 18, the columnar porous germanium layer 1003 of the anode's active material 2001 can be used to complete lithiation of germanium 2004, i.e. store the lithium (ions of the battery's electrolyte 2003), while the substrate can provide the necessary electrons to allow storing of the lithium's ions. To do so, it can be important to use a material that has low resistivity and high electrical mobility for the collector. In some embodiments, type-p germanium wafers doped with gallium with a crystal orientation (100), a miscut of about 6° and a resistivity of between about 1 and 30 mΩ·cm can be used. It will be appreciated that the crystal orientation and/or miscut orientation does not have to be limited to these values and can be of any alternative combination, since these last parameters have little to no influence on the resulting porosification beside the average orientation of the pores.

One of the main advantages of the presented method of germanium micro-structuration it the possibility of directly integrate the resulting product in batteries since the lower part of the germanium substrate can directly act as the anode's collector 2002 as illustrated in FIG. 18. In fact, as illustrated in FIG. 1E, the conventional method of producing porous anode for lithium-ions batteries implies much more steps than the proposed on-chip method, since it can normally include: production of the porous active material 2001; grinding or ball-milling of the active material into a powder, which can lead to loss of active material; mixing with carbon black 2010, binding polymer 2011 and slurry 2012; spraying of the resulting mixture onto the current collector 2002'; annealing; and dicing into the final anodes 2000'. The proposed method of producing monolithic anode comprising porous germanium attached to a remaining layer of bulk germanium layer acting as the current collector of the anode can allow to accentuate the applicability to on-chip anode architectures and to related technologies/industries since the required steps to produce it can be significantly reduced compared to the conventional methods. Being a catalytic substrate for the growth of the carbon-based material, porous germanium can be coated with carbon or graphene to mitigate the formation of the solid electrolyte interface (SEI) and, therefore, enhance the battery performances as demonstrated by Dupuy et al. (DOI: 10.1016/j.mtcomm.2020.101820).

Increased Lithiation Performances

The embodiments presented in FIGS. 13A to 13D and 14A to 14 E show the electrochemical performances for some tubular porous germanium and columnar porous germanium embodiments used as the active material of on-chip anodes. This type of architecture has an interest for micro-batteries and solid-state batteries, where wafer integration in production line can be required. As a reference, anodes based on sponge-like morphology demonstrated low initial coulombic efficiency, 65.7%, due to the high specific surface area of such structure as previously studied by Dupuy et al. (DOI: 10.1016/j.mtcomm.2020.101820). Using the same analysis protocol as Dupuy et al. in order to differentiate the battery performance of the studied nanostructures, it is possible to generate FIGS. 13A, 13B, 13C and 13D showing the cyclic voltammetry of tubular porous germanium and columnar porous germanium on-chip anodes with potential rates at about 10, 1, 0.1 and 0.001 $V·s^{-1}$, respectively. High rates may allow to remove all faradic reactions and observe capacitive currents (for supercapacitor application). In contrast, low rates can provide information about the RedOx reaction happening at the interface of semiconductor/electrolyte. The results shown higher reactivity of columnar porous germanium for all of the four rates of the presented embodiment, which means columnar porous germanium can be more performant than tubular porous germanium for supercapacitor, pseudo-capacitance and deep-intercalation applications.

Figure 13A:
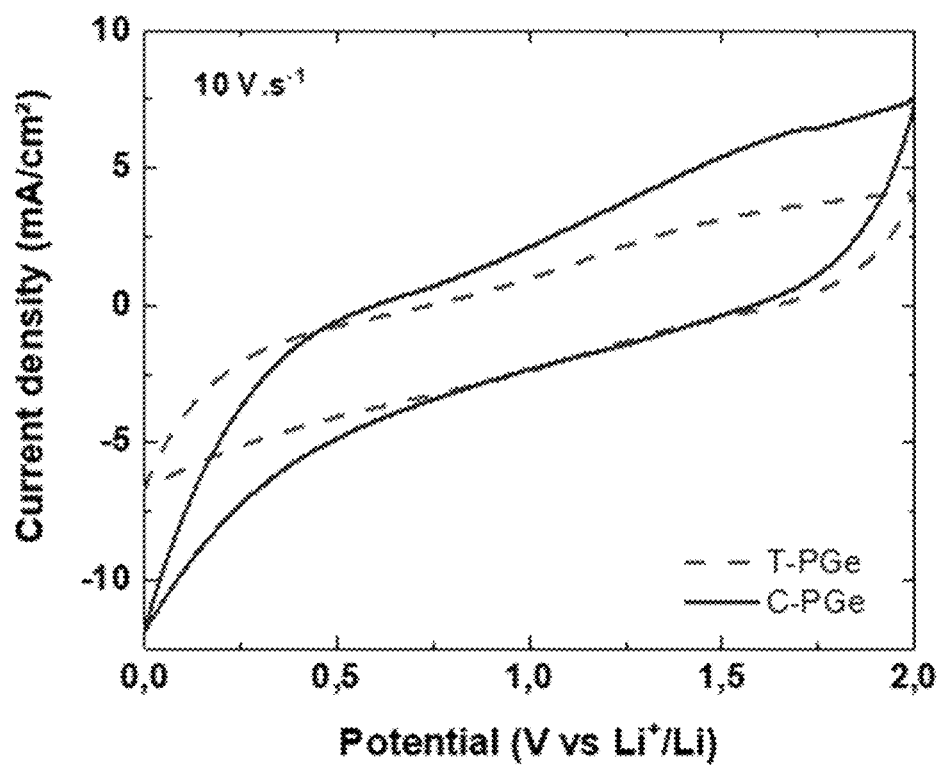
FIG. 13A shows cyclic voltammetry of tubular porous germanium and columnar porous germanium on-chip anodes at potential rate of 10 V s$^{-1}$ to highlight pseudo-capacitance and deep-intercalation applications.
Figure 13B:
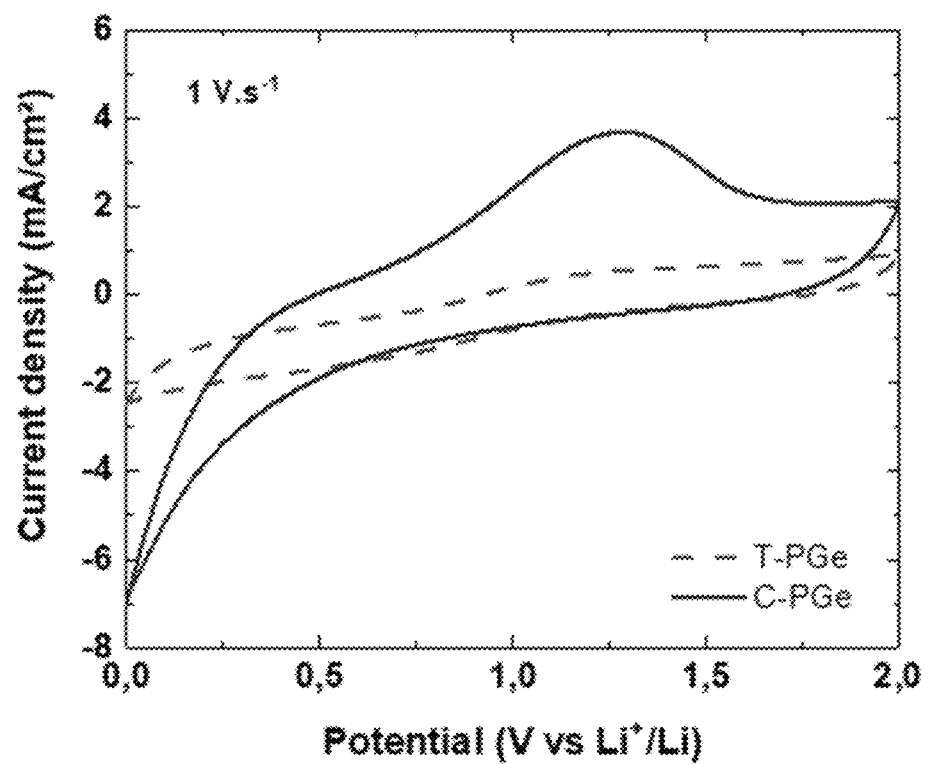
FIG. 13B shows cyclic voltammetry of tubular porous germanium and columnar porous germanium on-chip anodes at potential rate of 1 V s$^{-1}$ to highlight pseudo-capacitance and deep-intercalation applications.
Figure 13C:
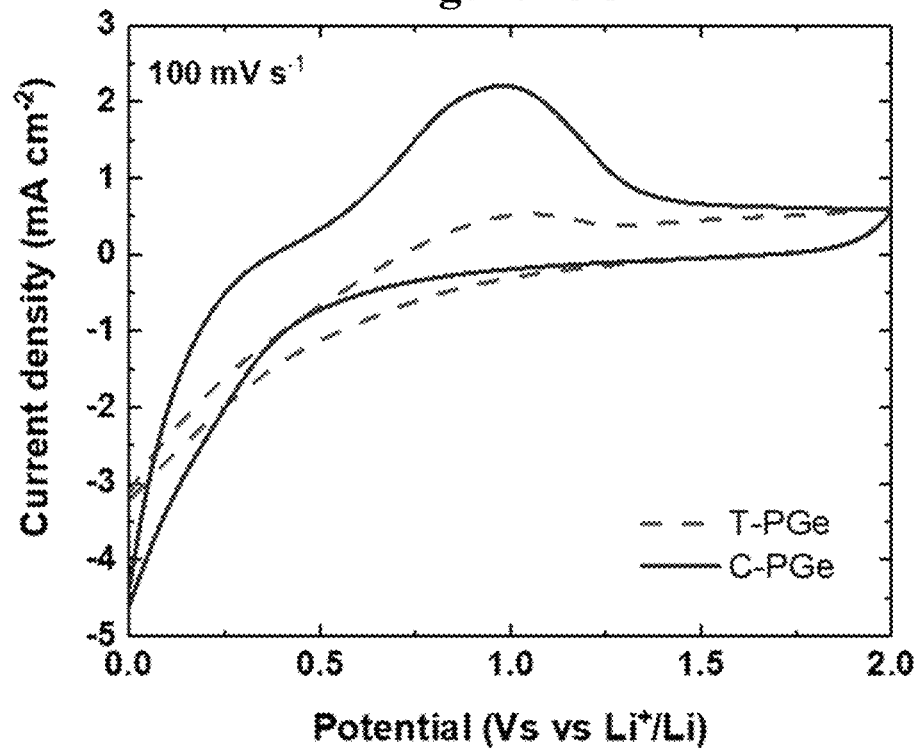
FIG. 13C shows cyclic voltammetry of tubular porous germanium and columnar porous germanium on-chip anodes at potential rate of 0.1 V s$^{-1}$ to highlight pseudo-capacitance and deep-intercalation applications.
Figure 13D:
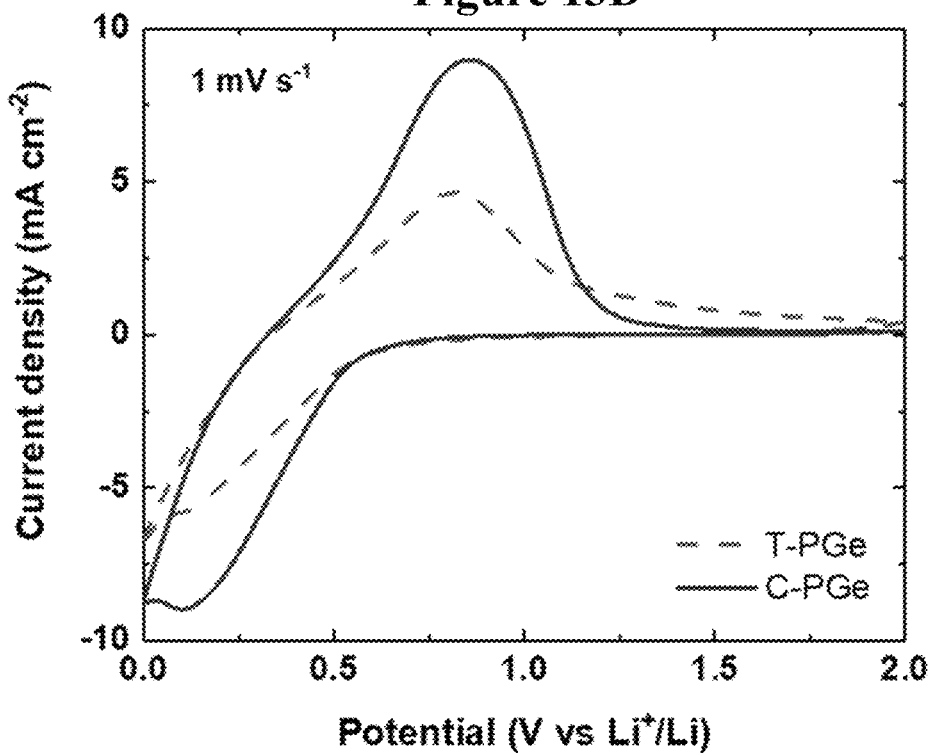
FIG. 13D shows cyclic voltammetry of tubular porous germanium and columnar porous germanium on-chip anodes at potential rate of 0.001 V s$^{-1}$ to highlight pseudo-capacitance and deep-intercalation applications.

To differentiate between pseudo-capacitance (nanoscale Li intercalation) and deep-intercalation (Li alloying) behaviors, cyclic voltammetry was performed at 0.1 $V·s^{-1}$ and 0.001 $V·s^{-1}$ rates as seen for the embodiments presented in FIGS. 13C and 13D, respectively. Charge quantity calculated from the area under C-V curve for these embodiments can be of 1.03 C and 2.5 C at 0.1 $V·s^{-1}$ rate for tubular porous germanium and columnar porous germanium, respectively. For 0.001 $V·s^{-1}$ rate, charge quantity of 4.7 C and 6.6 C for tubular porous germanium and columnar porous germanium can be obtained. These charge quantity values can demonstrate the higher electrochemical reactivity of columnar porous germanium compared to tubular porous germanium. No reduction peak and no alloy formation could be observed for the case of a potential rate of 0.1 $V·s^{-1}$. For pseudo-capacitance applications, only the oxidation peak can be observed, at potentials of 1.06 V vs $Li^+/Li$ for tubular porous germanium and 0.98 V Vs $Li^+/Li$ for columnar porous germanium. For deep-intercalation application, at 0.001 $V s^{-1}$ rate, oxidation and reduction can respectively be at 0.09 V vs $Li^+/Li$ and 0.82 vs $Li^+/Li$ for tubular porous germanium and at 0.1 V vs $Li^+/Li$ and 0.86 vs $Li^+/Li$ for columnar porous germanium. The increase of oxidation and reduction potentials for columnar porous germanium may be related to the absence of a reference electrode as the measurements were made directly within the coin cells.

Figure 14A:
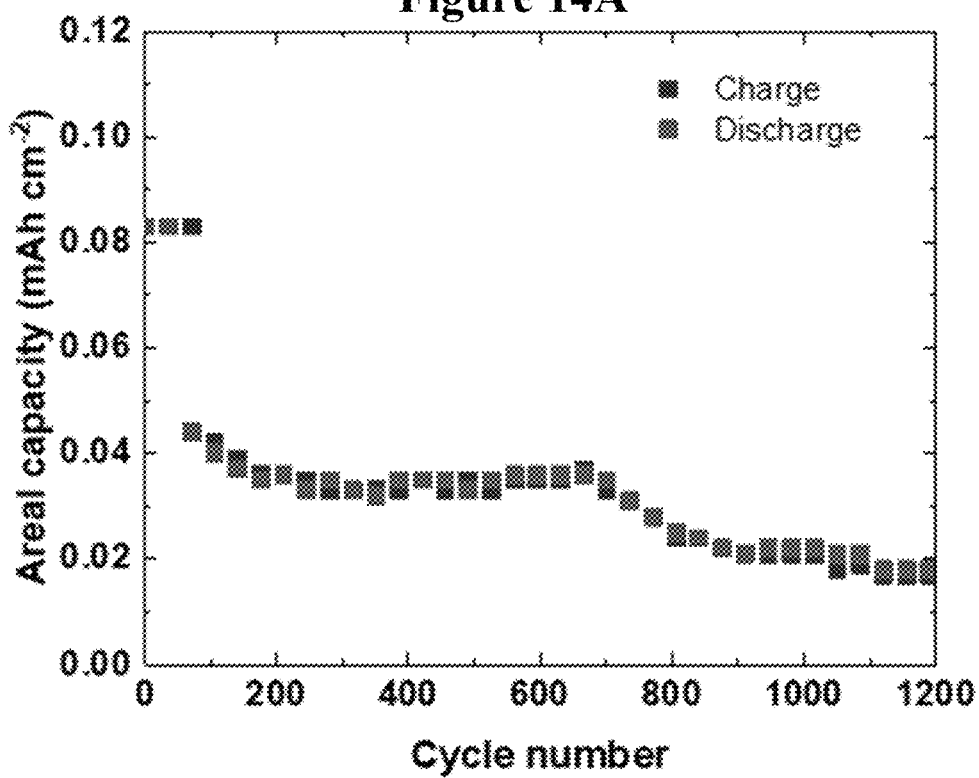
FIG. 14A shows charge-discharge plot for pseudo-capacitance application (high discharge rate) of tubular porous germanium samples used as on-chip anodes.
Figure 14B:
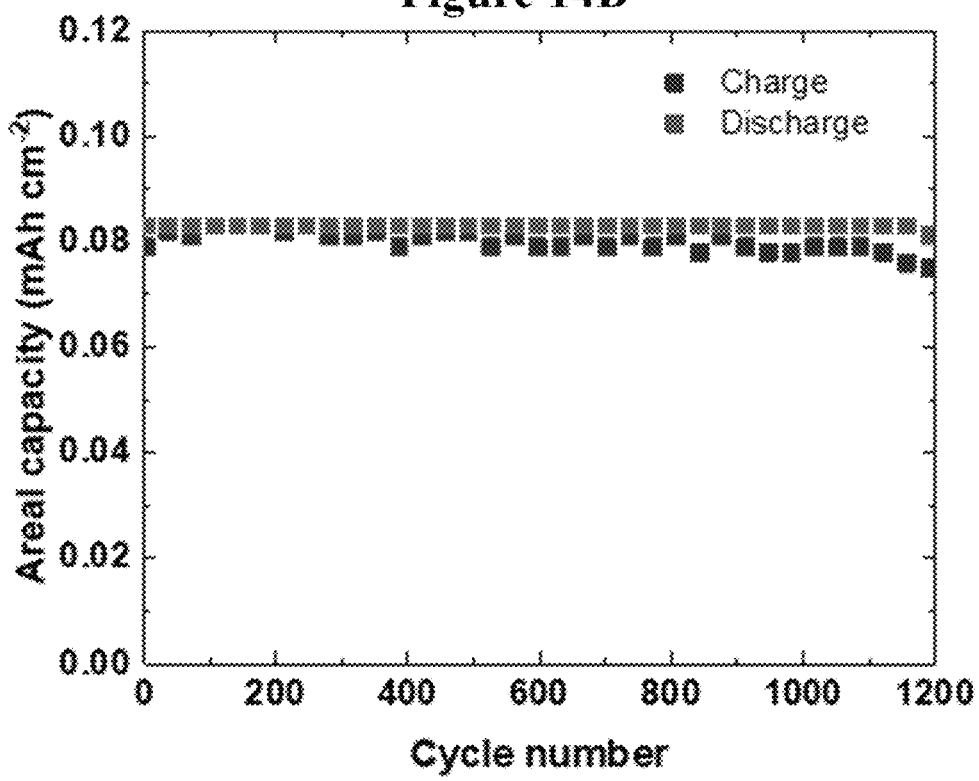
FIG. 14B shows charge-discharge plot for pseudo-capacitance application (high discharge rate) columnar porous germanium samples used as on-chip anodes.
Figure 14C:
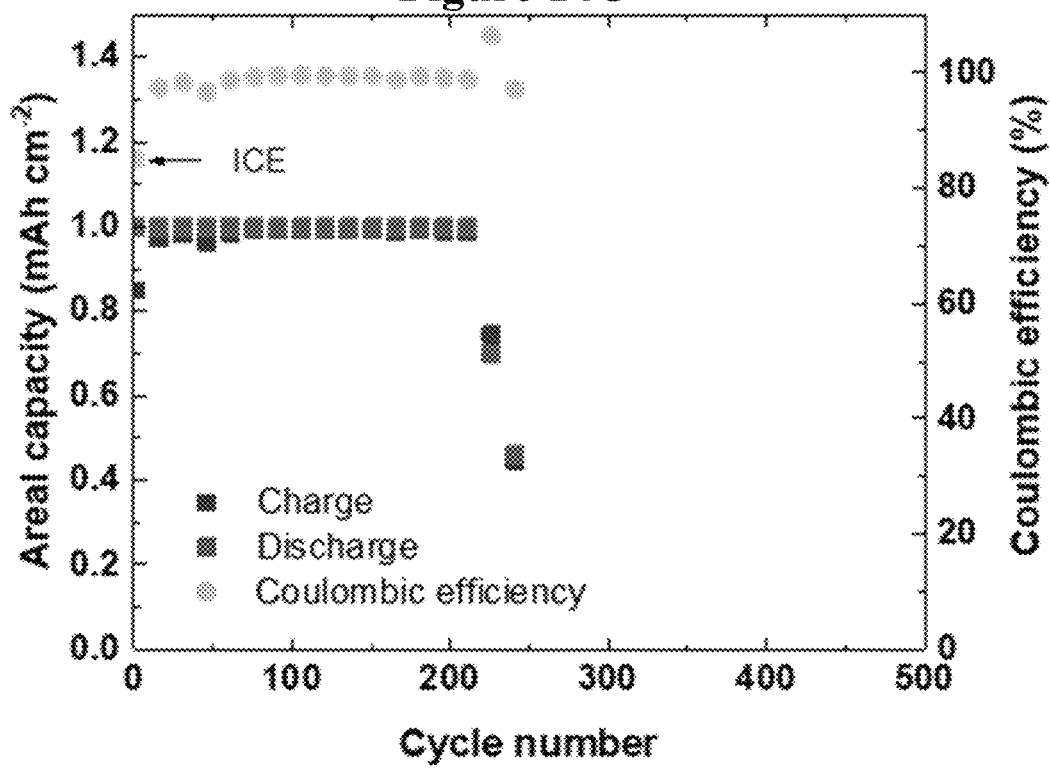
FIG. 14C shows charge-discharge plot for deep-intercalation application (with coulombic efficiency at 2 C discharge rate) of tubular porous germanium samples used as on-chip anodes.
Figure 14D:
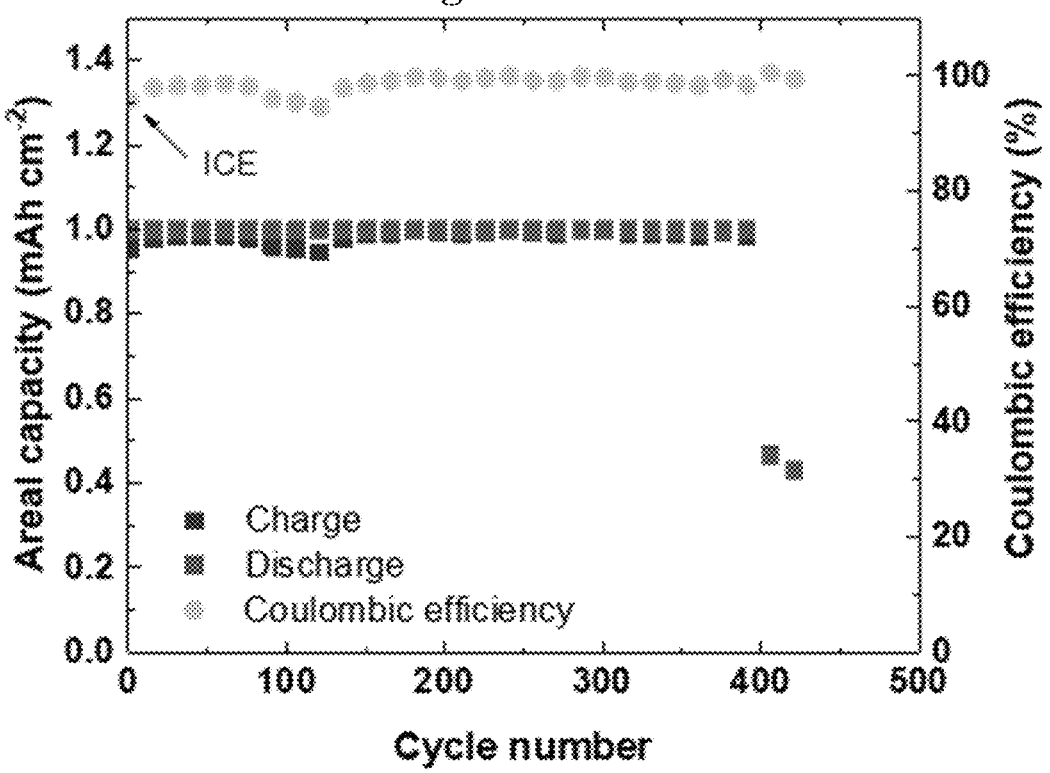
FIG. 14D shows charge-discharge plot for deep-intercalation application (with coulombic efficiency at 2 C discharge rate) of columnar porous germanium samples used as on-chip anodes.
Figure 14E:
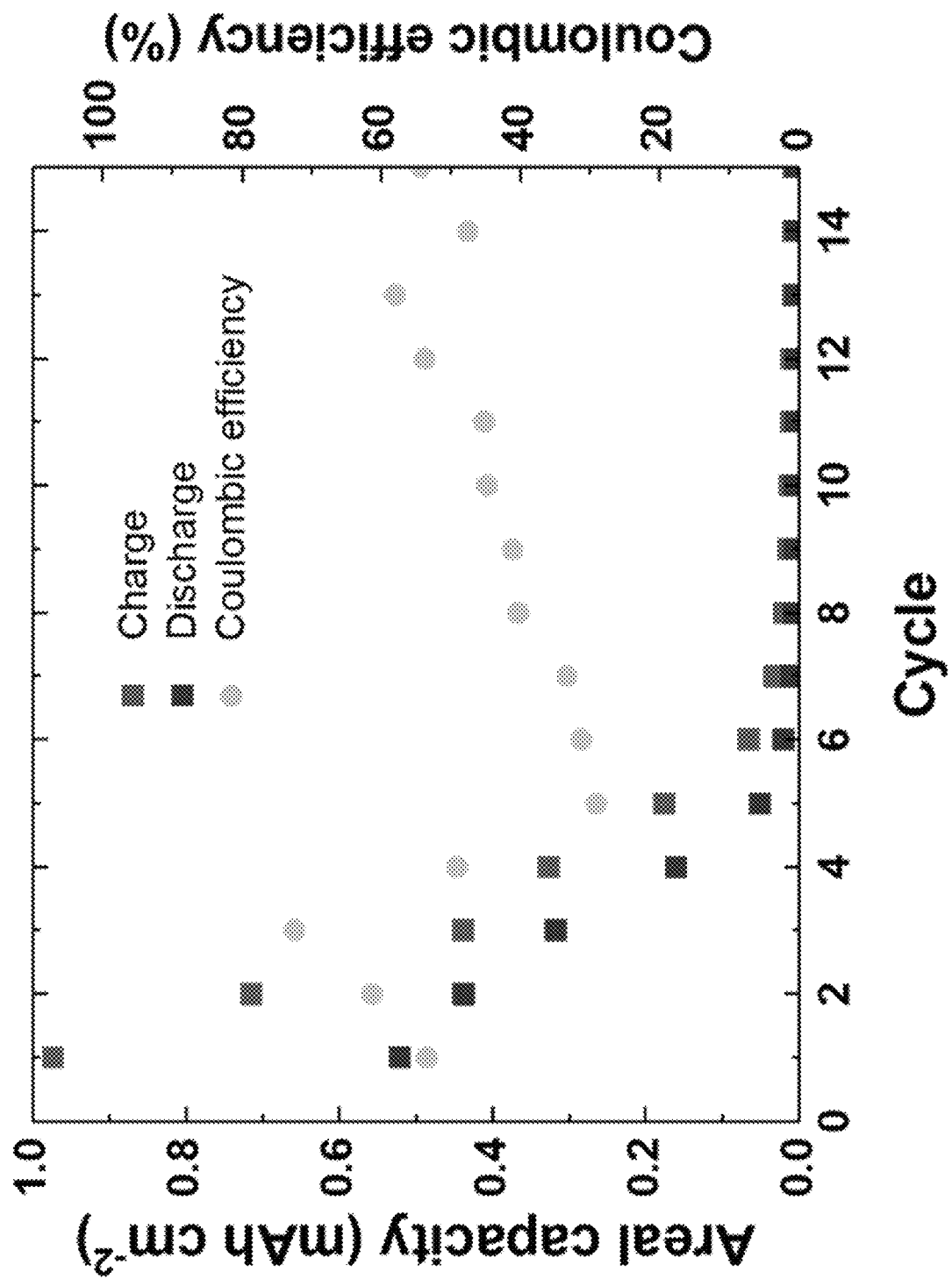
FIG. 14E shows the charge-discharge plot with coulombic efficiency of bulk Ge used as on-chip anode.
Figure 15A:
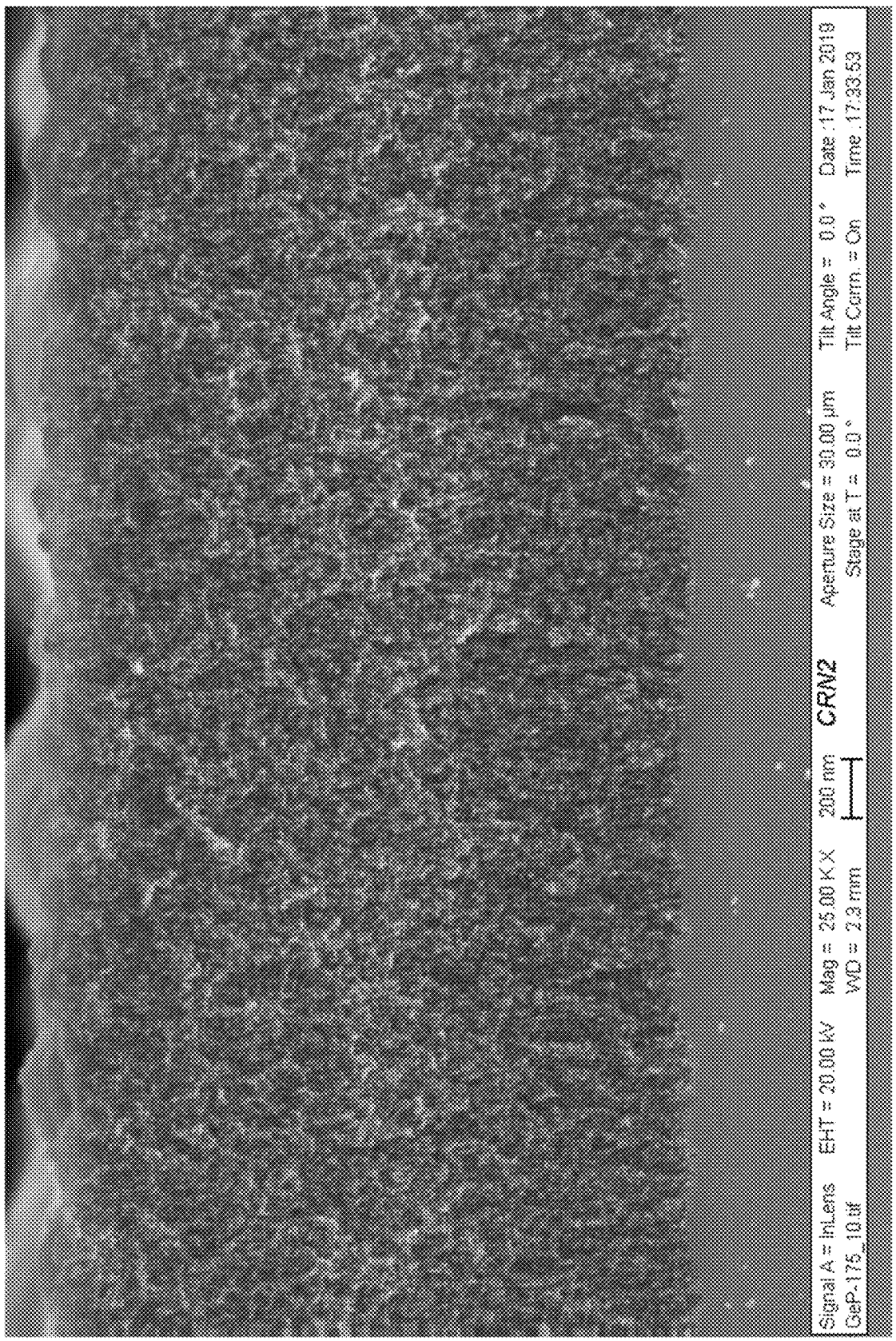
FIG. 15A shows a cross-section SEM view of germanium with a porous structure.
Figure 16A:
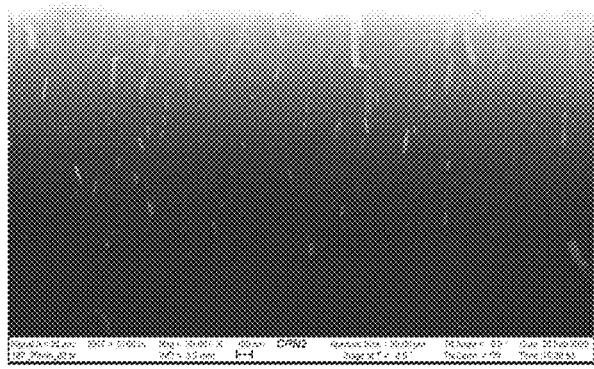
FIG. 16A shows the full thickness of a cross-sectional SEM views of a porosified germanium having a full electrochemical etching time of 30 minutes and an etching current density of 15 mA·cm$^{-2}$.
Figure 16B:
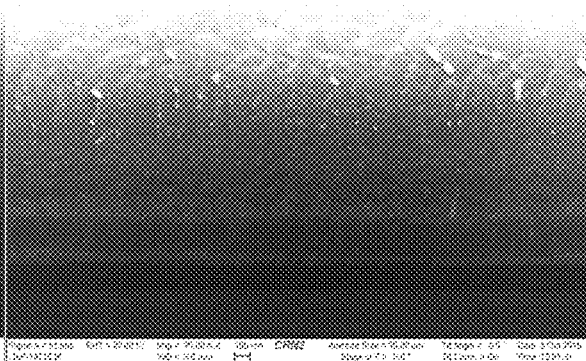
FIG. 16B shows the full thickness of a cross-sectional SEM views of a porosified germanium having a full electrochemical etching time of 60 minutes and an etching current density of 15 mA·cm$^{-2}$.
Figure 16C:
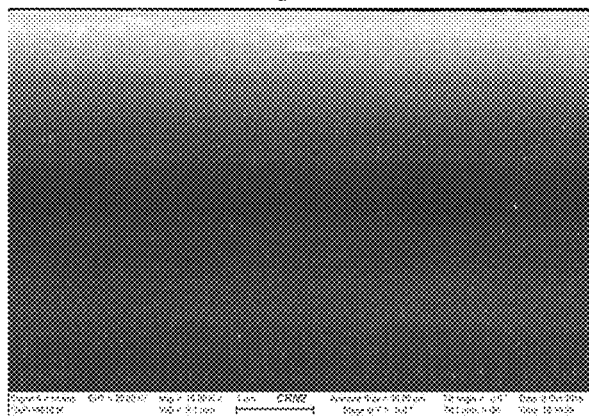
FIG. 16C shows the full thickness of a cross-sectional SEM views of a porosified germanium having a full electrochemical etching time of 120 minutes and an etching current density of 15 mA·cm$^{-2}$.
Figure 16D:
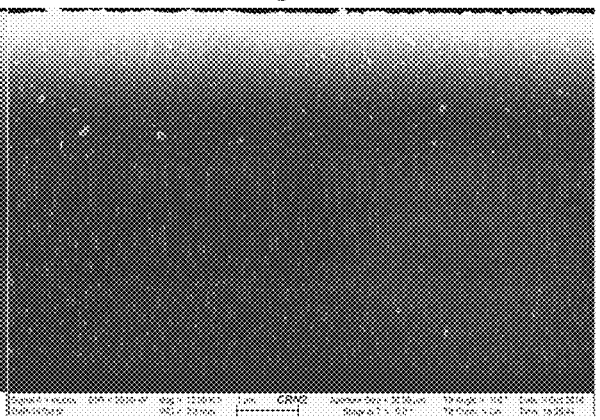
FIG. 16D shows the full thickness of a cross-sectional SEM views of a porosified germanium having a full electrochemical etching time of 180 minutes and an etching current density of 15 mA·cm$^{-2}$.
Figure 16E:
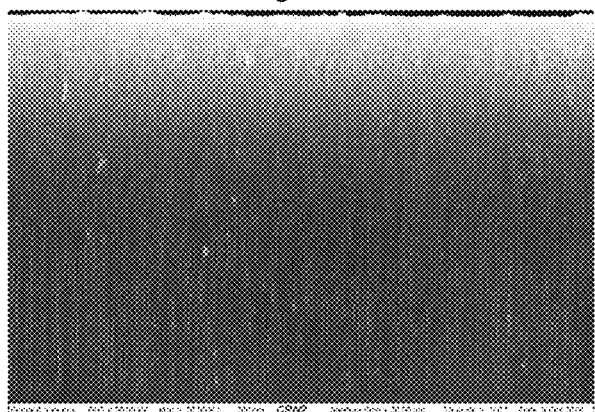
FIG. 16E shows the full thickness of a cross-sectional SEM views of a porosified germanium having a full electrochemical etching time of 240 minutes and an etching current density of 15 mA·cm$^{-2}$.
Figure 16F:
FIG. 16F shows the full thickness of a cross-sectional SEM views of a porosified germanium having a full electrochemical etching time of 360 minutes and an etching current density of 15 mA·cm$^{-2}$.

FIG. 14A and FIG. 14B show charge-discharge plot for tubular porous germanium and columnar porous germanium for pseudo-capacitance applications, respectively. As it can be seen, columnar porous germanium on-chip anode is more efficient for pseudo-capacitance applications with 1 min discharge time, as demonstrated by its 26 times longer cycle life at 1 $mAh/cm^2$. In fact, tubular porous germanium had a cycle life of 47 while a 1200 cycle life was measured for columnar porous germanium nanostructure. The capacity fading observed in FIG. 14A for tubular porous germanium sample could be due to the fact that diffusion of electrolyte ions into the tubular structure may be more complicated compared to columnar porous germanium as previously explained by H. Wu and Y. Cui (H. Wu, Y. Cui, Designing nanostructured Si anodes for high energy, Nano Today 7 (2012) 414-429), which can have a higher porosity and an higher pore size, as shown in FIGS. 12B and 12E, respectively. FIGS. 14C and 14D represent the charge-discharge plot with coulombic efficiency for tubular porous germanium and columnar porous germanium embodiments, respectively, for deep-intercalation applications. FIG. 14E shows the charge-discharge plots and coulombic efficiency of an on-chip bulk germanium used in half-cell settings. In this embodiment, a 2 C discharge rate was used here. Because the active material is represented by all the substrate (150 μm thickness and 1 cm² surface area), only the surface capacity can be represented here. As it can be seen in this embodiment, if no nanostructuration is applied to increase the specific surface area and improve electrolyte/electrode interface, an unstable life cycle of 6 can be demonstrated, with an initial coulombic efficiency around 55%. In FIG. 14C, related to an embodiment of tubular porous germanium, an initial coulombic efficiency (ICE) of 85.02% and a constant areal capacity of 1 mAh/cm² during 220 cycles can be observed. The average coulombic efficiency can be around 98.8%. Moreover, 56% of the initial reversible capacity can be lost within 30 cycles. The capacity fading may be related to the dendrite formation due to the use of metal Li as cathode as previously explained by Ziv et al. (DOI: 10.114 9/2.0731410jes). In FIG. 14C, related to an embodiment of a columnar porous germanium nanostructure, an ICE of 95.7% can be shown. A cycle life of 398 can show a surface capacity of about 1 mAh/cm². An average coulombic efficiency of around 98.37% can be calculated. The decreased ICE, and so irreversible capacity during the first cycle, are directly related to the decreased specific surface area after chemical etching, which can reduce SEI formation. In this case, 56% of the initial reversible capacity can be lost within 6 cycles. As for the tubular porous germanium, capacity fading for columnar porous germanium on-chip anode may be associated with the dendrite formation as well as the continuous pulverization of the active material that, in this case could be faster because of the decreasing of crystallite size. In a previous work Dupuy et al. (DOI: 10.1016/j.mtcomm.2020.101820) showed that it can be possible to prevent the fast capacity fading by coating the anode surface by graphene. The increased life cycle and electrochemical reactivity of columnar porous germanium anode, compared to tubular porous germanium, shows the interest to mix chemical etching with electrochemical etching to tune the porous morphologies and indirectly the application performances.

Preparation of Electrodes and Coin-Cell Fabrication

In some embodiments, after synthesis of tubular porous germanium and columnar porous germanium morphologies, samples can be directly used as on-chip anodes in the CR2032 cells. The germanium substrate may be used as the current collector and the porous layer as the active material. For one CR2032 cell, 250 μL of ethylene carbonate/dimethyl carbonate (EC/DMC) can be used as the electrolyte with 1 M of LiPF6. In some embodiments, Celgard paper may be set as the separator between the on-chip anode and the pure Li counter-electrode.

Half-Cell Battery Setting Increased Performances

Figure 19:
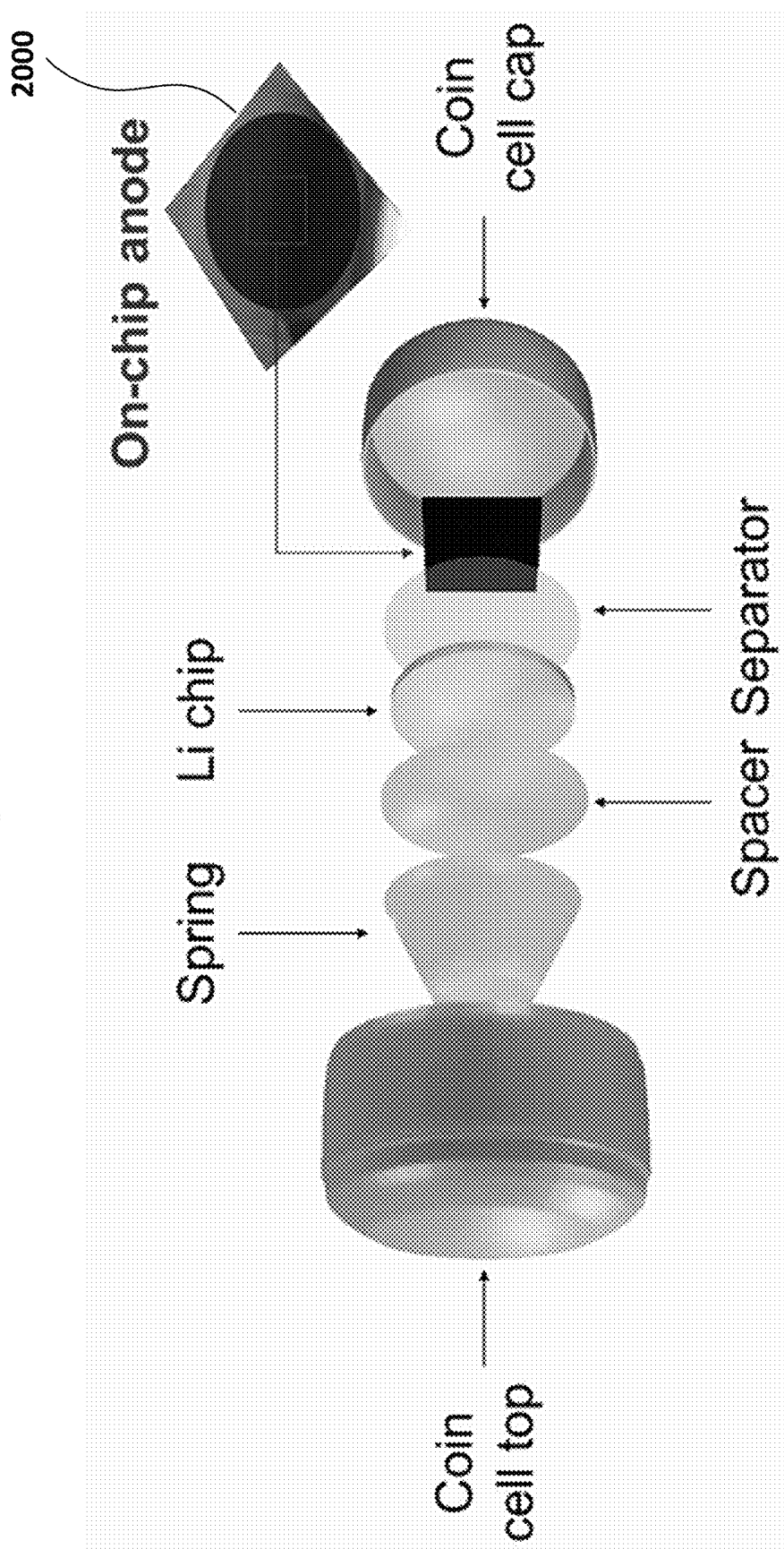
FIG. 19 illustrates the components and configuration of such CR2032 button battery.
Figure 21:
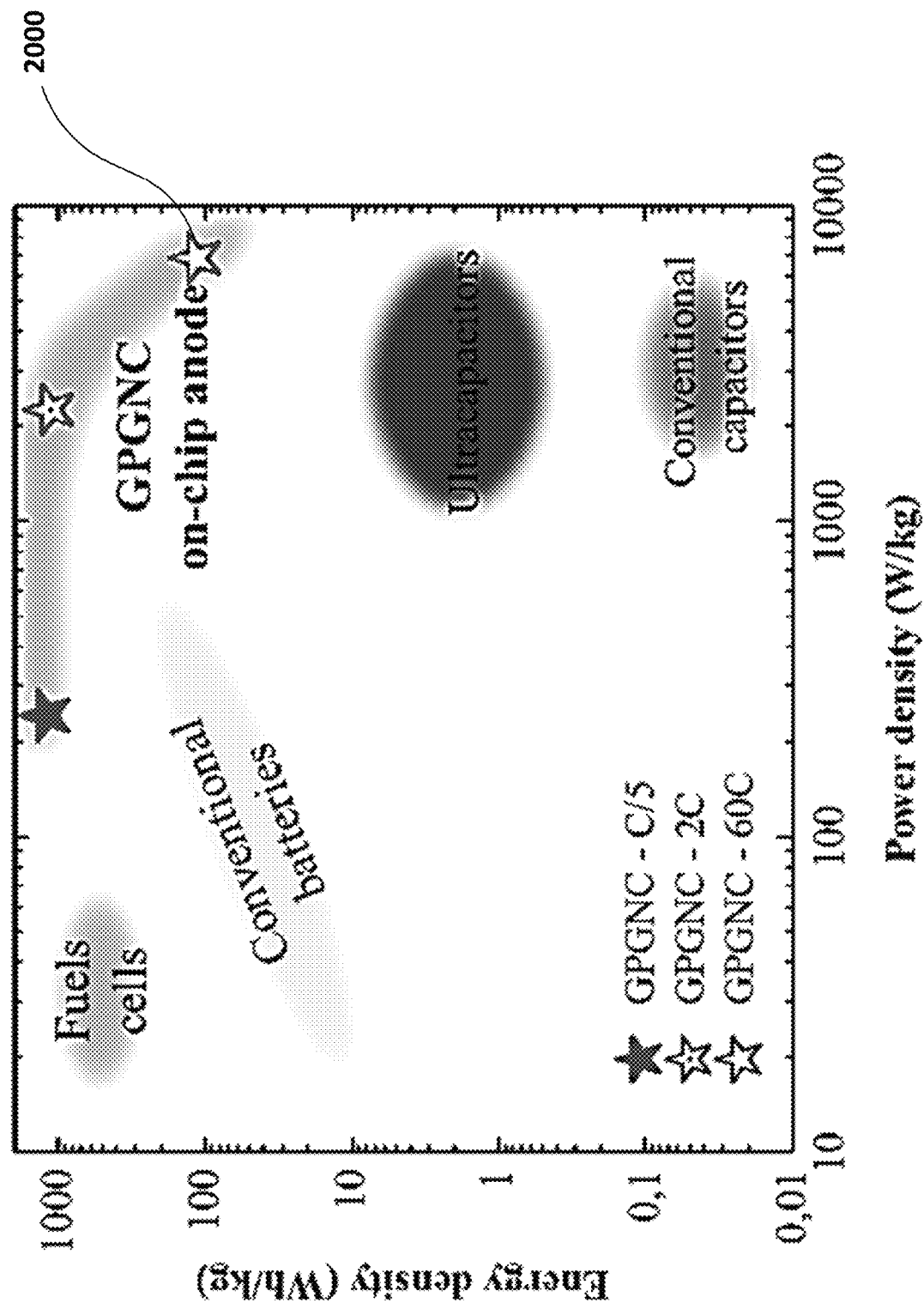
FIG. 21 shows a Ragone plot regrouping various storing technologies and sorting them according to their theoretical power densities.

In the following embodiments, the efficiency of the previously mentioned porous germanium on-chip anode can be tested with a CR2032 button battery configuration with a lithium metal as a cathode. FIG. 19 illustrates the components and configuration of such CR2032 button battery. Various performances of batteries of various embodiments are compiled in the table of FIG. 20, where their capacity was limited to 1 mAh/cm² (equivalent to 1400 mAh·g⁻¹ for the masses in the batteries). Higher cycling lifespans can be achieved with spongious germanium coated with graphene (spongious/carbone) with a discharge current of about 5 mA/cm² and discharge time of about 1 minute (analogous to high power density storing such as pseudo-capacity or super-capacity). The columnar morphology can allow to achieve higher initial Coulombic efficiency, e.g. 95.7% with a discharge current of about 2 mAh/cm², discharge time of about 30 minutes, in some embodiments. Such higher initial Coulombic efficiency (Coulombic efficiency of the first lithiation cycle) can correspond to reducing the formation of solid electrolyte interface (SEI) associated with a columnar porous germanium anode. While the on-chip porous silicon may be lithiated at low discharge rates of about 40 hours, it may be possible to adapt the various porous germanium morphologies with the presented electrochemical etching for alternative applications and technologies since it can provide various discharge rates. By testing the morphology of porous germanium coated with graphene under various cycling conditions, the applicant was able to estimate the energy density and power density that can be achieved by using such a material when considering the mass of the porous layer. FIG. 21 that shows a Ragone plot regrouping various storing technologies and sorting them according to their theoretical power densities allows to see that such on-chip anodes 2000 present much higher power density potentials than the actual systems.

What is claimed is:

1. A method for producing a battery comprising:
   providing an anode comprising at least one monolithic nanostructured germanium substrate by:
      setting up nucleation etching to induce nucleation sites with a desired nucleation site spacing on a first side of a germanium substrate;
      etching said germanium substrate to produce porous germanium on said first side of said germanium substrate with pores extending into said first side at said nucleation sites with a fast bipolar electrochemical etching step comprising;
         submerging said germanium substrate in an etching electrolyte;
         applying etching pulses on said first side; and
         applying passivation pulses;
         wherein said etching pulses creates an intensified electrical current at a bottom of said pores with reduced current along sidewalls of said pores, said passivation pulses create a passivation layer on said sidewalls of said pores that protects said sidewalls of said pores from said etching electrolyte during said etching pulses, and said etching pulses causing said pores to assume tubular shape; and
      etching said porous germanium to produce columnar germanium with a chemical etching step comprising;
         controlling a concentration of a chemical etching solution comprising an acid and an oxidization agent; and
         controlling a dipping time of said porous germanium in said chemical etching solution,
         wherein said concentration and said dipping time are controlled to produce columnar germanium by enlarging said tubular pores to at least partly merge with neighboring ones of said pores to leave columns of germanium extending upwardly from said first side of said germanium substrate;
   providing a battery electrolyte; and
   providing a cathode with said cathode in electrical contact with said battery electrolyte and said battery electrolyte in contact with said anode.

2. The method as defined in claim 1,
   wherein said applied etching pulses have a pulse duration between 0.001 seconds and 0.5 seconds, an etching current density between 0.1 mA/cm$^2$ and 100 mA/cm$^2$, and a total etching time of between 0.03 seconds and 450 minutes;

wherein said applied passivation pulses have a passivation current density between 0.1 mA/cm$^2$ and 100 mA/cm$^2$, and having a passivation pulse duration between 0.001 seconds and 10 seconds; and wherein said fast bipolar electrochemical etching step is applied on said germanium substrate for a total porosification time between 1 minutes and 900 minutes.

3. The method as defined in claim 1, wherein said etching electrolyte is a hydrofluoric-based etching electrolyte.

4. The method as defined in claim 2, wherein said total porosification time is between 30 minutes and 360 minutes.

5. The method as defined in claim 2, wherein said etching current density is between 10 mA/cm$^2$ and 30 mA/cm$^2$.

6. The method as defined in claim 2, wherein said passivation pulse duration is between 0.1 seconds and 0.2 seconds.

7. The method as defined in claim 2, wherein said passivation current density is between 30 mA/cm$^2$ and 60 mA/cm$^2$.

8. The method as defined in claim 4, wherein said total porosification time is between 30 minutes and 360 minutes; said applied etching pulses have a pulse duration of about 0.05 seconds; said etching current density is between 10 mA/cm$^2$ and 30 mA/cm$^2$; said passivation pulse duration is between 0.1 seconds and 0.2 seconds; said passivation current density is between 30 mA/cm$^2$ and 60 mA/cm$^2$; said concentration of a chemical etching solution is between 0.92 M and 1.53 M of hydrofluoric acid; and said dipping time is between more than 1 seconds and 30 seconds.

9. The method as defined in claim 1, wherein said acid of said chemical etching solution is hydrofluoric acid; and wherein said concentration of said chemical etching solution is between 1 µM and 27.46 M of hydrofluoric acid; and wherein said dipping time is between 0.001 seconds and 900 seconds.

10. The method as defined in claim 9, wherein said chemical etching solution further comprising an acetic acid surfactant; wherein said oxidization agent of said chemical etching solution is hydrogen peroxide; wherein said chemical etching solution having a respective dilution ratio of said hydrofluoric acid, said hydrogen peroxide and said acetic acid of 1:2:3; and wherein said dilution of said chemical etching solution is controlled with deionized water.

11. The method as defined in claim 9, wherein said concentration of a chemical etching solution is between 0.92 M and 1.53 M of hydrofluoric acid.

12. The method as defined in claim 9, wherein said dipping time is between 1 seconds and 30 seconds.

13. The method as defined in claim 1, wherein said nucleation etching comprising submerging said germanium substrate in a hydrofluoric-based etching electrolyte and applying a nucleation etching current of about 10 mA/cm$^2$ for between 30 seconds and 60 seconds.

14. The method as defined in claim 1, wherein said germanium substrate is a substrate of type-p germanium wafer doped with gallium having a crystal orientation of 100, and a resistivity of between about 1 mΩ·cm and 40 mΩ·cm.

15. The method as defined in claim 1, further comprising coating said columnar germanium with a carbon-based material.

16. The method as defined in claim 1, wherein said columnar germanium is an active material for lithiation of said anode and is structured to allow for expansion of said active material during lithiation.

17. The method as defined in claim 1, wherein said battery electrolyte is lithium and wherein said columnar germanium having dimensions less than 100 nanometers in two of said dimensions.

18. The method as defined in claim 1, wherein said columnar germanium having a length of between 0.5 micrometers and 10 micrometers.

19. The method as defined in claim 1, further comprising coating said at least one monolithic nanostructured germanium substrate with a carbon-based material.

* * * * *

UNITED STATES PATENT AND TRADEMARK OFFICE
CERTIFICATE OF CORRECTION

| | |
|---|---|
| PATENT NO. | : 11,901,564 B2 |
| APPLICATION NO. | : 17/667998 |
| DATED | : February 13, 2024 |
| INVENTOR(S) | : Arthur Dupuy, Abderraouf Boucherif and Richard Ares |

It is certified that error appears in the above-identified patent and that said Letters Patent is hereby corrected as shown below:

In the Drawings

1. In Fig. 1E, sheet 3 of 83 Tag no. "1003" delete "Colunmar" and insert -- Columnar --, therefor.

In the Specification

2. In Column 4, Line 17, delete "8 mΩ cm" and insert -- 8 mΩ·cm --, therefor.

In the Claims

3. In Column 31, Claim 2, Line 6, after "and" delete "having".

Signed and Sealed this
Fourth Day of June, 2024

*Katherine Kelly Vidal*
Katherine Kelly Vidal
*Director of the United States Patent and Trademark Office*